United States Patent [19]

Barthel et al.

[11] Patent Number: 5,081,586
[45] Date of Patent: Jan. 14, 1992

[54] MULTIPLEXING OF ACCESSORIES IN A VEHICLE

[75] Inventors: Richard C. Barthel, Libertyville, Ill.; Charles J. Luebke, Wauwatosa; Erich Rehm, Milwaukee, both of Wis.

[73] Assignee: Eaton Corporation, Cleveland, Ohio

[21] Appl. No.: 482,449

[22] Filed: Feb. 20, 1990

[51] Int. Cl.$^5$ .......................... G05D 3/00; G06F 1/32; H02P 7/00
[52] U.S. Cl. .......................... 364/424.05; 364/424.01; 318/466; 307/10.1; 395/750
[58] Field of Search .................. 364/424.01, 424.05, 364/707; 340/459; 307/10.1; 318/466

[56] References Cited

U.S. PATENT DOCUMENTS

| | | | |
|---|---|---|---|
| 4,463,426 | 7/1984 | Caddick et al. | 364/424.05 |
| 4,523,136 | 6/1985 | Dudeck et al. | 318/466 X |
| 4,578,591 | 3/1986 | Floyd et al. | 364/424.05 X |
| 4,698,748 | 10/1987 | Juzswik et al. | 364/200 |
| 4,706,194 | 11/1987 | Webb et al. | 364/424.05 |
| 4,707,788 | 11/1987 | Toshiro et al. | 364/424.05 X |
| 4,733,145 | 3/1988 | Ohashi et al. | 364/424.05 |
| 4,809,177 | 2/1989 | Windle et al. | 364/424.01 |
| 4,811,226 | 3/1989 | Shinohara | 364/424.05 |
| 4,839,530 | 6/1989 | Greenwood | 307/10.1 |
| 4,841,474 | 6/1989 | Zandveld et al. | 364/900 |
| 4,845,620 | 7/1989 | Parker | 364/424.05 |
| 4,851,987 | 7/1987 | Day | 364/200 |
| 4,883,974 | 11/1989 | Tinder | 307/10.1 |
| 4,907,153 | 3/1990 | Brodsky | 364/424.05 |
| 4,929,878 | 3/1990 | Hansen | 318/560 |
| 4,942,571 | 7/1990 | Moller et al. | 307/10.1 X |
| 4,969,082 | 11/1990 | Oho et al. | 364/424.05 X |
| 5,004,967 | 4/1991 | Ogasawara | 318/466 X |
| 5,019,759 | 3/1991 | Takemura et al. | 364/424.05 X |

OTHER PUBLICATIONS

"Detroit '88: Driver Friendly Innovations," R. K. Jurgen, IEEE Spectrum, Dec. 1987, pp. 53-57.

Primary Examiner—Parshotam S. Lall
Assistant Examiner—Thomas Auchterlonie
Attorney, Agent, or Firm—R. A. Johnston

[57] ABSTRACT

A control system utilizes a multiplex communication system for switchably operating power windows, power seats, power door locks, power mirrors, accessory lighting, etc. Switches mounted on the driver door and elsewhere communicate with a door-mounted microcomputer, which scans the state of each switch, prioritizes the requests, and issues commands in accordance with algorithms to control the windows, door locks, etc. The system has three modes of operation: Asleep, Active, and Awake. In the Asleep mode electrical power consumption is very small, and only a selected few input sesors are periodically monitored as to status. If a door handle is lifted or other action starts, the system changes to an Active mode, in which many more sensors are periodically scanned, and most output motors can be operated. In the Awake mode, windows can also be operated.

19 Claims, 64 Drawing Sheets

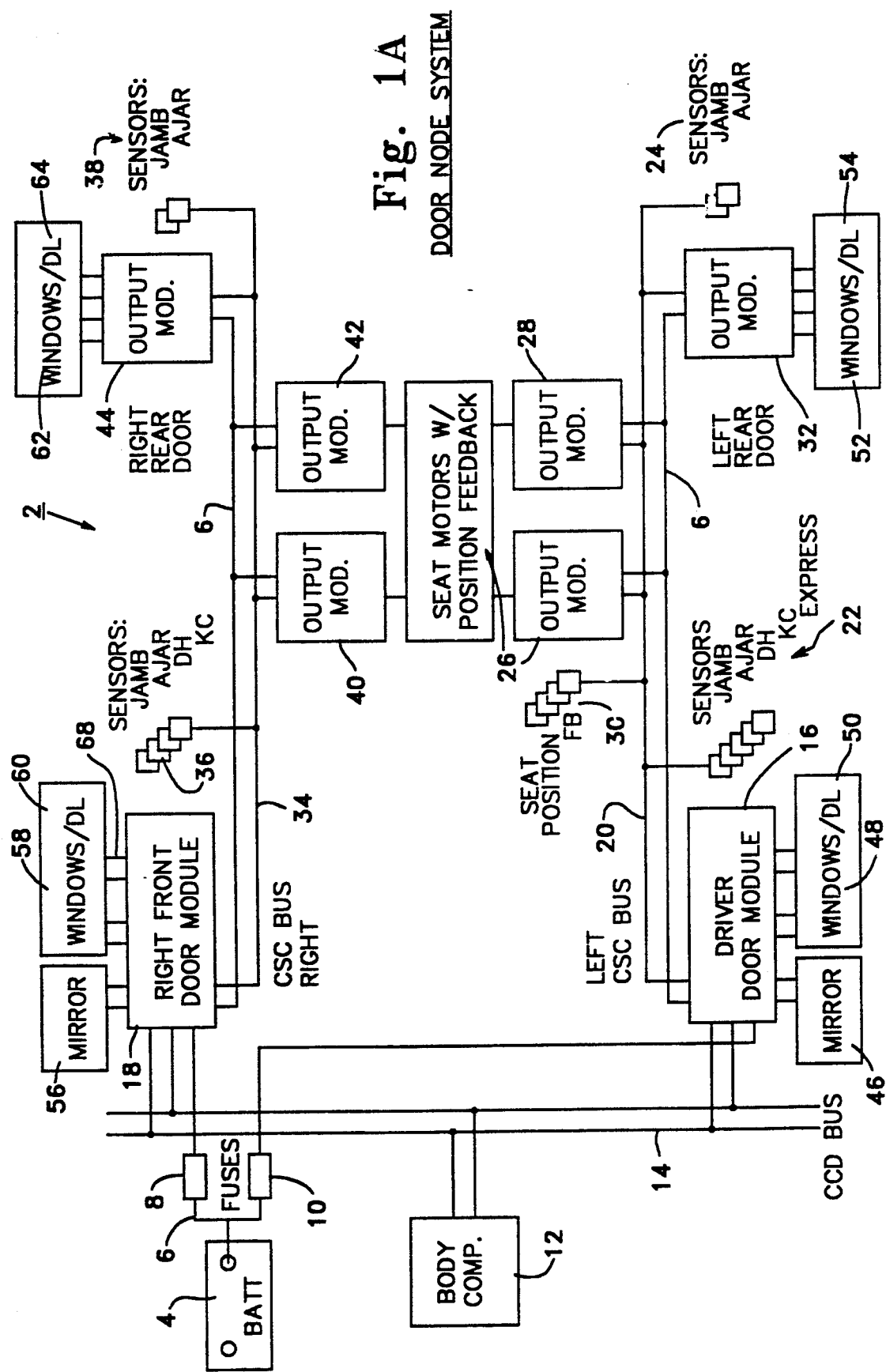

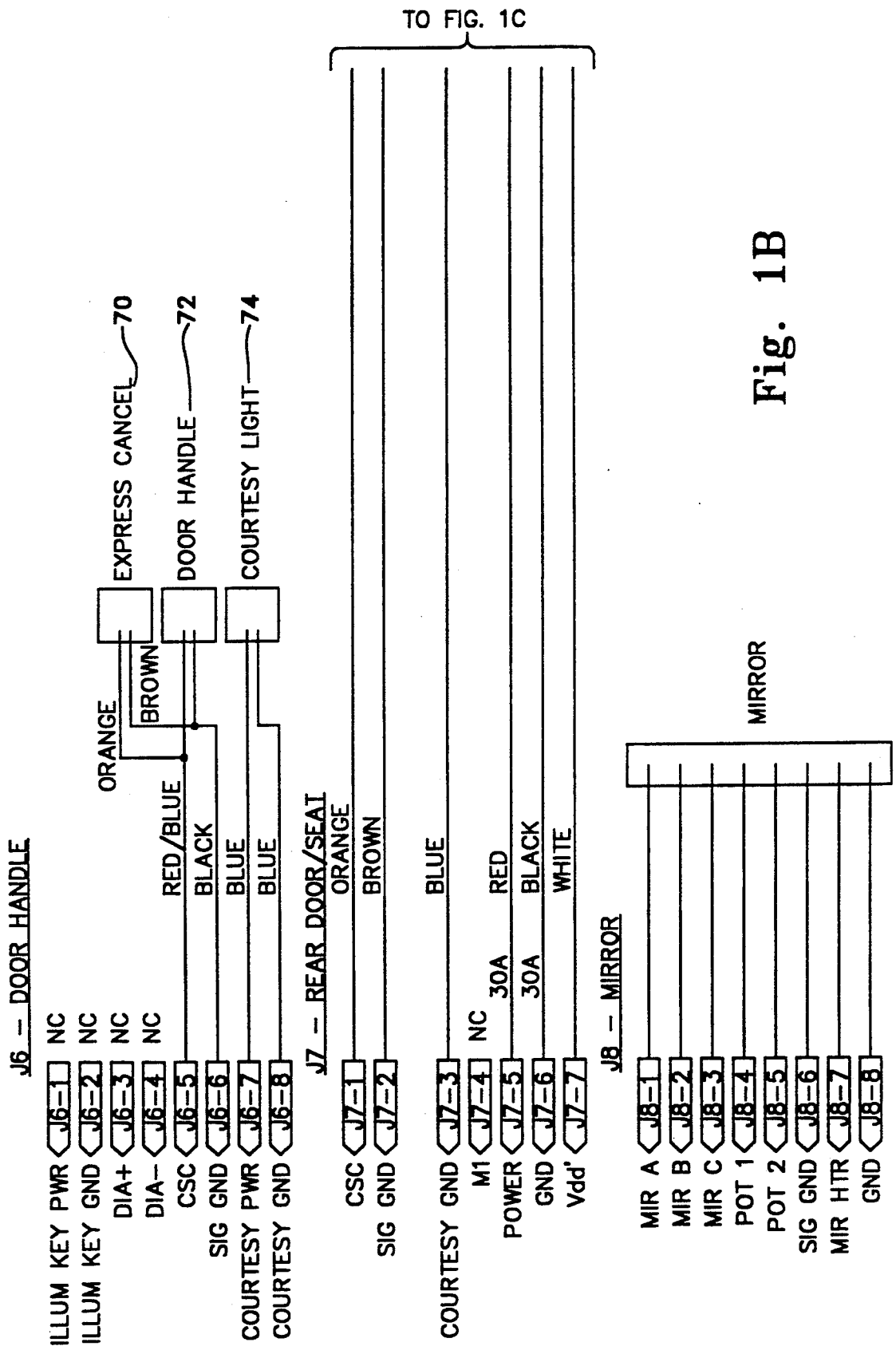

CCD MESSAGES                                              12/2/88

| MESSAGE | DRIVER SEND | DRIVER RCV | PASSENGER SEND | PASSENGER RCV | BODY COMPUTER SEND | BODY COMPUTER RCV | PRIORITY |
|---|---|---|---|---|---|---|---|
| DOOR LOCK | X | | | X | | | H |
| DOOR UNLOCK | X | | | X | | | H |
| DL STOP | X | | | X | | | H |
| WINDOW FRONT UP | X | | | X | | | H |
| WINDOW FRONT DOWN | X | | | X | | | H |
| WINDOW FRONT STOP | X | | | X | | | H |
| WINDOW BACK UP | X | | | X | | | H |
| WINDOW BACK DOWN | X | | | X | | | H |
| WINDOW BACK STOP | X | | | X | | | H |
| MIRROR UP | X | | | X | | | H |
| MIRROR DOWN | X | | | X | | | H |
| MIRROR VERT STOP | X | | | X | | | H |
| *MIRROR VERT POSITION | | X | X | | | | H |
| MIRROR IN | X | | | X | | | H |
| MIRROR OUT | X | | | X | | | H |
| MIRROR HORZ STOP | X | | | X | | | H |
| *MIRROR HORZ POSITION | | X | X | | | | H |
| MEMORY RECALL ⊙ PWRUP | X | | | | | X | L |
| *DATA (32BYTES) | | X | | | X | | L |
| MEMORY STORE (SET SW) | X | | | | | X | L |
| *DATA (32BYTES) | X | | | | | X | L |
| MIRROR VERT POSITION (BYTE) MEM. SW | X | | | X | | | L |
| MIRROR HORZ POSITION (BYTE) MEM. SW | X | | | X | | | L |
| DH FRONT OPEN/CLOSE | X | | X | | | X | L |
| JAMB FRONT OPEN/CLOSE | X | | X | | | X | L |
| AJAR FRONT OPEN/CLOSE | X | | X | | | X | L |
| KEY PRESENT(DOOR LOCK) | X | | X | | | X | L |
| DH REAR OPEN/CLOSE | X | | X | | | X | L |
| JAMB REAR OPEN/CLOSE | X | | X | | | X | L |
| AJAR REAR OPEN/CLOSE | X | | X | | | X | L |
| IGNITION KEY IN | | X | | X | X | | H |
| IGNITION ON | | X | | X | X | | L |
| TRANSMISSION POSITION | | X | | X | X | | L |
| VEHICLE SPEED | | X | | X | X | | L |

*INDICATES A REPLY TO THE PREVIOUS MESSAGE

Fig. 2

CSC BUS ADDRESS MAP

INPUTS

| | | |
|---|---|---|
| 0 | | POWER UP — MEASURE STATIC CURRENT |
| 1 | * | WAKE UP ADDRESS |
| 2 | * | DRIVER DOOR HANDLE |
| 3 | * | PASS. DOOR HANDLE |
| 4 | | |
| 5 | | |
| 6 | | |
| 7 | | |
| 8 | | |
| 9 | | DRIVER DOOR JAMB |
| 10 | * | DRIVER DOOR AJAR |
| 11 | | PASS. DOOR JAMB |
| 12 | * | PASS. DOOR AJAR |
| 13 | | LEFT REAR JAMB |
| 14 | * | LEFT REAR AJAR |
| 15 | | RIGHT REAR JAMB |
| 16 | * | RIGHT REAR AJAR |
| 17 | | REAR WINDOW UP |
| 18 | | REAR WINDOW DOWN |
| 19 | | REAR VOLUME UP |
| 20 | | REAR VOLUME DOWN |
| 21 | | WINDOW FULL DOWN (EXPRESS) |
| 22 | * | RECLINE SWITCH UP |
| 23 | * | RECLINE SWITCH DOWN |
| 24 | | SEAT BELT FASTENED |
| 25 | | SEAT POSITION HORZ. |
| 26 | | SEAT POS. FRONT VERT. |
| 27 | | SEAT POS. BACK VERT. |
| 28 | | SEAT POS. RECLINE |
| 29 | * | DRIVER KEY CYLINDER |
| 30 | * | PASS. KEY CYLINDER |

\* WAKEUP-TYPE SENSORS (USE ADDRESS 1)

Fig. 3A

CSC BUS ADDRESS MAP

<u>OUTPUTS</u>

| | | |
|---|---|---|
| 0 | * | WINDOW UP |
| 1 | * | WINDOW DOWN |
| 2 | * | DOOR LOCK |
| 3 | * | DOOR UNLOCK |
| 4 | * | MIRROR UP |
| 5 | * | MIRROR DOWN |
| 6 | * | MIRROR IN |
| 7 | * | MIRROR OUT |
| 8 | | REAR WINDOW UP |
| 9 | | REAR WINDOW DOWN |
| 10 | | REAR DOOR LOCK |
| 11 | | REAR DOOR UNLOCK |
| 12 | | SEAT FORWARD |
| 13 | | SEAT BACK |
| 14 | | SEAT FRONT UP |
| 15 | | SEAT FRONT DOWN |
| 16 | | SEAT BACK UP |
| 17 | | SEAT BACK DOWN |
| 18 | | SEAT RECLINE UP |
| 19 | | SEAT RECLINE DOWN |
| 20 | | |
| 21 | | |
| 22 | | |
| 23 | | |
| 24 | | |
| 25 | | |
| 26 | | |
| 27 | | |
| 28 | | |
| 29 | | |
| 30 | | |
| 31 | | |

* LOCAL OUTPUTS ON DOOR MODULE

Fig. 3B

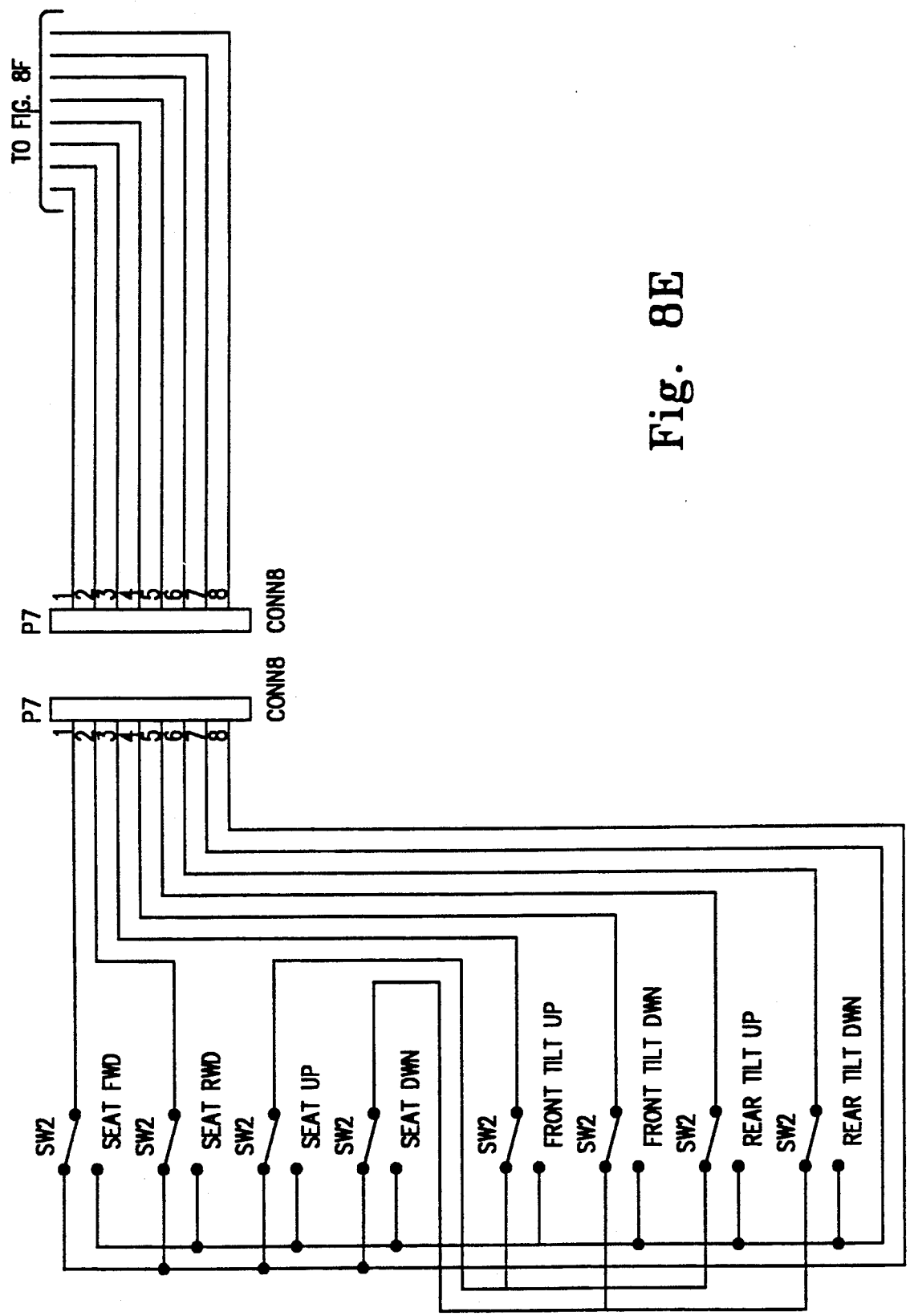

Fig. 9A

D— Module II Switch Matrix

| | SCAN1 (PB0) | SCAN2 (PB1) | SCAN3 (PB2) | SCAN4 (PB3) | | | |
|---|---|---|---|---|---|---|---|
| A0) | EXPR DWN | SET | DOOR LOCK | DOOR UNLOCK | | | |
| A1) | FRONT LEFT WINDOW DWN | FRONT LEFT WINDOW UP | SEAT FWD MIRROR RIGHT | SEAT BACK MIRROR LEFT | | | |
| A2) | FRONT RIGHT WINDOW DWN | FRONT RIGHT WINDOW UP | SEAT FR UP MIRROR UP | SEAT FR DN MIRROR DN | | | |
| A3) | REAR LEFT WINDOW DWN | REAR LEFT WINDOW UP | SEAT BK UP MIRROR UP | SEAT BK DN MIRROR DN | | | |
| A4) | REAR RIGHT WINDOW DWN | REAR RIGHT WINDOW UP | MEM. 1 | MEM. 2 | | | |
| A5) | LEFT MIRROR | RIGHT MIRROR | WIN LCK OUT | | | | |
| A6) | | | | | | | |
| A7) | | | | | | | |

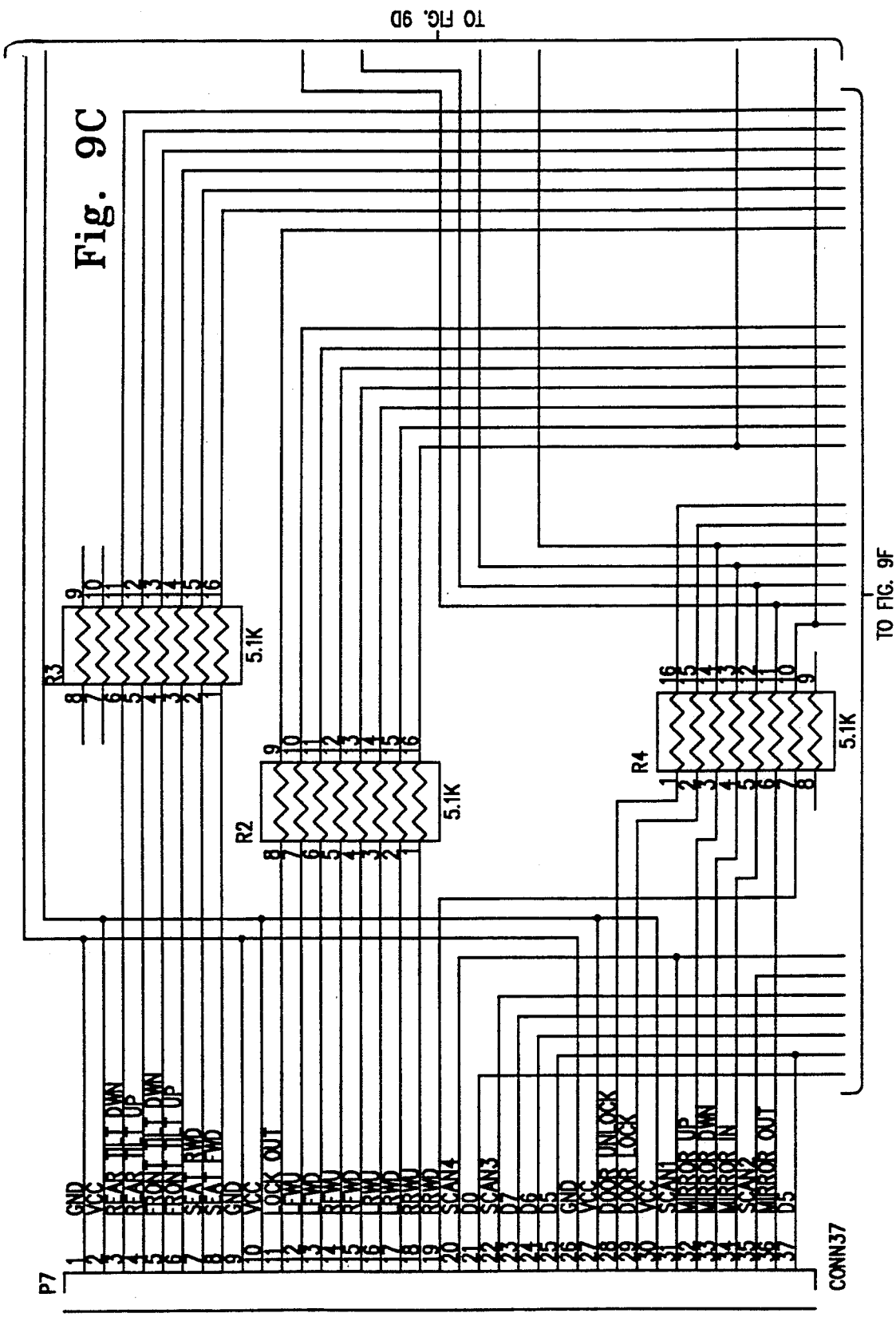

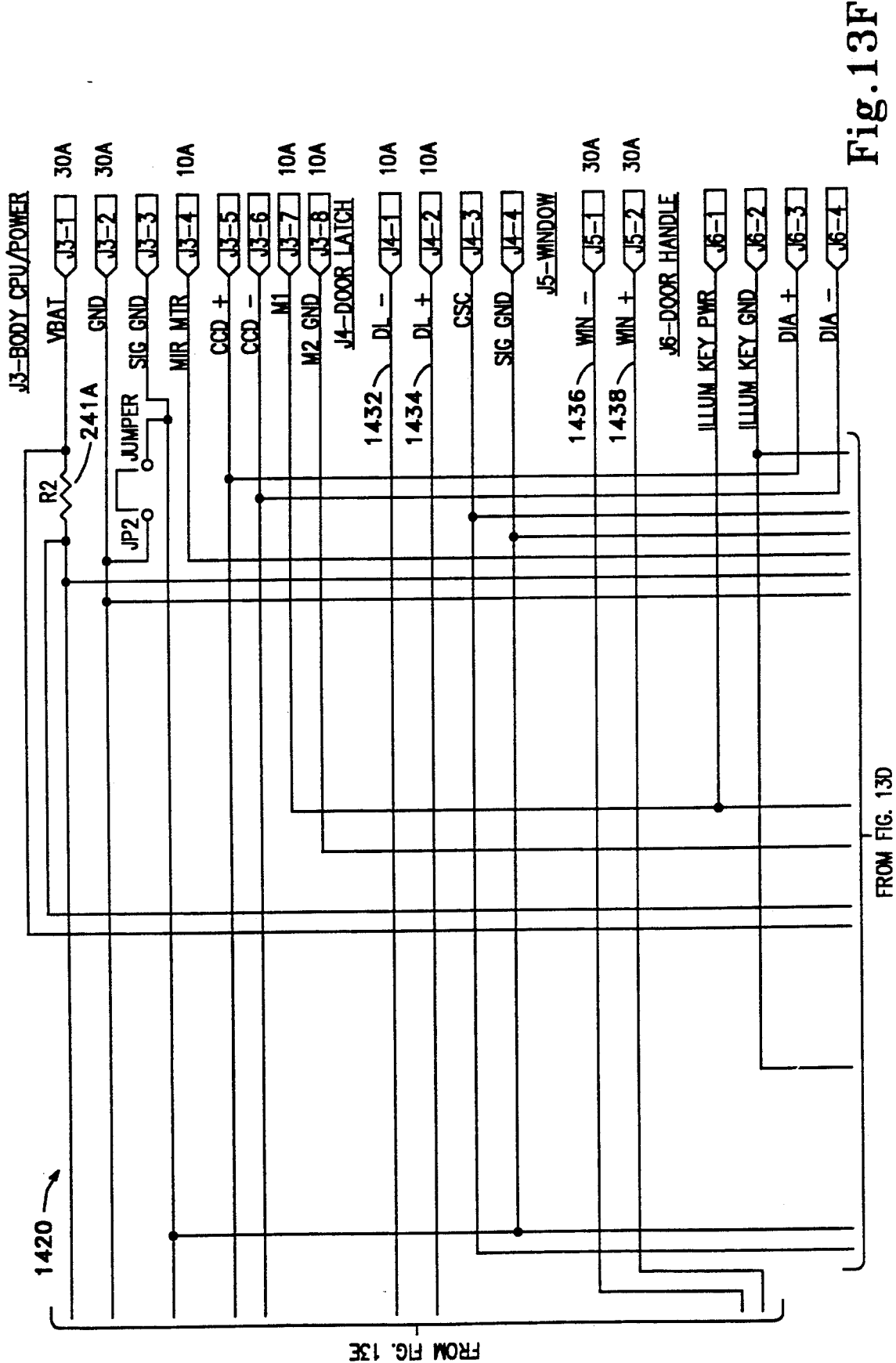

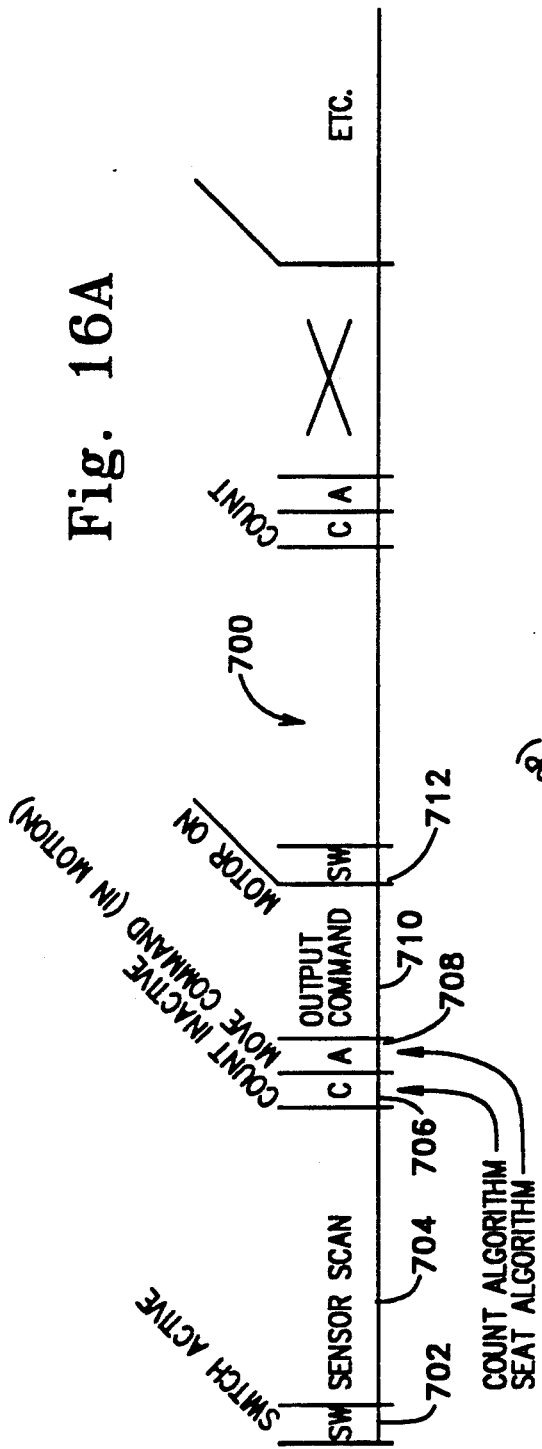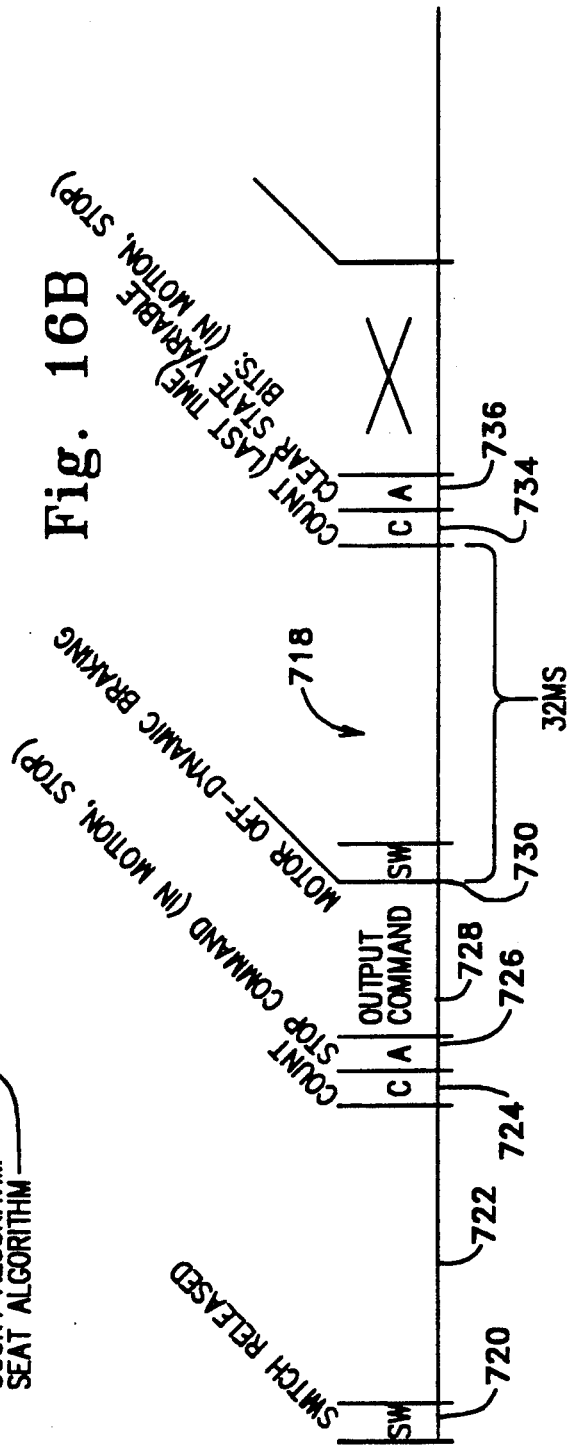

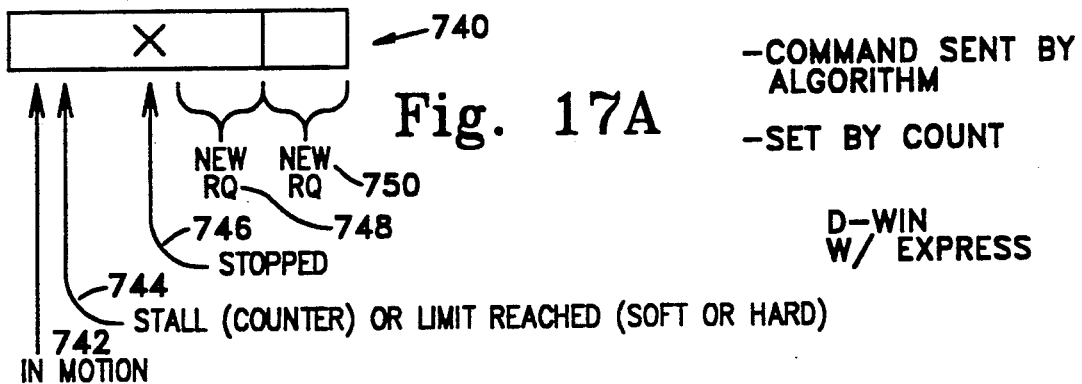
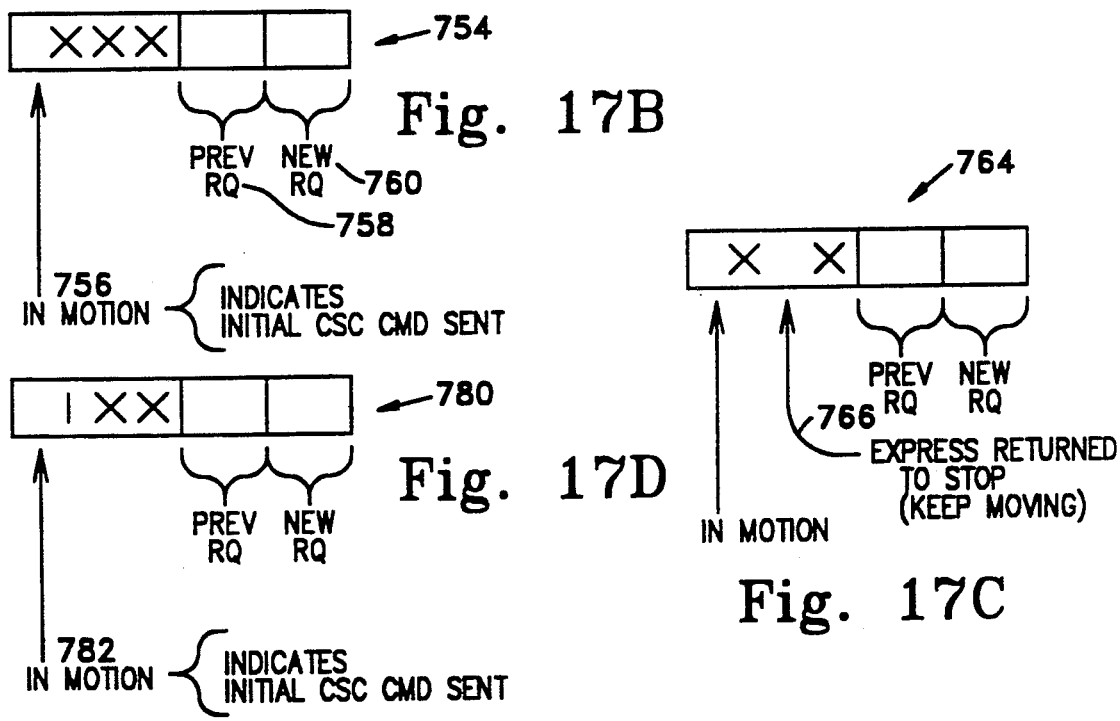
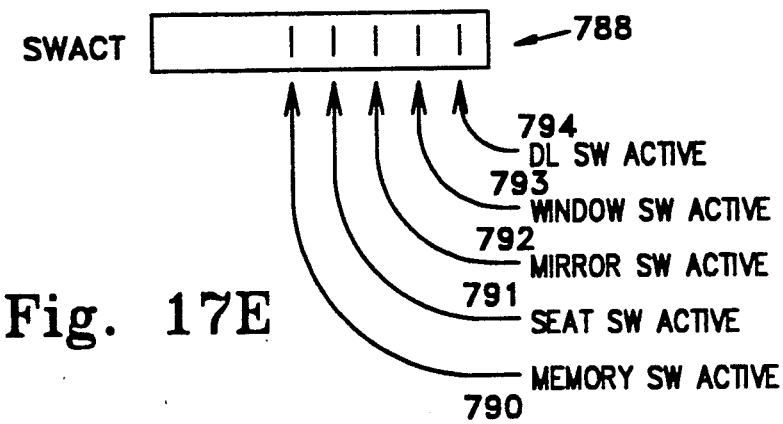

SEAT COMMAND ALGORITHM

AXIS COUNT ALGORITHM

TO FIG. 20B

SEAT MEMORY REQUEST PRIORITIZER

DRIVER WINDOW ALGORITHM

DRIVER DOOR LOCK PRIORITIZER

DOOR LOCK ALGORITHM

MIRROR HORIZONTAL MEMORY REQUEST GENERATOR

DRIVER MIRROR PRIORITIZER

DRIVER MIRROR ALGORITHM

MULTIPLEXING OF ACCESSORIES IN A VEHICLE

FIELD

The field of the invention is switches and associated controls for vehicles, for example, for mounting on the doors for controlling the operation of vehicle accessories such as windows, door locks, power seats, etc.

SUMMARY

One object is to provide a vehicular accessories control system using time-multiplex communications among components, comprising control switches, feedback sensors, and actuators, and in which switches are sequentially scanned, sensors are sequentially scanned, and actuators sequentially receive commands.

Another object of the invention is to provide a multiplex control system for use in vehicles for operating accessories such as power seats, and having an "asleep" mode in which the power consumption is relatively small and an "active" mode, and and "awake" mode in which most of the accessories are controllable.

Another object is to provide a multiplex control system which changes its mode from asleep, in which few inputs are scanned, to an active mode in which more inputs are scanned.

Another object is to provide a multiplex control system that automatically changes from an active mode to an asleep mode (of reduced power consumption and reduced scanning of system elements), following (within a specified time interval) the turning off of the vehicle's ignition switch.

Another object is to provide a system in which a computer is operative to disable the door locks if the key is in the ignition, the ignition switch is off, and a door is ajar.

Another object is to provide a control system having an "express down" switch to provide continuous actuation of a window lift motor, even after release of the switch, until the window is fully lowered, using multiplex communications.

Another object is to provide a control system in which switches are arranged in a matrix of data lines and scan lines and the switches are interrogated sequentially by identifying each switch of the matrix by (a) activating one scan line, and (b) simultaneously making one data line receptive, and in which false replies are prevented by disallowing data when a rectangular configuration of switches occurs in the matrix.

DESCRIPTION OF THE DRAWINGS

FIG. 1A, 1B, 1C and 1D are block diagrams of the entire multiplex door accessory control system.

FIG. 2 is a table showing messages which are sent and received from driver, passenger, and body computer equipment on a CCD bus.

FIG. 3A is a CSC bus address map of input signals to a door module.

FIG. 3B is a CSC bus address map for output signals of a door module.

FIG. 9A is a matrix of switches arranged by scan columns and data rows.

FIGS. 9C, 9D, 9E, and 9F together form a circuit diagram of an encoder for use with the switch matrix.

FIGS. 13C, 13D, 13E, and 13F together are a diagram of an output relay board with a current sensor.

FIG. 16A is a time line diagram of multiplex signals, related to control of power seats.

FIG. 16B is another time line diagram, showing time intervals related to multiplex signals for controlling power seats.

FIG. 17A is a map showing data components of a state variable for seat control.

FIG. 17B is a state variable diagram for door locks and windows.

FIG. 17C is a state variable diagram for a driver's window having express operation.

FIG. 17D is a diagram of a state variable for CCD bus and windows.

FIG. 17E is a diagram of a state variable registering which switches are active.

DESCRIPTION

Overview of System on Vehicle

Figure 1C:
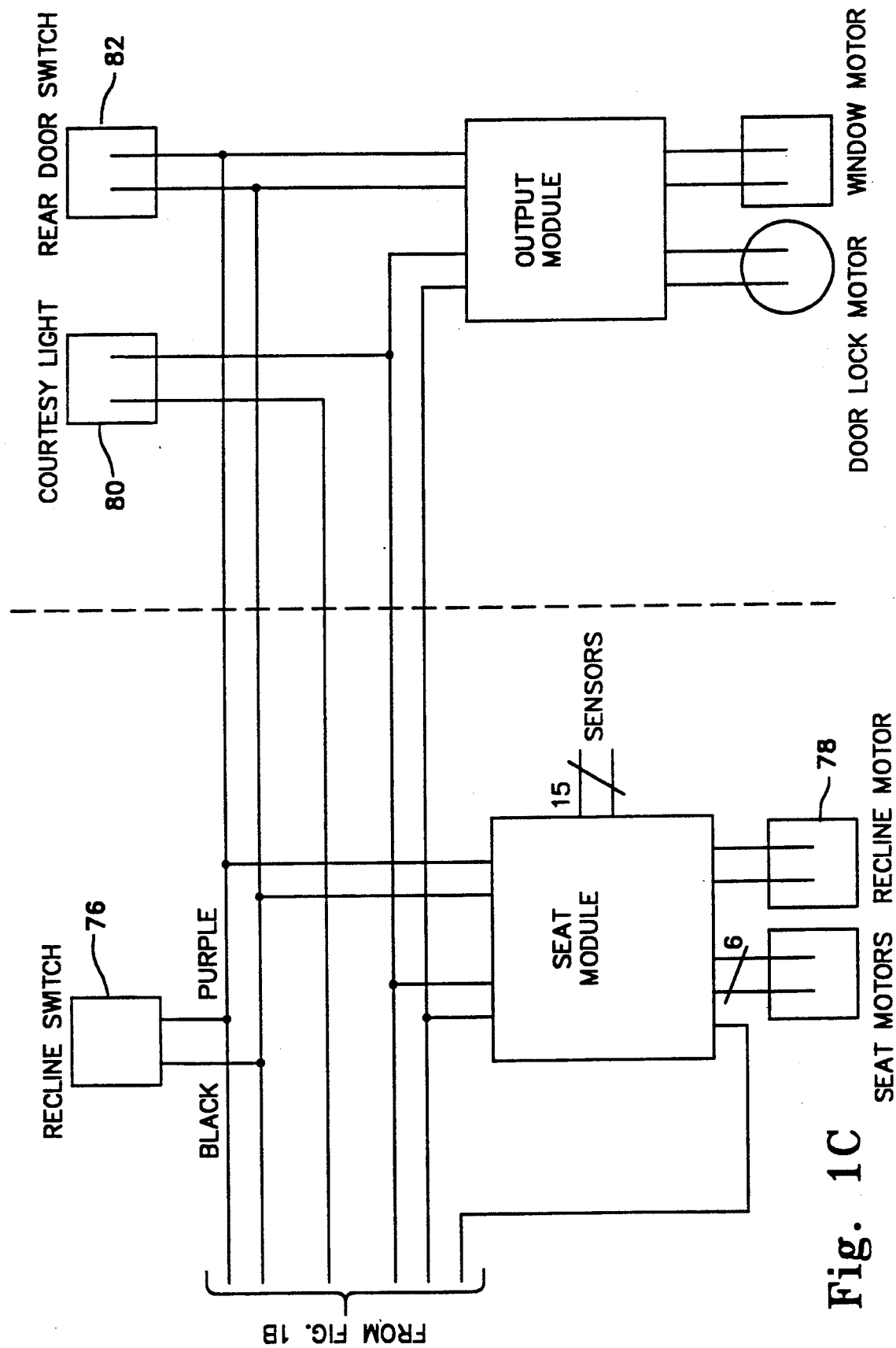

A preferred embodiment of the invention, indicated generally by reference numeral 2, is shown in FIG. 1A. A battery 4 is connected to a power bus 6, which has a fuse 8 for protecting the portion of the power bus on the right-hand side of the vehicle and a fuse 10 for protecting the portion on the driver's side. The vehicle also has a body computer 12 which is connected to a bus 14 (CCD). CCD is defined in an article entitled, "Detroit'88: Driver-Friendly Innovations" by R.K, Jurgen, IEEE Spectrum, Dec. 1987, pages 53-57. The bus 14 is connected to both a driver door module 16 and a passenger door module 18.

The driver door module 16 is connected to a CSC bus 20. The term CSC is defined and described in a Society of Automotive Engineers publication number SAE J2058 submitted for recognition as an American National Standard, and is available from the Society of Automotive Engineers, Inc., 400 Commonwealth Drive, Warrendale, Pa. 15096-0001. The CSC bus and remote sensor network of the preferred embodiment in that publication. Bus 20 carries signals of a group of sensors 22 at the driver'door, a pair of sensors 24 at the left rear door, output modules 26, 28 for controlling driver's seat motors, seat position feedback devices 30 for the driver's seat, and a left rear door output module 32.

A right CSC bus 34 provides communications among the passenger door module 18, a group of passenger door sensors 36, a pair of right rear door sensors 38, output modules 40, 42 at the right front door for powering seat position motors for the right front seat, and an output module 44 at the right rear door.

The driver door module 16 has electrical connections to a mirror 46, a left front window 48 and left front door lock 50. The left rear door output module 32 has connections to a left rear window 52 and a left rear door lock 54.

Similarly the right front door module 18 is connected electrically with a right mirror 56, a right front window 58, and a right front door lock 60. The right rear door output module 44 is connected to a right rear window 62 and a right rear door lock 64.

FIG. 1A shows that the vehicle has two almost—independent door systems or "nodes"—one for the driver side and one for the passenger side. This insures that a single-point failure (except battery) will not disable the entire accessories bus system.

Each front door contains a door module, which is the main controller for the system on its side of the vehicle. The door module scans all local switches, it monitors and controls all sensors and actuators on its CSC bus 20, 34, and it transmits information across the CCD bus 14 as required. The door module also sends commands over the CSC bus to output modules 26, 28 under the seat and in the rear door.

The system uses prior art switches and motors within the doors and seats but replaces the complex prior art wiring harnesses with a much simpler harness by adding multiplex electronics and power relays. This change also increases functionality and reliability.

Figure 1D:
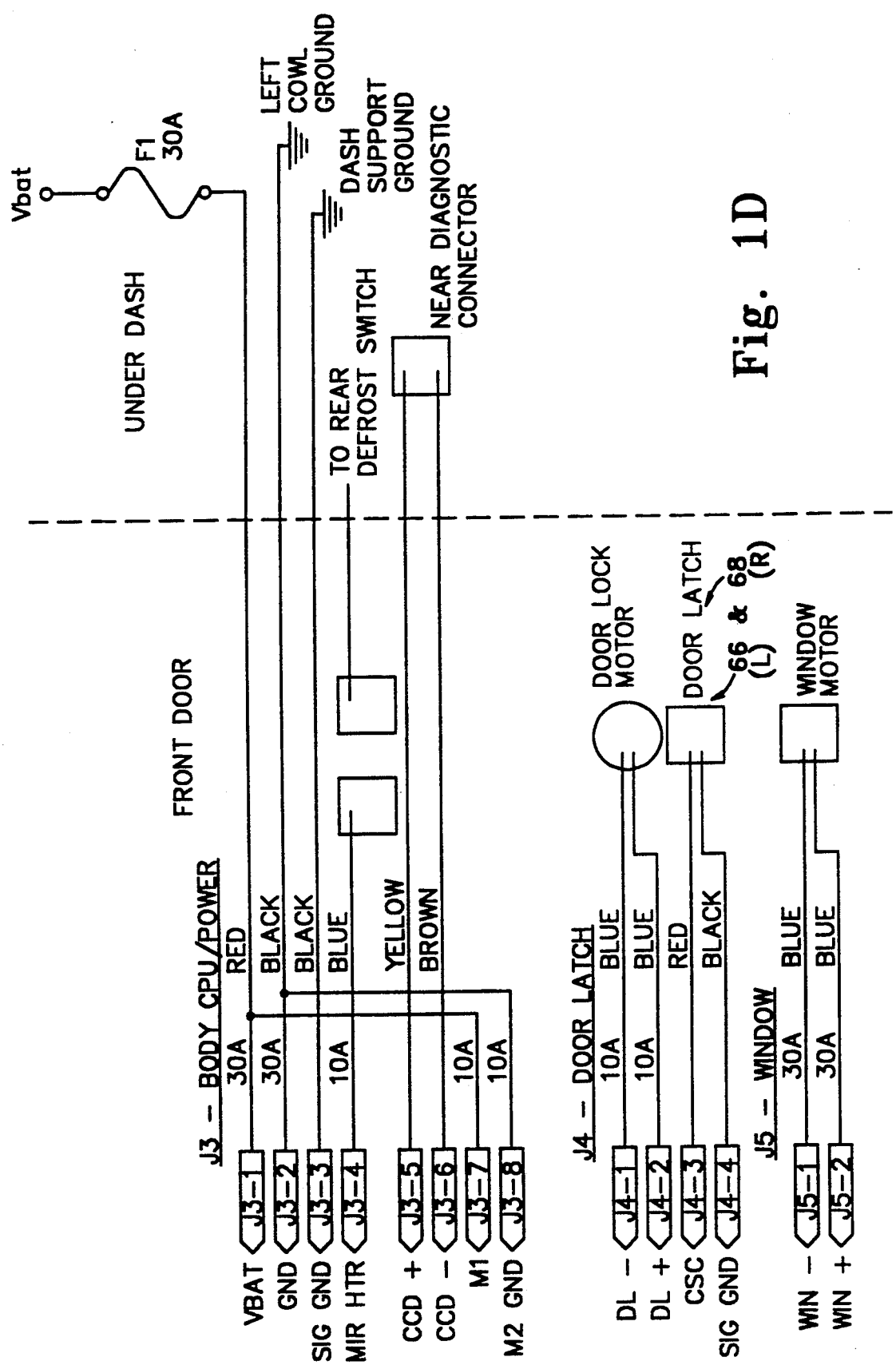

FIGS. 1B, 1C and 1D show that there are electrical connections to a door latch 66 for the driver's door and a door latch 68 for the right front door in addition to those for the door lock motors. Connections are also made to express can&el 70, door handle 72, and courtesy light 74. Express cancel 70 is a switch that serves as a window position sensor, which is actuated when a window is operated to a fully DOWN position. It stops the express DOWN operation of a window.

At the front seats there are also a recline switch 76 and a recline motor 78. At the rear door there are also a courtesy light 80 and rear door switches 82. FIG. 1C matches onto the right side of FIG. 1B.

Body Computer and its CCD Bus

The body computer 12 oversees a variety of miscellaneous features. The body computer also stores seat and mirror memory positions, and handles the key-in-ignition message. (In alternative embodiments these memories could be in the door module or elsewhere.) Another of the body computer's functions relates to CCD bus 4 voltage bias effects on the left-hand and right hand door modules, as to "asleep mode" and "awake mode", which are explained further below.

A table of FIG. 2 shows the messages handled by the CCD bus 14. The first column identifies the message; an asterisk indicates that the message is a reply to the immediately preceding message. The next two columns show which of the messages are sent by the driver door module 16 and which are received by it.

The next pair of columns tells which messages are sent and received by the passenger door module 18. The next pair of column indicates which messages are sent and received by the body computer 12, and a last column indicates the priorities of the various messages at the body computer.

The CCD bus 14 also has other messages such as ignition on, vehicle moving etc., FIG. 2. A theft alarm may be incorporated if desired.

Sensors and the CSC Bus

The left and right CSC buses 20, 34, respectively carry time-multiplexed signals. Each specific data or command signal has in address within a complete format of a cycle of signals. FIG. 3A is a list of the addresses for the various signals on the CSC buses 20, 34. Wake-up-type sensors, which are indicated with asterisks, also use address 1.

A similar map il in FIG. 3B, which is an address map for CSC bus signal outputs. The items having asterisks are presently localoutputs on the door module.

Driver Door Module, Overview

Figure 4A:
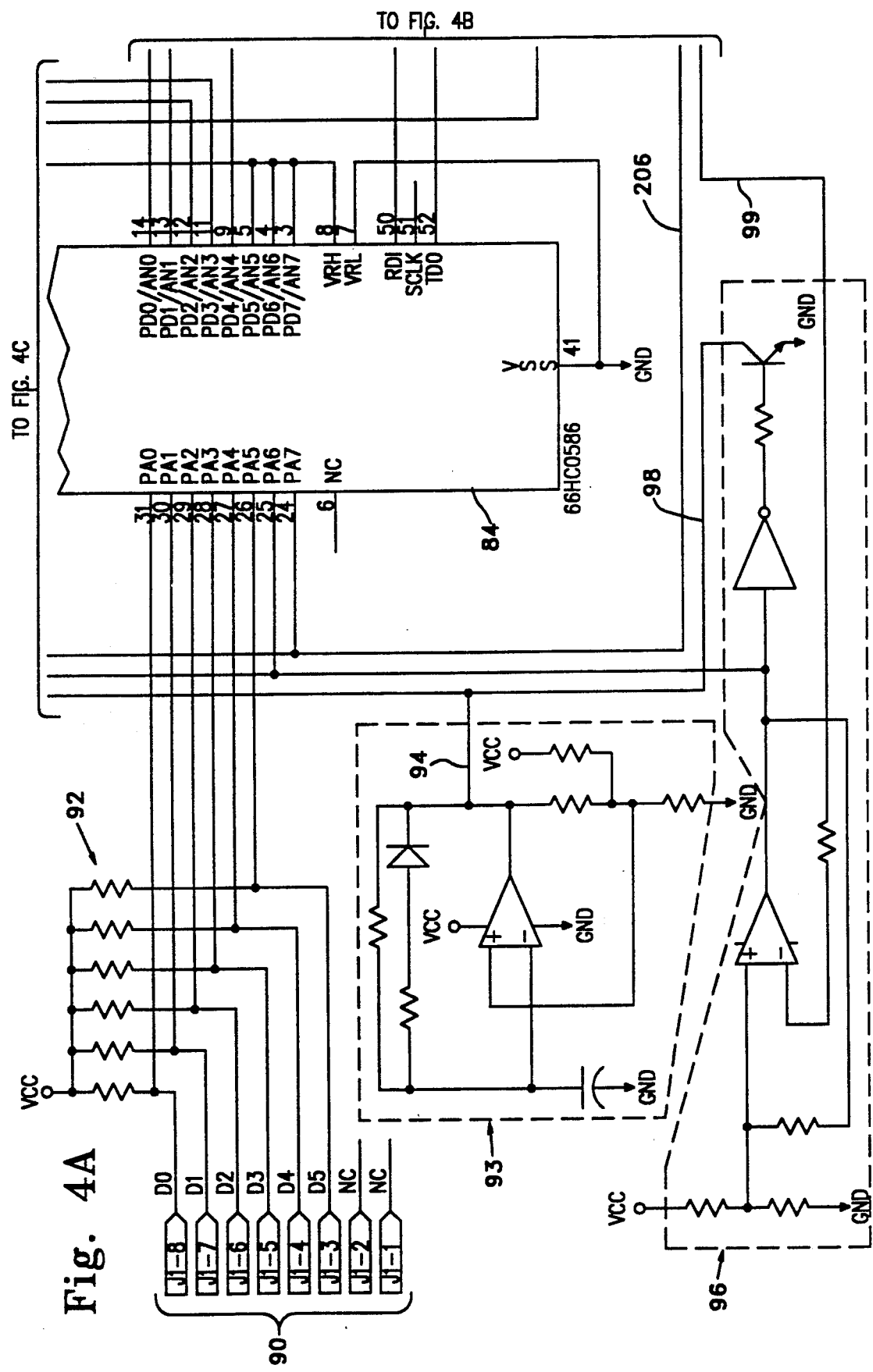
FIGS. 4A, 4B, 4C, and 4D are parts of a four-part diagram of a door module.
Figure 4B:
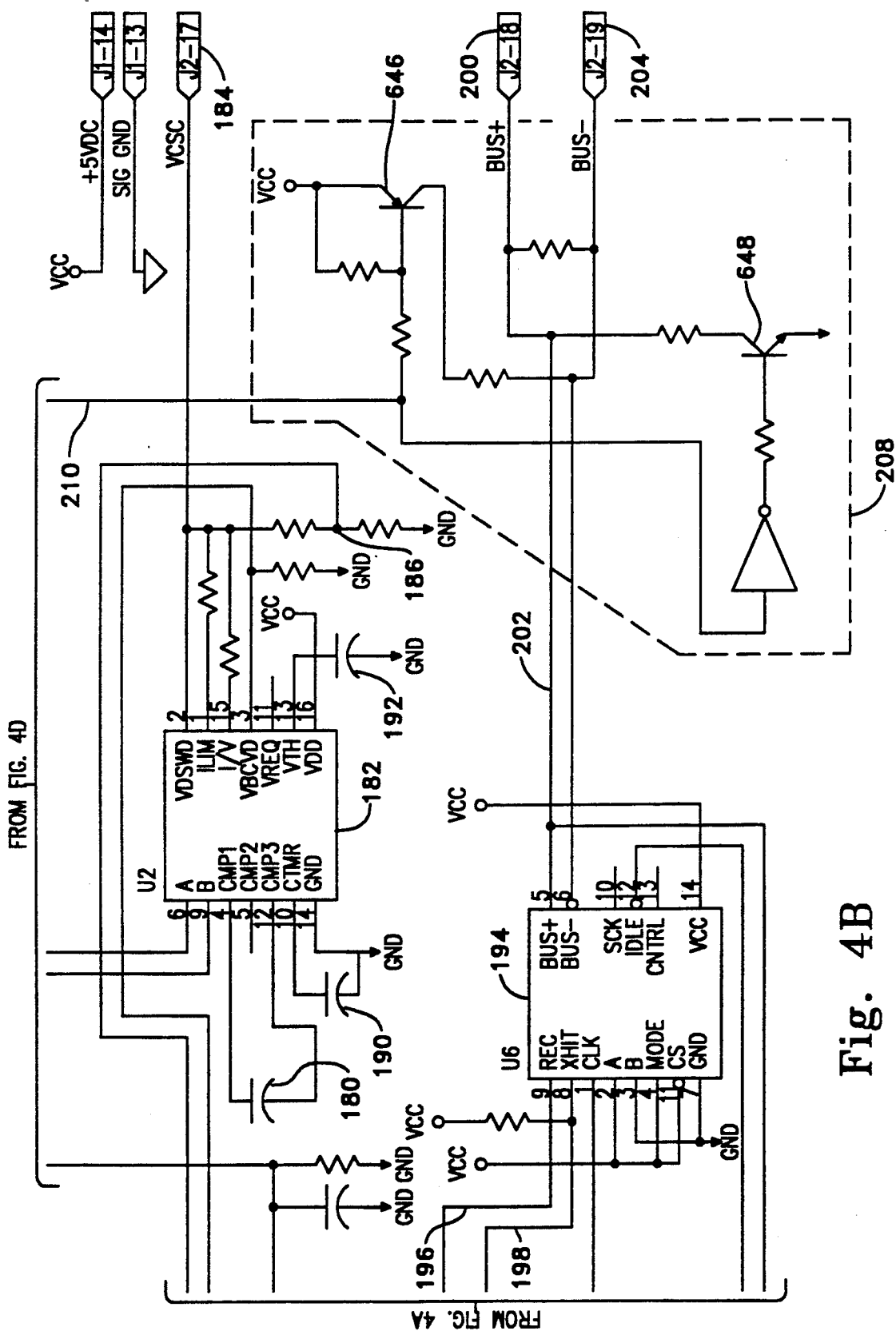

Major component of the driver door module 16 are shown in block diagram form in FIGS. 4A and 4B. The lines extending to the right side of FIG. 4A connect to the lines at the left side of FIG. 4B to form a complete diagram.

Figure 4C:
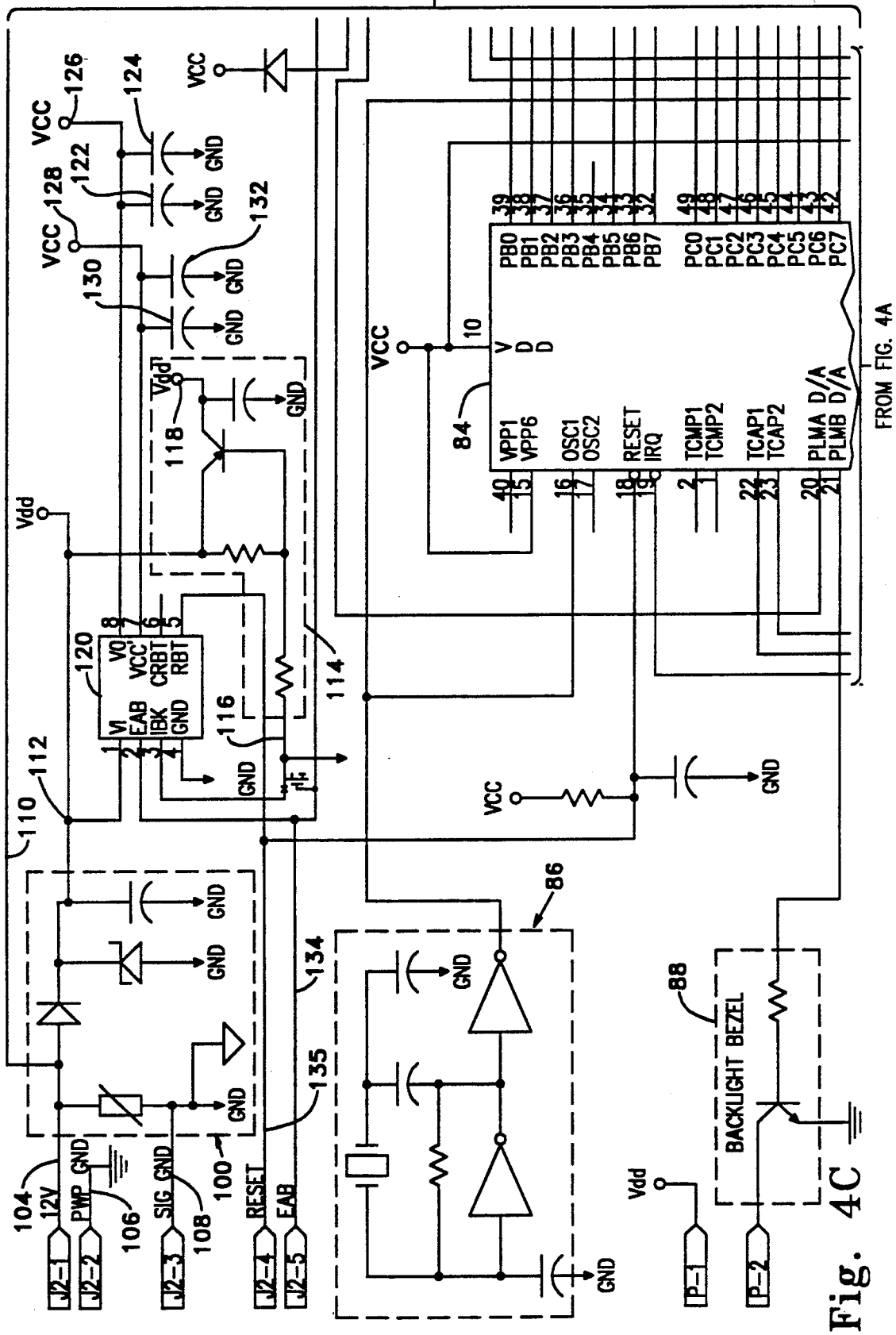

Block 84 is a G/RCA Model 68C05B6 microcomputer. A 4 MHz crystal-controlled oscillator 86 has its output connected to pin OSC1 of microcomputer 84. Block 88 on the left side of FIG. 4C is a semiconductor amplifier for controlling the backlighting of a switch bezel. Block 88 is connected to terminal PLMB D/A of block 84, from which block 88 receives its control signal.

A group 90 of terminals at the left of FIG. 4A connects to switched whose signals are conducted to terminals PA0-PA5 of microcomputer 84. Resistors that are generally indicated by 92 are merely voltage pull-up resistors for the switch matrix signals that terminals 90 receive. Four output lines from the microcomputer 84 are connected to terminals 136, 138, 140, 142, which are scan terminals for scanning of a switch matrix described below.

A block 93 represents a timer, (i.e., oscillator) that produces an output pulse each 100 milliseconds at its output terminal 94, which connects to a terminal IRQ of the microcomputer 84.

The pulse output at terminal 94 is also connected to a circuit block 96, whose function is to detect a voltage bias on the CCD communication bus 14 (FIG. 1). An output line 98 of block 96 is occasionally short-circuited to ground by block 96, depending upon the presence or absence of bias on the bus 14. A terminal 99 on block 96 senses the bus 14 positive voltage. When terminal 98 is short-circuited to ground no pulse signal from the block 93 is input to the terminal IRQ of microcomputer 84.

Power supply circuits are shown at the top of FIG. 4C; they include a block 100, which provides input voltage protection. Block 100 includes a terminal 104, for (typically) 12-volt power, a power ground connection terminal 106, and a signal ground connection terminal 108. One of its outputs is a relatively unfiltered 12 volts at a terminal 110 that is used to drive relays. Its other output is a filtered but unregulated 12 volts at a terminal 112, which is labeled Vdd.

A block 114 is also connected to the 12-volt terminal 112. Block 114 contains a semiconductor switch which can be turned on and off by a signal at a control input terminal 116. An output terminal 118 from block 114 is another 12-volt Power supply terminal, labeled Vdd'. It is switched off to conserve power at certain times.

A conventional voltage regulator 120 receives 12-volt power at its terminal VI from the terminal 112. One output terminal of the low-power voltage regulator 120 is its terminal VO. It provides regulated 5-volt power, which is filtered by two shunt capacitors 122, 124, and has a load terminal 126 labeled Vcc.

Another output from the regulator 120 is at a terminal 128 labeled V$_{cc}$'. It is a 5-volt switchable line whose voltage be turned on and off inside the block 120. Shunt 130, 132 provide additional filtering for Vcc' both fast and slow noise transients.

The voltage regulator block 120 also has set and reset terminals EAB]RST which are connected to set and reset terminals of the microcomputer 84 and to set and reset connector pins 134, 135 at the left side of FIG. 4C. They switch Vcc' on and off.

Figure 4D:
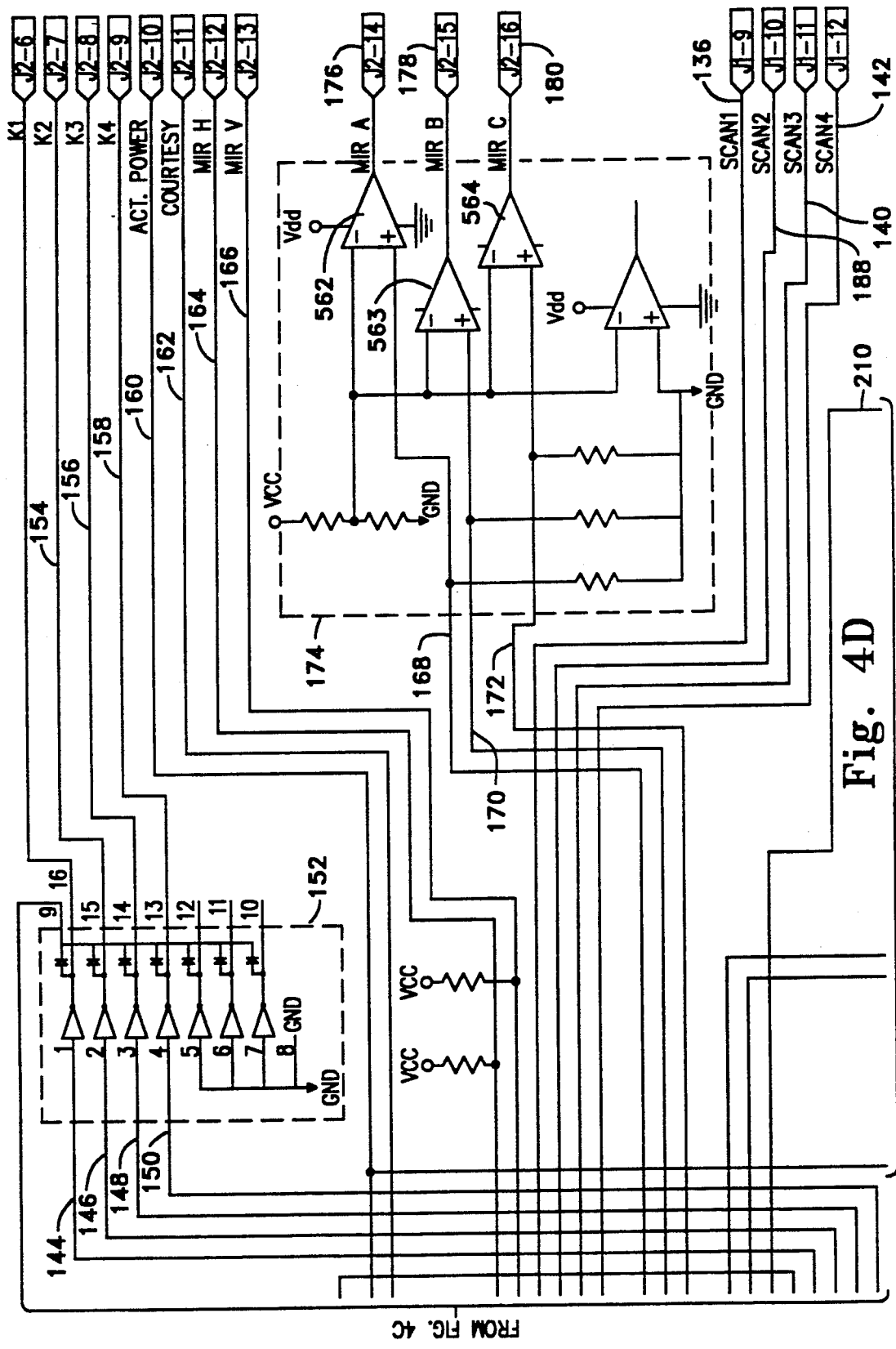

Four output terminals of microcomputer 84 are connected to input terminals 144, 146, 148, 150 of a block 152, at the tip of FIG. 4D, which contains four relay drivers. Their outputs connect to connector pins 154, 156, 158, 160, which connect to relays on a daughter board located in the driver door module 16.

Another output from the microcomputer 84 is at terminal PLMA D/A. This is a digital-to-analog converter output that provides a variable analog voltage at a terminal 162 of FIG. 4D. The courtesy lights for variably illuminating the interior of the vehicle are controlled by the voltage on terminal 162.

Two inputs of microcomputer 84 are PD2/AN2 and PD3/AN3. They are connected to terminals 164 and 166, respectively of FIG. 4D. The voltage on terminal 164 is a feedback signal indicating the horizontal position of the mirror and the voltage on terminal 166 indicates the vertical position.

Terminals PB5, PB6 and PB7 of microcomputer 84 are outputs that connect to terminals 168, 170 and 172 of a block 174. Block 174 contains three power amplifiers 562, 563, 564 for driving the mirror motors. Block 174 has three outputs, at connector pins 176, 178 and 180. They are connected to the two mirror motors, each of which controls one axis of mirror movement.

An output from the microcomputer 84 to an amplifier block 88 at the left of FIG. 4C is a digital-to-analog converter output that permits a variable intensity of backlighting at a switch bezel.

FIG. 4B shows a block 182, which is a communication chip for communicating with the CSC bus 20; the chip is a Model CS8005, manufactured by Cherry Electrical Products, 3600 Sunset Ave., Waukegan, IL. An output line from block 182 connects to a connector terminal 184, which in turn is connected to the CSC bus 20.

On FIG. 4B, transistors 646 and 648 (in block 208) enable bias on the CCD bus 14; a comparator in block 96 of FIG. 4A is used to detect CCD bus bias.

The circuit of block 93 (FIG. 4A) generates a pulse every 100 mS. This pulse is used as part of a wake-up procedure for the microcontroller 84 when the multiplex door system is asleep. The INT/ line on the microcontroller 84 is used to wake up the bus interface chip due to either the 100 mS timer or bias detect. IDLE detect from the CCD chip 194 (GE/RCA Model 4374040) is routed to interrupt input TCAP2 of the microcomputer 84.

The CSC bus driver chip 182 is used to access remote sensors and output modules. It provides a signal to the internal analog-to-digital converter 224 for reading sensor data and output status from the CSC bus 20. Two other A/D inputs are used for reading the local mirror positions. The L272M solid state output drivers 562-564, FIG. 4D, are used to drive the local mirror motors. The window and door lock motors are driven by relays on the relay board. These relays are driven by the ULN2003 relay driver's 152.

An on-board regulator provides filtered 5 volt power for the microcontroller 84. A switched 5-volt line Vcc; 128 is used to reduce power by turning off the CCD chip 194. A switched 12-volt line Vdd, 718. FIG. 4C is used to reduce power by turning off the mirror drivers 174.

Two conductors connect carry binary data from terminals PC0 and PC1 of microcomputer 84 to terminals A and B of the communication chip 182. The CSC bus receives a binary data stream of 6 volt and 9 volt levels for sensors, or a stream of 6 volt and 3 volt levels for output modules. (Zero is a reset state.)

Two other terminals PD0/AN0 and PD1/AN1 of the microcomputer 84 are connected respectively to point 186 and to communication chip terminal VBCVD, to measure voltage pull-down that is indicative of current drawn by input and output devices on the CSC bus. Capacitors 188, 190 and 192 are time controls for the chip 182.

The CCD bus 14 of FIG. 1 communicates with the driver door module 16 by means of a communications chip 194 which is shown in FIG. 4B. It is an RCA model 4374040 integrated circuit device. The chip 194 receives a clock signal at its terminal CLK from the oscillator 86 of FIG. 4A.

At terminal REC of chip 194 a line 196 connects to a terminal RDI of microcomputer 84 to provide input signals to microcomputer 84 from the CCD bus 14. At a terminal XMIT of the chip 194 a line 198 connects to a terminal TDO of microcomputer 84 for communicating output signals from microcomputer 84 to the CCD bus 14.

The positive CCD bus 14 connects to the chip 194 from a connector terminal 200 on a line 202, at the right of FIG. 4B. Similarly the negative line of bus 14, which is connected to a terminal 204 of FIG. 4B is conducted to a negative bus terminal of the CCD communication chip 194.

A line 206 leads from a terminal "IDLE" of the CCD communication chip 194 to terminals PA7 and TCAP2 of the microcomputer 84. It provides a "busy signal" for the CCD bus, to indicate when it is and isn't available.

A block 208 provides bias to the CCD bus 14, via the connector terminals 200 and 204 (FIG. 4B, lower right). This is accomplished under the control of a conductor 210 that runs to the block 208 from to a terminal PC2 of the microcomputer 84. When line 210 has a positive voltage, internal transistors of block 208 stop conduction of their collector-to-emitter circuits, thereby controlling the bias on bus 14.

Microcomputer

Figure 5:
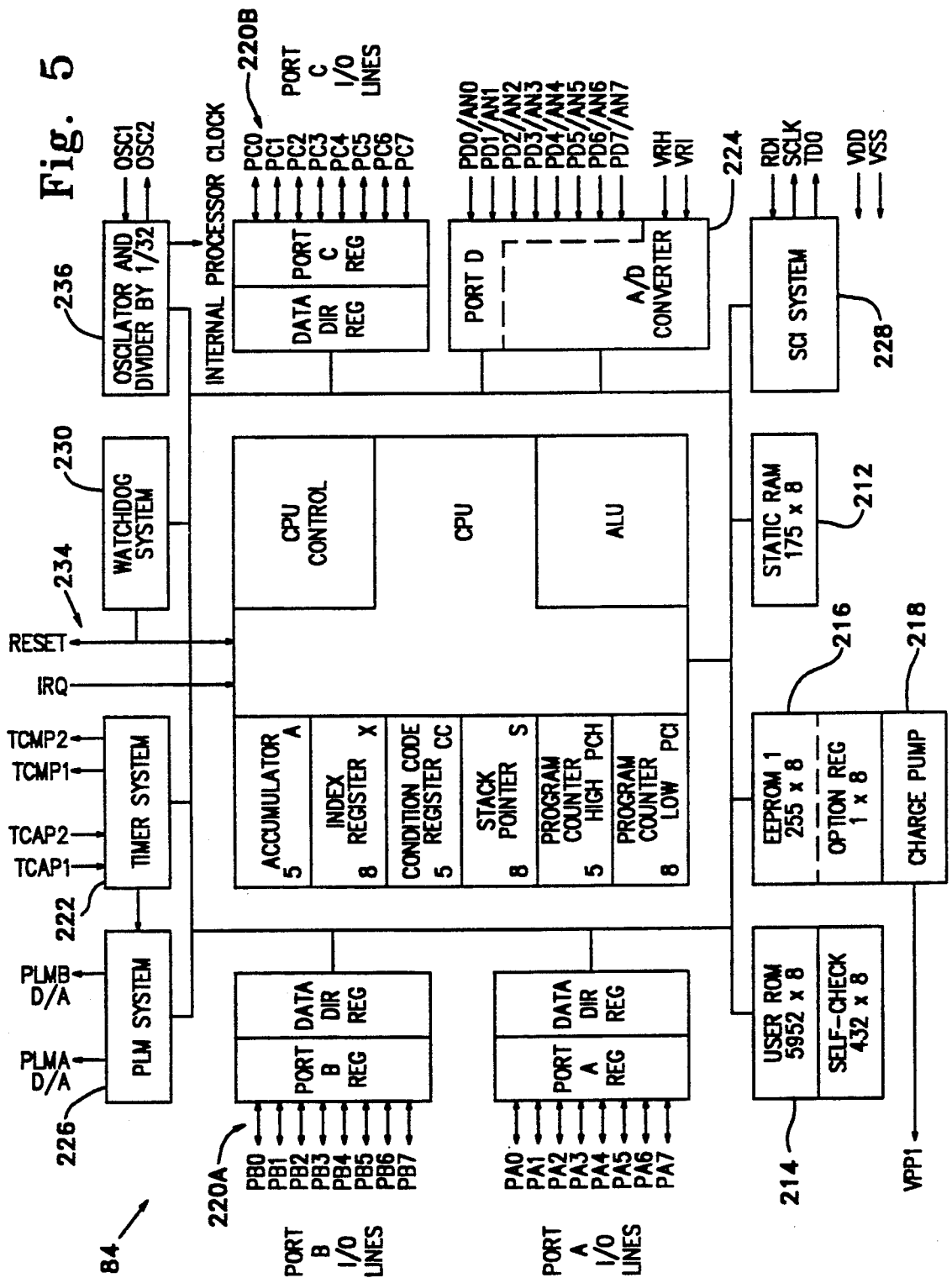
FIG. 5 is a block diagram of a microcomputer employed in a door module.

A principle component of the driver door module 16 is the microcomputer, indicated generally by 84 in FIG. 5. Although it is a commercially available product that is thoroughly documented in publicly available literature, a brief explanation of its architecture is necessary here for convenience in describing the multiplex door module system.

The microcomputer is a GE/RCA/Intersil Semiconductor Model MC68HC05B6. It is an 8-bit type having; power-saving stop and wait modes of operation; 176 bytes of on-chip RAM 212; 5952 bytes of on-chip ROM 214; 256 bytes of byte-erasable EEPROM 216; internal charge pump for 256 bytes of EEPROM 218; write/erase protect bit for 224 of the 256 bytes EEPROM; security bit for EEPROM contents, 32 bi-direction I/O lines; 2.1 MHz internal operating frequency at 5 volts, 1.0 MHz at 3 volts; internal 16-bit timer; serial communications interface 238; 8-channel A/D converter 224; two pulse-length modulation systems (D/A 226); external, timer and serial communication interface interrupts 228; watchdog counter 230; output of internal E-clock software option; external interrupt enable; power "ON" and external reset 234; POR bit allowing the user to distinguish power on from external reset; single three- to six-volt supply; and on-chip crystal oscillator 236, all in a 52-pin plastic leaded chip carrier (PLCC) package.

Modes of Operation

The door module 16 has three modes of operation. When there is no voltage bias on the CCD bus 14 and there are no switches, sensors, or outputs active, and the ignition switch is off, the module goes into a reset connector pin 134, 135 at the left side of FIG. low-power "asleep" mode. In this mode, the microcomputer 84 turns off the auxiliary power and executes a STOP instruction. Only the microcomputer 84, the CSC communication chip 182, the external oscillator 86 and the external 100 mS interrupt timer 92 remain powered.

When the microcontroller 84 receives an external timer interrupt, it performs a scan of the local switches and critical sensors (e.g. door ajar) to see whether any are active. If a switch is pressed or a sensor is active or bus bias becomes present, the module and goes into an "active" mode. In this mode, it scans all switches and sensors continuously and acts on the results. This includes activating outputs or transmitting across the CCD bus 14. When all activity is completed, the module 84 powers down and returns to the "asleep" mode.

Note that the windows are not enabled in the active mode. If the CCD bus 14 is externally biased during the active mode and an ignition "ON" message (generated by the body computer) is received, the door module 16 goes into an "awake" mode. This mode is just like the active mode, except that the window functions are enabled; and, when there is no activity, the module does not go to sleep. When an ignition "OFF" message is received over the CCD bus 14, the module 16 activates a 25-second awake timer. During this time, the windows can still be moved to a desired position. After 25 seconds the module returns to the active mode and the windows are disabled.

Car Mainline Program

Figure 6A:
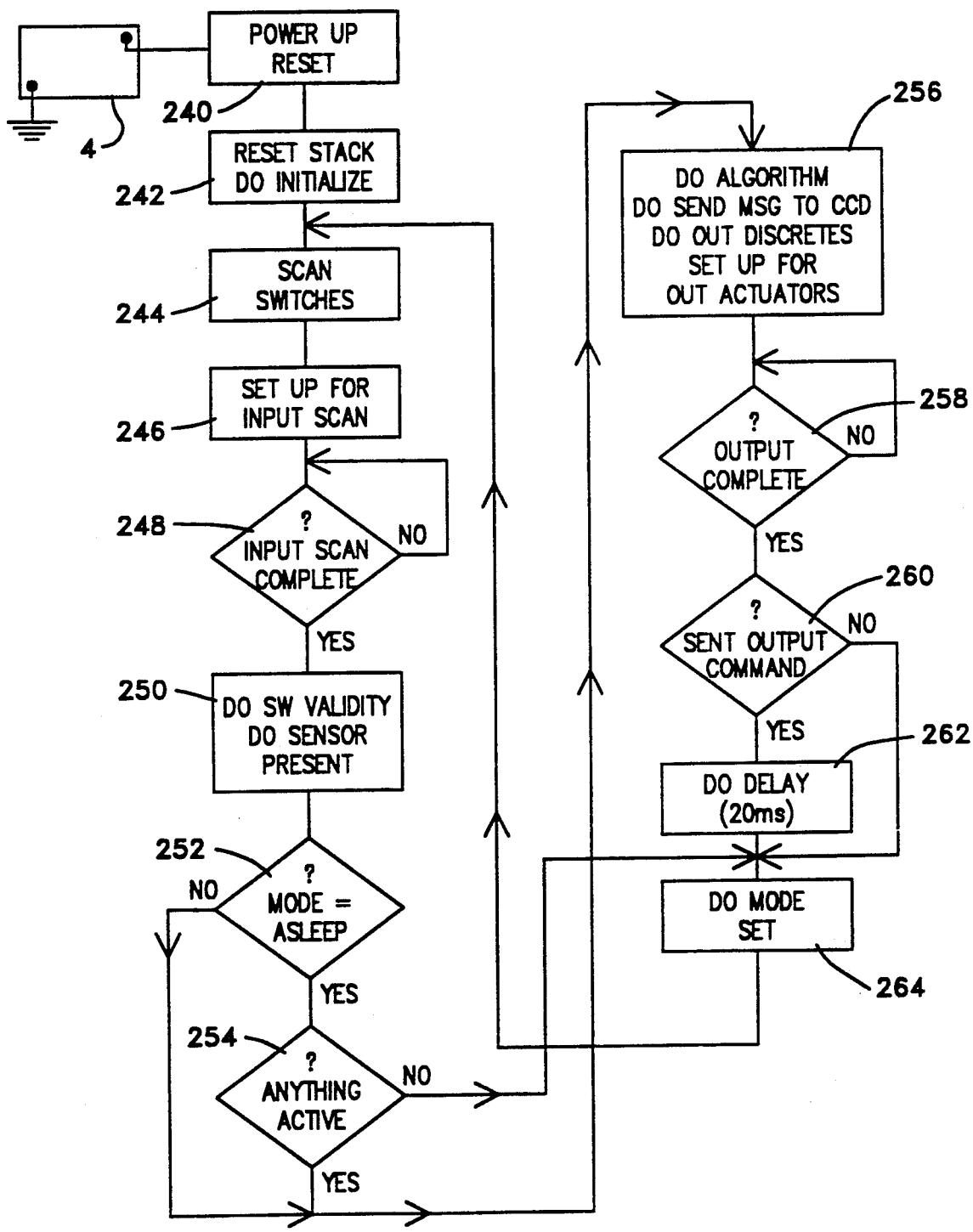
FIG. 6A is a diagram of steps in a method controlling the mainline operation of the multiplex system.

A car mainline program flow chart of FIG. 6A starts with power up and reset at block 240. The next step is to reset the stack and do initialization at block 242. The status of the switches is then scanned in 244, as is explained in greater detail below. Block 246 sets up for input (sensor) scanning. 248 queries whether the input scanning is complete, and 250 checks for switch validity and for the presence or absence of sensors.

At block 252 the mode status is checked to ascertain whether or not the system is in the asleep mode. If it is, a query is made (254) as to whether anything is active. If anything is active or the system is not in the asleep mode, the next step is to do the algorithms of block 256. The subroutine of block 256 also involves sending a message to the CCD bus 14, doing the output discretes, and set up for the output actuators.

Testing occurs at block 258 as to whether or not the outputs are complete. When they are complete, output commands are sent, block 260, to the CSC bus. When the commands have been sent, a delay is provided at block 262. This 20-mS delay is to prevent reaction noises, for example motor noises, from affecting reading of the input sensors.

After the delay of 262, or if the output command was not sent at block 260, or if nothing was found active by block 254 above, the system does a mode set at block 264.

Current Sensor

Figure 6B:
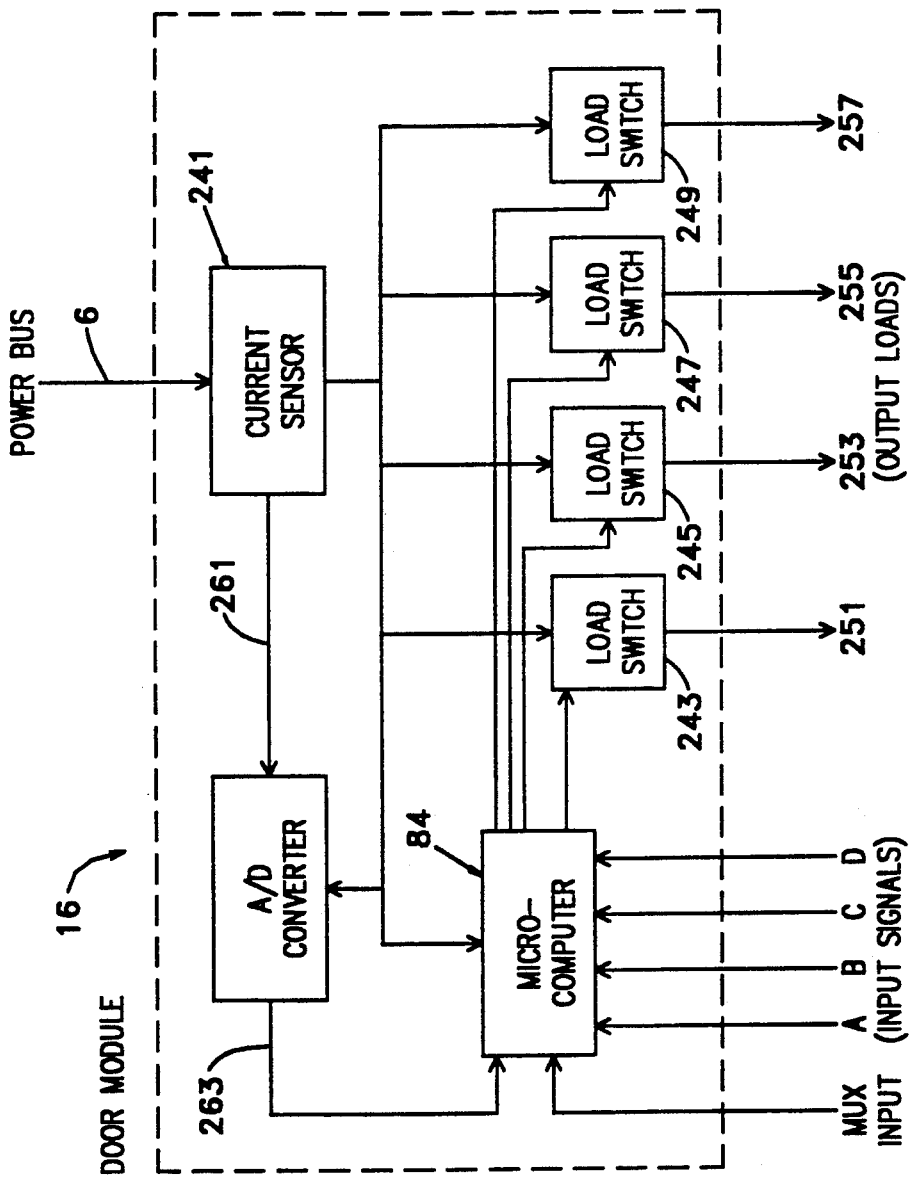
FIG. 6B is a simplified block diagram of power portions of the multiplex door accessory control system.

FIG. 6B is a simplified block diagram of selected portions of door module 16. It shows the vehicle's power bus (6) connecting to a current sensor (241) and within the door module. Main power flows out from the current sensor (241) to a microcomputer (84) and several load switches (243, 245, 247, and 249). The load switches control various output loads at terminals (251, 253, 255 and 257). The power output of the current sensor (241) connects also to an A/D converter, to provide power to it.

The current sensor also has an output line (261) which provides analog data to the A/D converter. The A/D converter provides a digital output signal at a line (263) which is input to the microcontroller (84). The current sensor, together with the A/D converter and the microcomputer, can ascertain when an output load, such as a motor is in a stalled condition because the current sensor then provides a much greater output signal at 261 than under normal load conditions. The microcomputer (84) compares the signal at line (263) with a threshold level and recognizes a stalled condition of a load motor. A stalled condition is one in which a motor is electrically powered to operate but is unable to operate because it is mechanically blocked.

If desired the current sensor 241 can also be used to shed overloads by initiating the tripping of output switching, thereby making fuses 8 and 10 unnecessary.

Door Module Scan

Figure 7A:
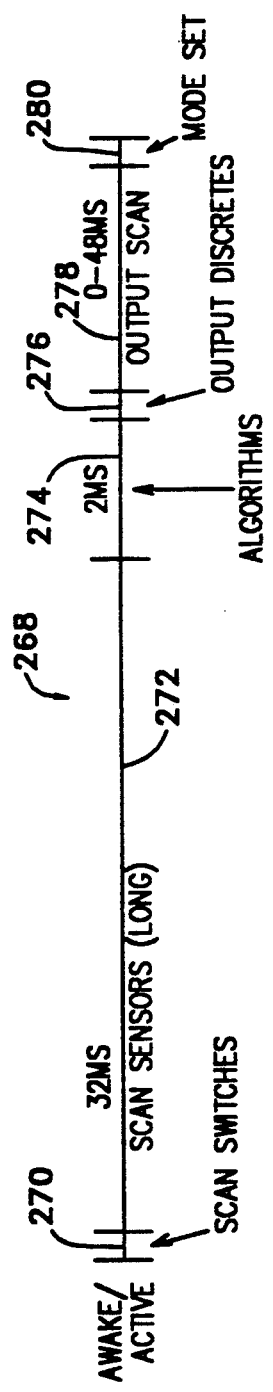
FIG. 7A is a time line diagram showing door module scanning in awake mode and active mode of operation.
Figure 7B:
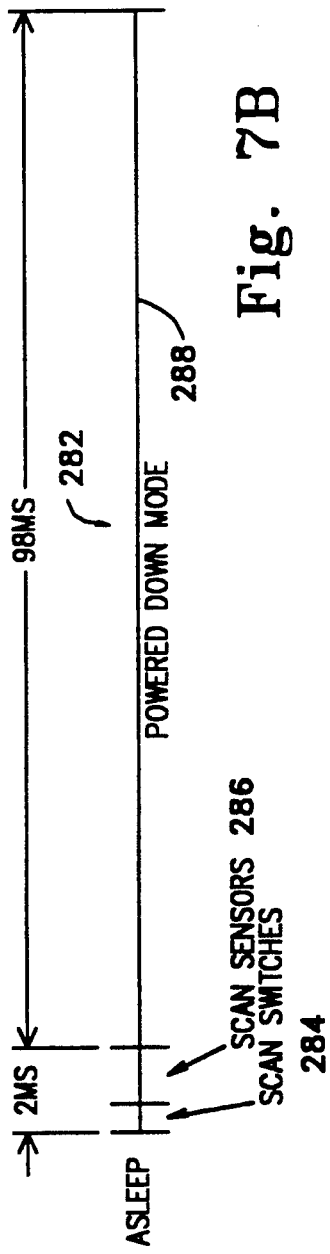
FIG. 7B is a time line diagram showing door module scanning when the system is in the asleep mode.

The timing diaphragms of FIGS. 7A and 7B make the car mainline flow chart of FIG. 6A clearer. In the awake mode and active mode, a time line indicated generally as 268 in FIG. 7A starts with a brief interval 270 in which the switches are scanned. This corresponds to block 244 of FIG. 6A.

Thereafter, the input sensors are scanned during a 32-mS interval 272. The algorithms are performed in a 2-mS interval 274 and the output discretes are handled in an interval 276. They include sending CCD messages. Outputs are sent to the other door module, mirrors, doorlocks etc. (see block 256 of FIG. 6A). Duration of the output scanning interval 278 ranges from 0 to 48 mS. It corresponds to block 260 of FIG. 6A.

A mode-set interval 280 corresponds to block 264 of FIG. 6A. The total scan time in the awake and active modes is 34 mS to 82 mS. To summarize FIG. 7A, 32 milliseconds of this door module scan time is for the CSC bus sensor scan; the remaining few milliseconds are used to scan the local switches, validate the switch inputs, determine which outputs need to be changed (algorithms) and to set local outputs.

In the asleep mode, a time line 282 for door module scanning is shown in FIG. 7B. The switches are scanned in a time interval 284. Thereafter, a short scan of a few certain sensors occurs in a time interval 286. This is followed by a long powered-down mode interval 288. The total scanning requires only about 2 mS and occurs once each 100 mS. All three modes including asleep are shown in FIG. 6A.

If the door module requires that a command be sent to a remote CSC output module, 12 mS per command is added to the scan time. In addition, a 20-mS delay is appended to the end of any scan within a command sequence to prevent the next input sensor scan from being affected by the switching-on of motors.

CCD messages are handled by interrupts in the background mode. At the end of each scan the operating mode of the door module is reevaluated.

The switch scan routine strobes each of the columns of a switch matrix and records the raw switch data. A switch validity routine assures that no illegal combinations exist when the algorithms are run.

Switches

Figures 8A, 8B:
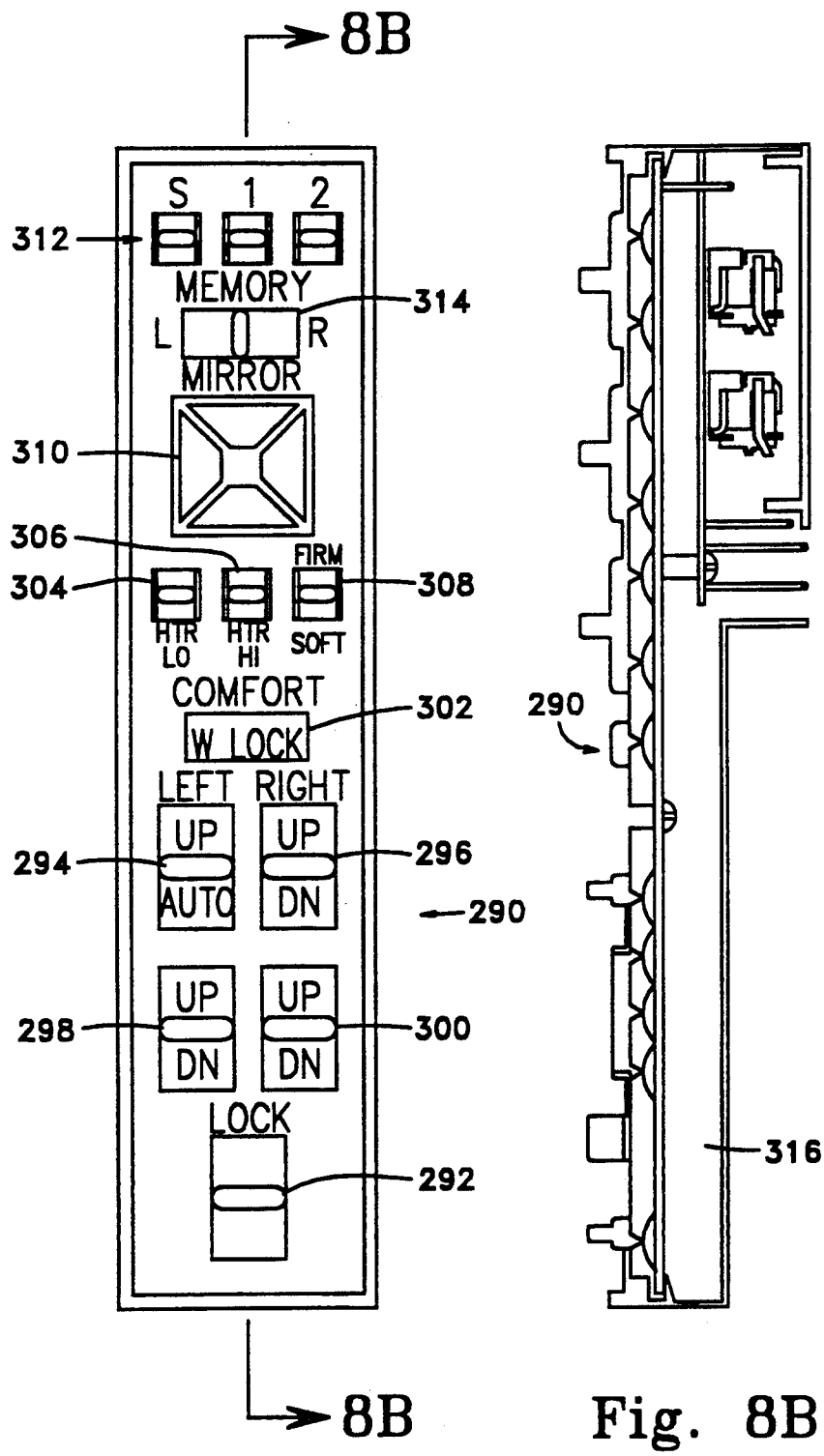
FIG. 8A is top view of the switches of the driver door module.
FIG. 8B is a cutaway side view of the switches of the drivers' door module. Note that FIG. 8B is viewed from the left side of FIG. 8A.
Figure 8C:
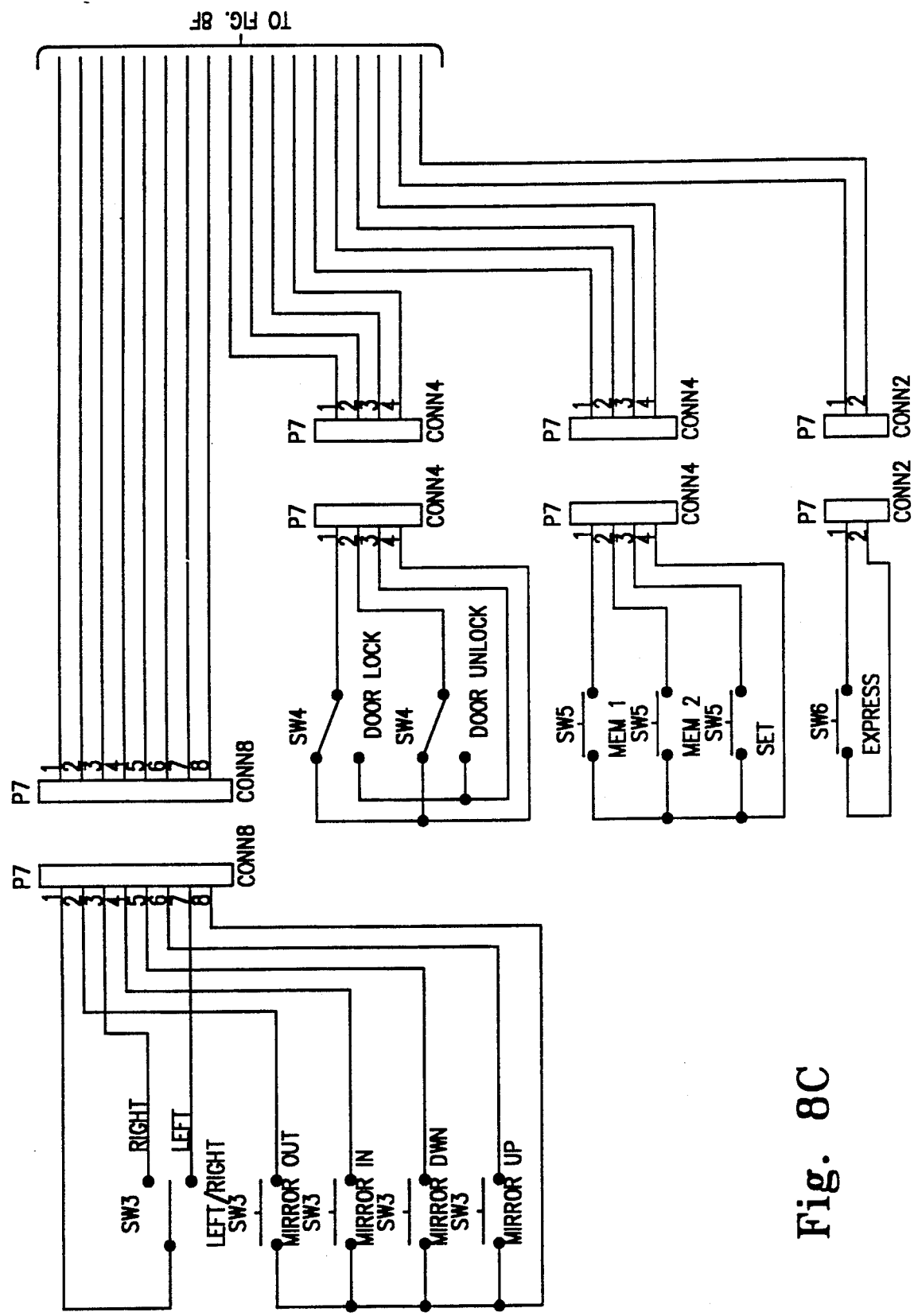
FIG. 8C is a switch harness.
Figure 8D:
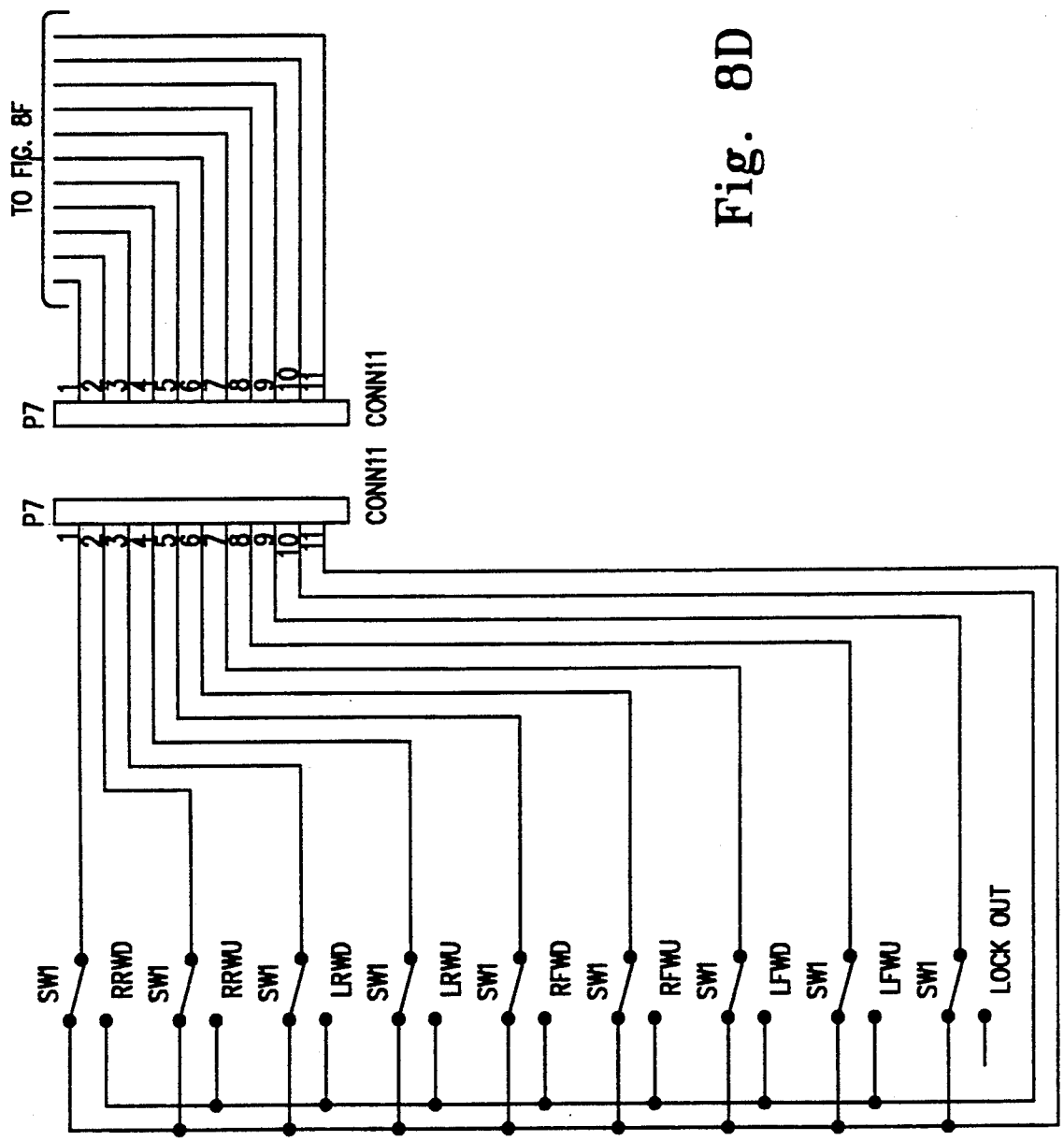
Figure 8F:
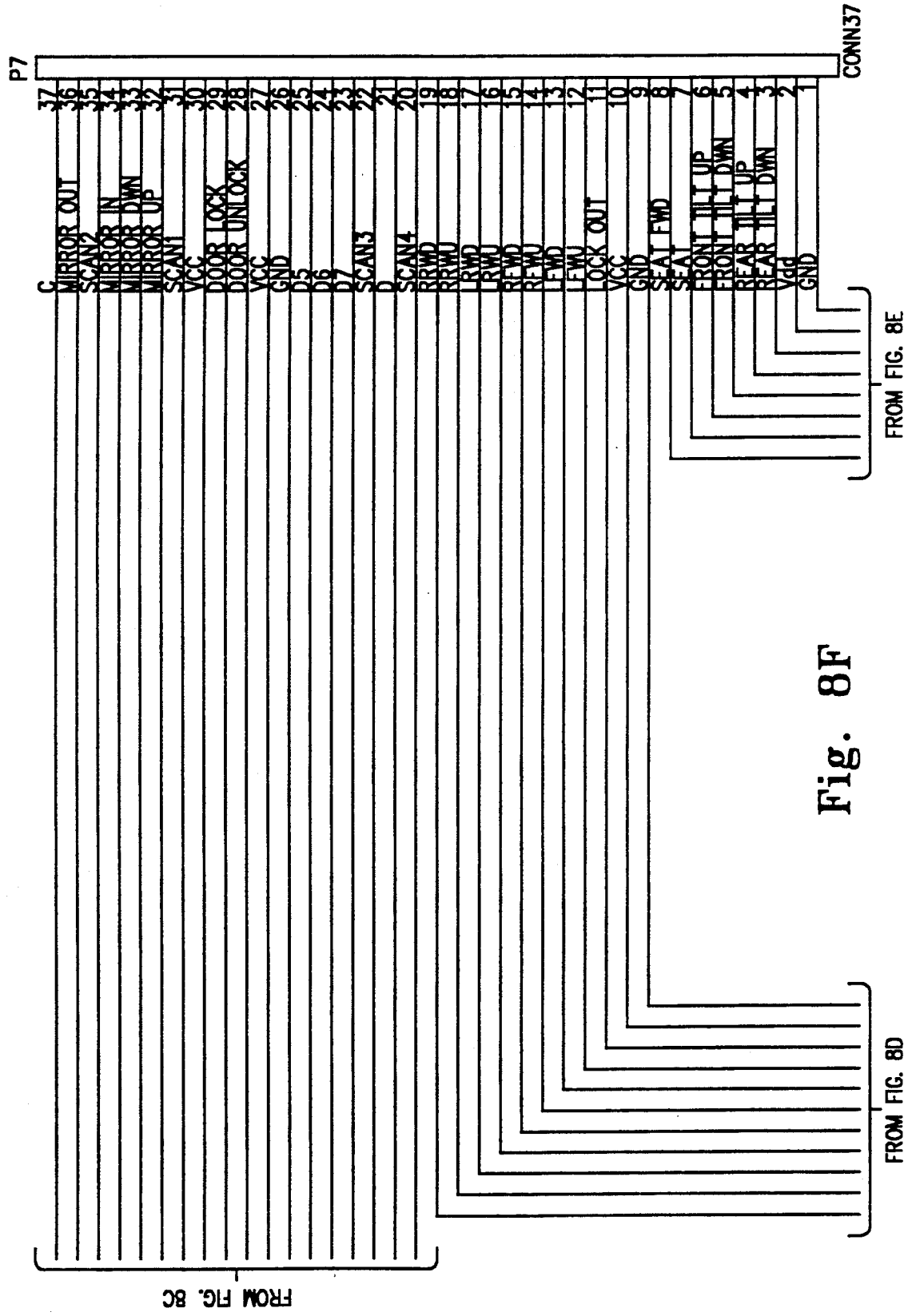

FIGS. 8A and 8B show the mechanical design of the switch portion, indicated generally at 290, of the door module 16. A switch 292 locks and unlocks the doors. Switches 294, 296, 298 and 300 control the left front, right front, left rear, and right rear windows respectively. The driver's window switch 294 has provision for operating the driver window in an "express down" mode to a fully down position by merely touching the switch momentarily to a third position and releasing it.

A window lock switch 302 is an override switch that prevents other window switches in the vehicle from operating the windows. Switches 304 and 306 control heaters in the driver's seat and switch 308 controls the firmness of the back of the seat.

Four-way mirror control is provided by a switch assembly 310. A group of switches 312 enables the driver to control the memory function for seats. The driver can select the left or right mirror for memory control by means of a switch 314. The switch group 312 includes memory 1, memory 2 and set switches.

FIG. 8B is a section view taken along lines A—A of the same switch array depicted in FIG. 8A. Surface-mounted electronic components are enclosed in a compartment 316 under the array of switches.

The mirror switches include left or right mirror selection, mirror out, mirror in, mirror down and mirror up.

FIGS 8C-8F show a switch and harness diagram for switches of a door module 16. Seat control movements include seat forward, seat rearward, seat up, seat down, front tilt up, front tilt down, rear tilt up and rear tilt down.

Switch Scanning

To reduce wiring and input/output requirements the switches on the driver door are electrically interconnected with other portions of the door module 16 in a scanned matrix. A switch matrix converter board is used to interface the door switches 290 (FIG. 8A) with the microcontroller 84 of the door module 16. In prior practice, door module switches were designed to drive their loads directly and thus could not be scanned directly as a matrix by the microcontroller 84.

Referring to FIGS. 9A-9F a switch matrix converter board indicated generally at 320 is needed to convert the switches to a matrix form that is readable by the microcontroller 84. (In an alternative embodiment, the switch matrix converter board 320 and the interconnecting harness to the switches could be eliminated, and a different switch module could be provided that interfaces directly with the door module electronics.)

In FIG. 9A scan lines are represented by columns 326, 328, 330, and 332 and data lines are represented by rows 334-344. The terminals of the microcomputer 84 to which the scan lines are connected are shown in FIG. 4A (as PDO etc.).

Similarly, the terminals of the microcomputer 84 to which the data lines are connected, (for example, PA0) are shown in FIG. 4A. The scan lines are also represented as items 136, 138, 140, 142 on FIG. 4D. The data lines are also represented as terminal group 90 in FIG. 4A. A switch's status is interrogated by making a scan line active.

Figure 9B:
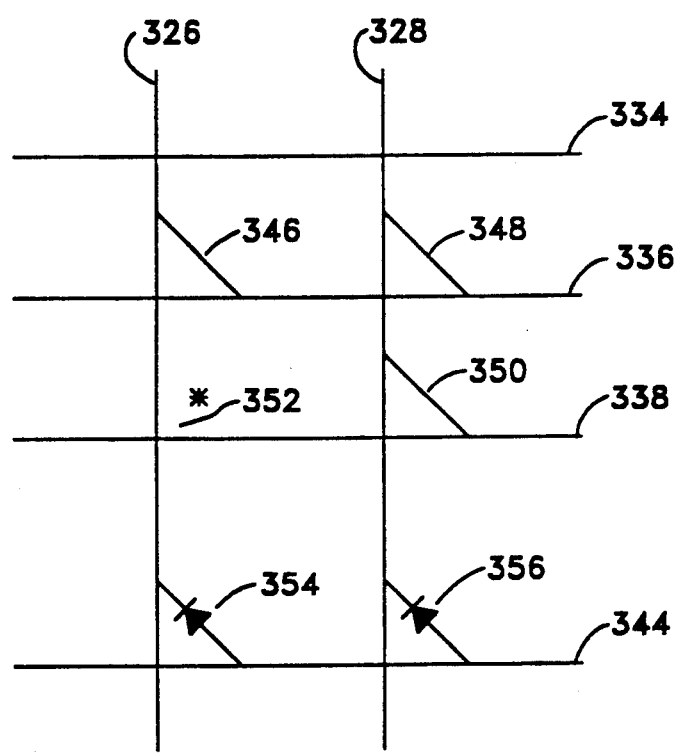
FIG. 9B is a portion of a switch matrix, illustrating the solution of a matrix square problem.
Figure 9D:
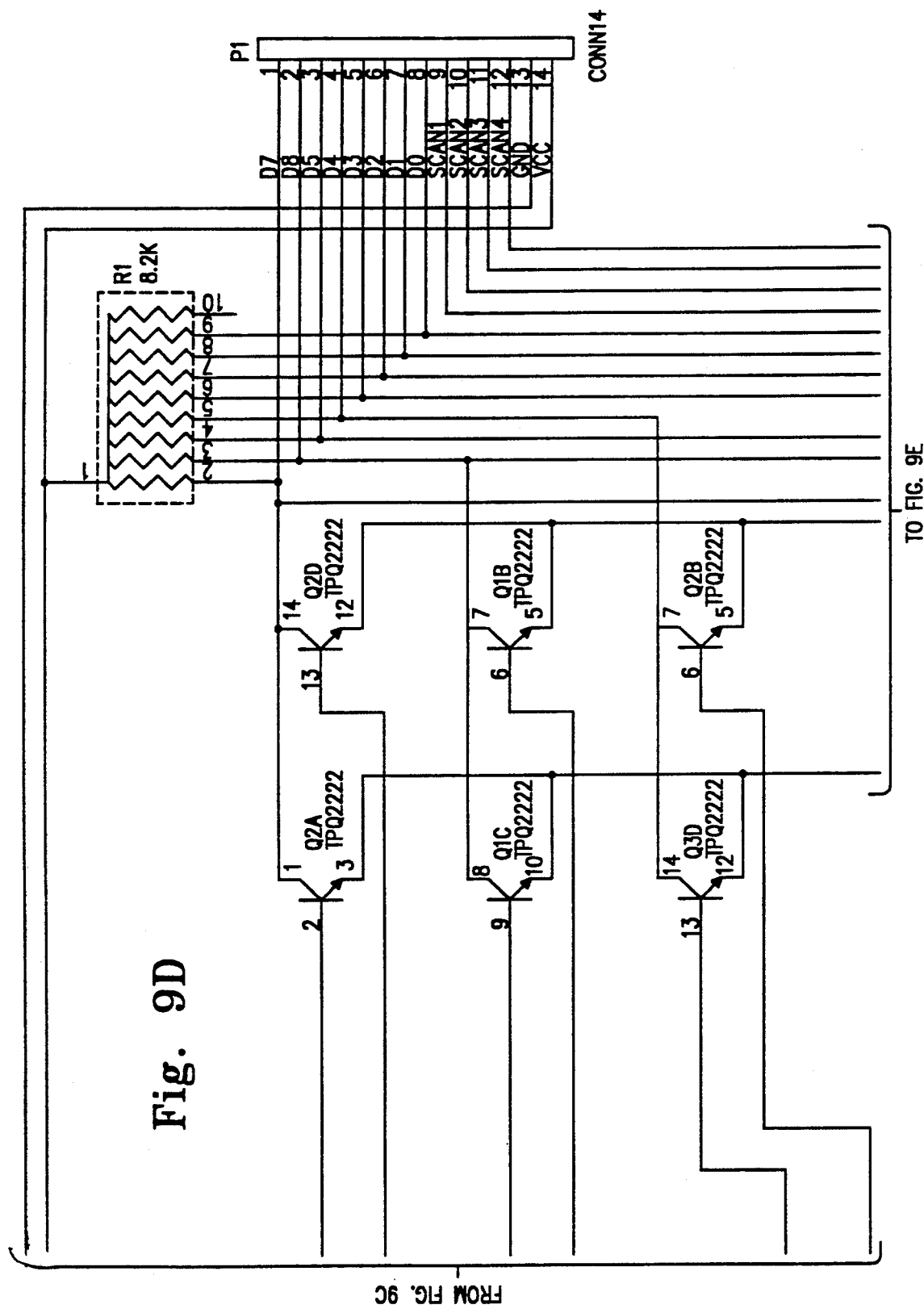
Figure 9E:
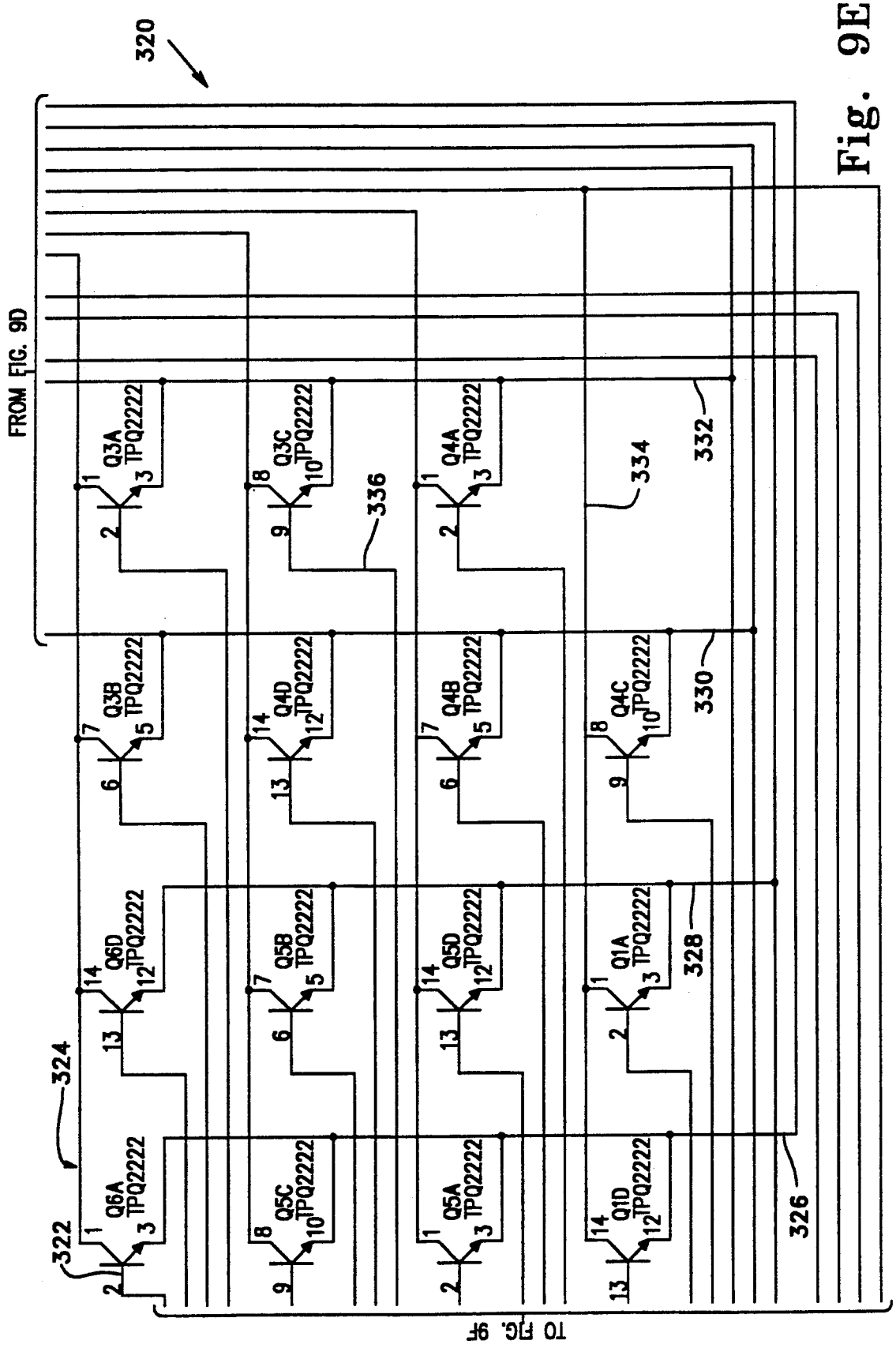
Figure 9F:
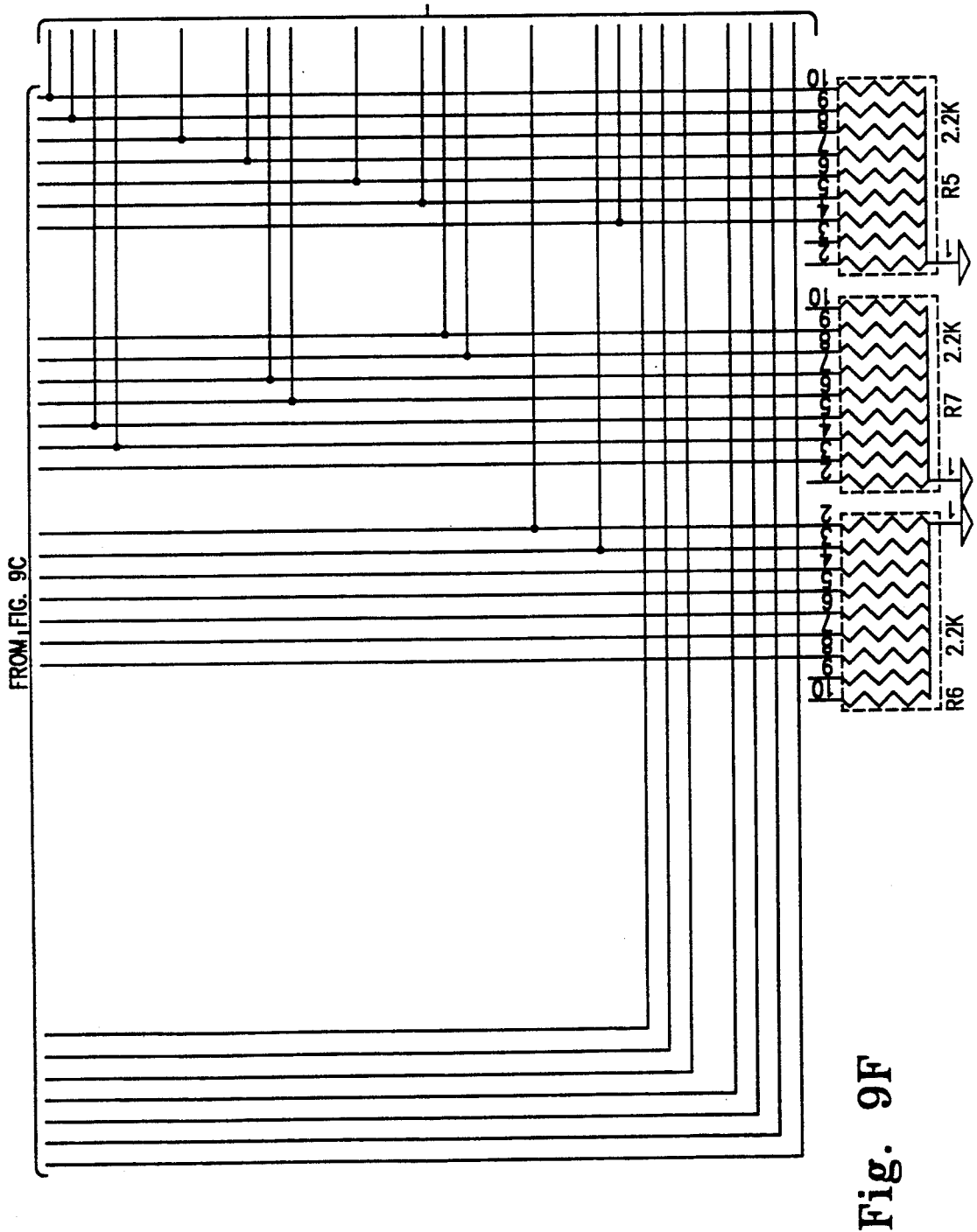

The converter board 320 of FIGS. 9C, 9D, 9E and 9F operates as follows: With the switches (FIG. 8C) not actuated, the bases 322 of transistors 324 of FIG. 9E are pulled to a low voltage by resistor 327, FIG. 9C. This biases the transistors off even when the scan lines 326, 328, 330, 332 (FIG. 9A) are active (i.e. pulled low). The scan lines 326 etc. are connected to emitters of the transistors as shown in FIG. 9E. Note that data lines 334 etc. tend to be pulled high by a supply voltage applied to them through resistors 329. Because the transistors 324 are all biased off, none of the data lines 334, 336, 338, 340, 342, 344 is pulled low when the scan lines 326 etc. go low. This is a no-switch active state of the matrix 325.

Matrix Square Problem

A possibility would exist for reading invalid switch states when there are multiple switch closures in a scan switch matrix. That might occur when there are three or more active switches that share a common row and column. Such a combination would form a rectangle or "square" in which the fourth corner would always be read as active even if it were not, (FIG. 9B). Therefore, all "squares" are disallowed; otherwise the possibility would exist for an inactive switch 2b misread and it would not be possible to determine which one it is. This is a safety feature that is necessary due to the matrix configuration of the switches as shown in FIG. 9B.

An example is this situation: If two switches such as switch 346 on scan line 326 and switch 348 on scan line 328 are on the same data line, line 336 will transfer a strobe signal that is applied (for interrogation) to scan line 326 onto (also) the other scan line 328. If a third switch 350 on data line 338 (for example) is active on the second scan line 328, the "fourth corner of the square" which is shown as numeral 352 at the intersection of lines 326 and 338, is automatically read as active, because that line 326 strobe signal is carried along the data line 336, along the second strobe line 328 and along the second data line 338. Such squares are disallowed.

An exception to this procedure occurs for continuous (non-momentary) switches. They are placed on a common data line with each having a blocking diode such as on data line 344 of FIG. 9B. The blocking diodes are 354 and 356. The diodes prevent these intersections from contributing to the misreading of switches on other rows. If a square occurs, consisting for example, of data lines 336 and 344 and scan lines 326 and 328, the square is allowed but the previous state of the diode-equipped switches is used.

Scanning of Sensors

Figure 10:
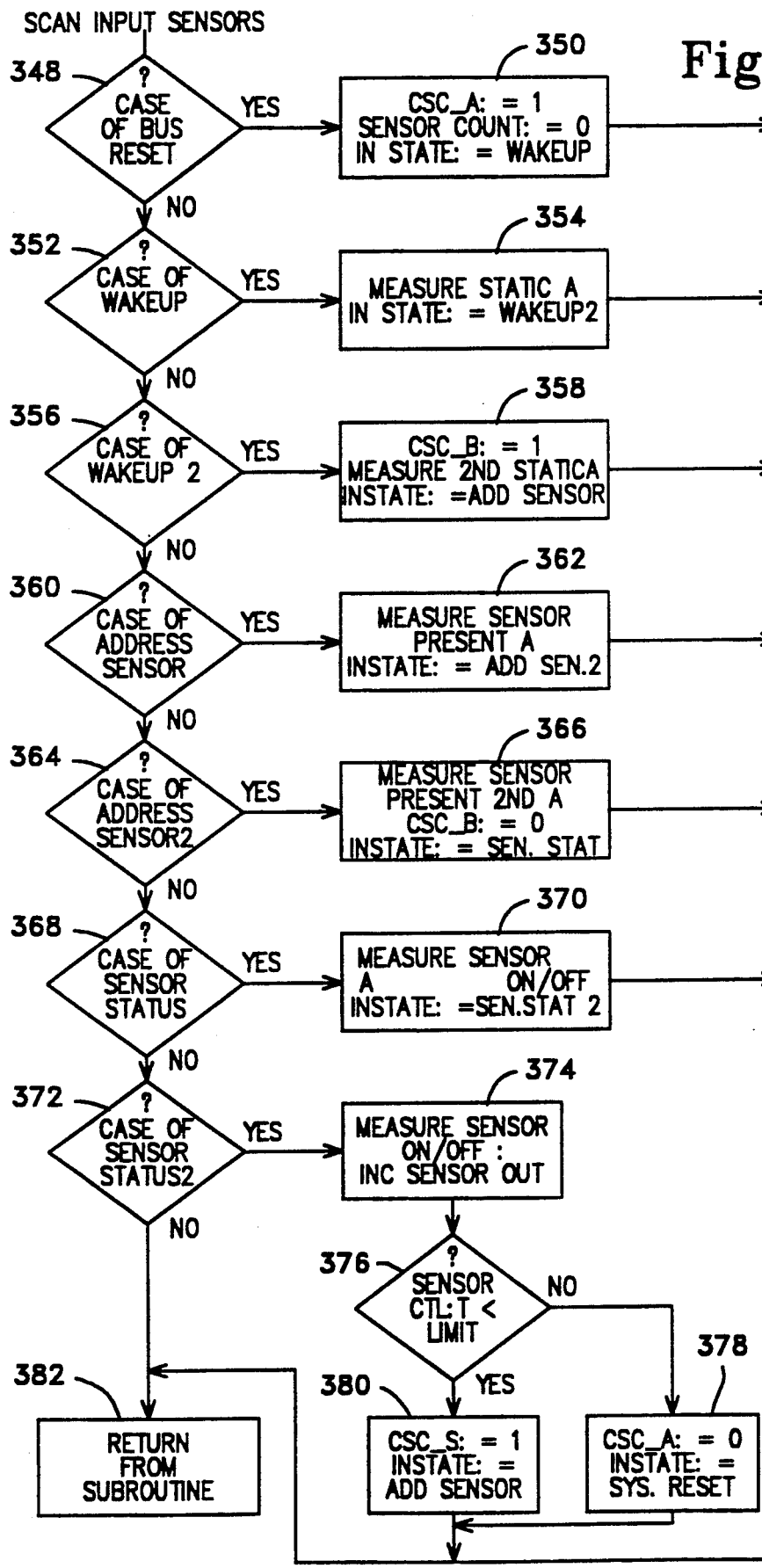
FIG. 10 shows steps in a method for scanning input sensors.

The procedure for scanning of input sensors is depicted in the flow chart of FIG. 10. The procedure is initialized by the mainline routine. The input scan routine toggles the CSC bus 20 through its proper sequence by means of the CSC bus driver chip 182 (FIG. 4B) to address each sensor (after measuring the CSC bus current via the internal analog-to-digital converter and comparing it to the static current level). It records the presence and state of each sensor. The CSC bus timing is handled by an interrupt from the internal timer.

The scan input sensor routine starts at block 348 of FIG. 10 with a question: "Is this a case of bus reset?" If yes, a quantity called CSCA is set equal to 1; and the sensor count is set equal to 0; and "in state" is set equal to "wake up". Then the flow leaves this subroutine.

If it was not a case of bus reset, the question is asked at block 352: "Is this a case of wake-up?" If yes, block 354 is utilized to measure static A and the in-state is set equal to wake-up. The program then returns from this subroutine.

If in block 352 the answer was no, the question is asked in block 356 whether this is a case of wake-up 2. If yes, block 358 sets CSCB equal to 1. It then measures the second static A and sets in state equal to "address sensor". Thereafter, the program leaves the subroutine.

If the answer at block 356 was no, the question is asked whether this is a case of address sensor, block 360. If yes, block 362 calls for measurement of the sensor present A and setting of in state equal to "address sensor2". The subroutine is exited.

If "no" in block 360, the question is asked at block 364 whether this is a case of address sensor 2. If yes, block 366 measures the sensor present 2nd A. It also sets CSCB equal to 0 and in-state equal to sensor status 1. The flow returns from the subroutine.

If the answer in 364 was no, the question is asked in 368: "Is this a case of sensor status?" If yes, block 370 specifies measure sensor on/off A (current), and in state is set equal to sensor status 2. The program leaves the subroutine.

If the answer in 368 was no, block 372 asks: "Is this a case of sensor status 2"?. If block 372 found that this was not a case of sensor status 2, the program returns from this subroutine. If yes, block 374 measures the sensor on/off A (current) and it increases the sensor count. Then in block 376 the question is asked: "Is the sensor count less then the limit?" If no, block 378, the CSCA is set equal to 0, the in state is set equal to bus reset and the program returns from this subroutine.

If yes in block 376, the CSCB is set equal to 1, the in-state is set equal to address sensor and the program returns from this subroutine from blocks 380 and 382.

Switch Validity Checking

Figure 11A:
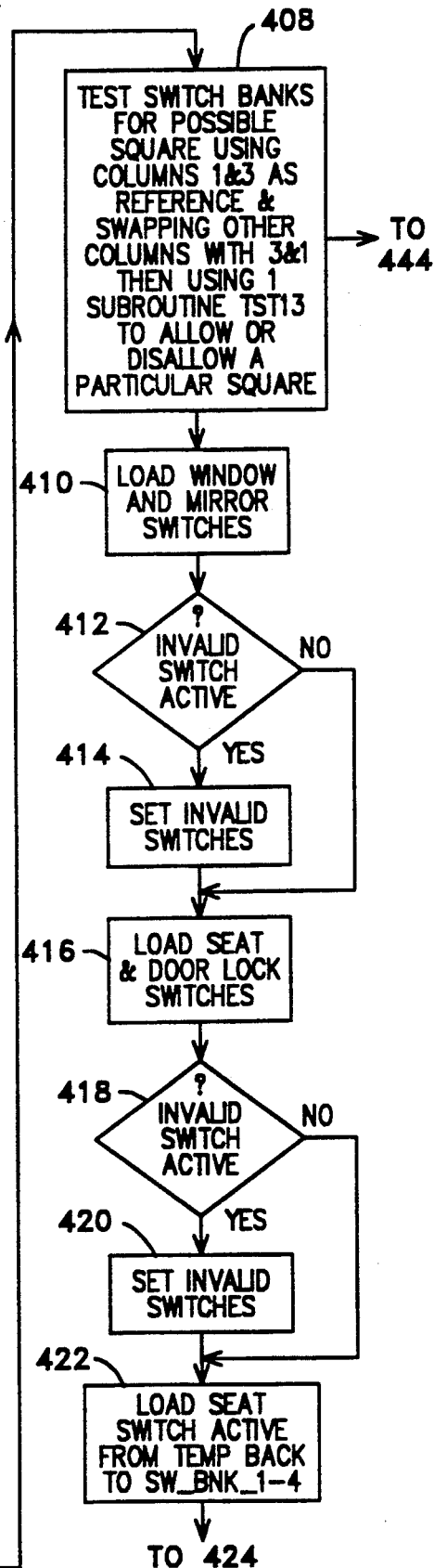
FIG. 11A shows steps in a method for testing switch validity.

Referring to FIG. 11A, a query is made at block 386 as to whether any window switches are active. If yes, the switch active information is set (block 388) equal to window active. Thereafter, or if the "Is window switch active?" question was answered no at block 386, a block 390 asks whether the mirror switches are selected. If yes, block 392 asks "Are the mirror switches active?" If yes, block 394 sets switch active equal to mirror active. If block 390 said that mirror switches were not selected, the question is asked at block 396 whether the seat switches are active. If yes, block 398 sets the switch active data equal to seat active. If no, the program proceeds to block 400.

The program proceeds to block 400 also if the answer in block 392 was that the mirror switches are not active and also after the settings of block 394 have been made to show mirror active.

Block 400 asks: "Are the memory switches active?" If yes, block 402 sets switch active equal to memory active and proceeds to block 404. If not, the program proceeds directly to block 404. At 404 the question is asked: "Are the door lock switches active?" If yes, the switch active register is set to equal door lock active, in block 406, and the program proceeds to block 408. If no, the Program proceeds directly from block 404 to block 408.

At block 408, the matrix of switches is tested for a possible square condition as described elsewhere, using rows 1 and 3 as reference and exchanging other rows with 3 and 1. Then using a subroutine TST 13 is used to allow or disallow a particular square. See FIG. 11C for subroutine TST 13.

Block 410 then loads window and mirror switches and the program asks the question at block 412 whether invalid switch is active. If yes, "invalid switches" is set in block 414 and the program moves to block 416. If not, the flow proceeds directly from block 412 to block 416.

At 416, the program loads seat and door lock switches and proceeds to block 418 where a question is asked—"invalid switch active?" If yes, the program sets "invalid switches" in block 420 and proceeds to block 422. If no, the program proceeds directly from block 418 to block 422.

Block 422 stores corrected switch active information from Temp Back to SW-BNK-1-4. The flow moves to block 424 where switch history is updated.

Figure 11B:
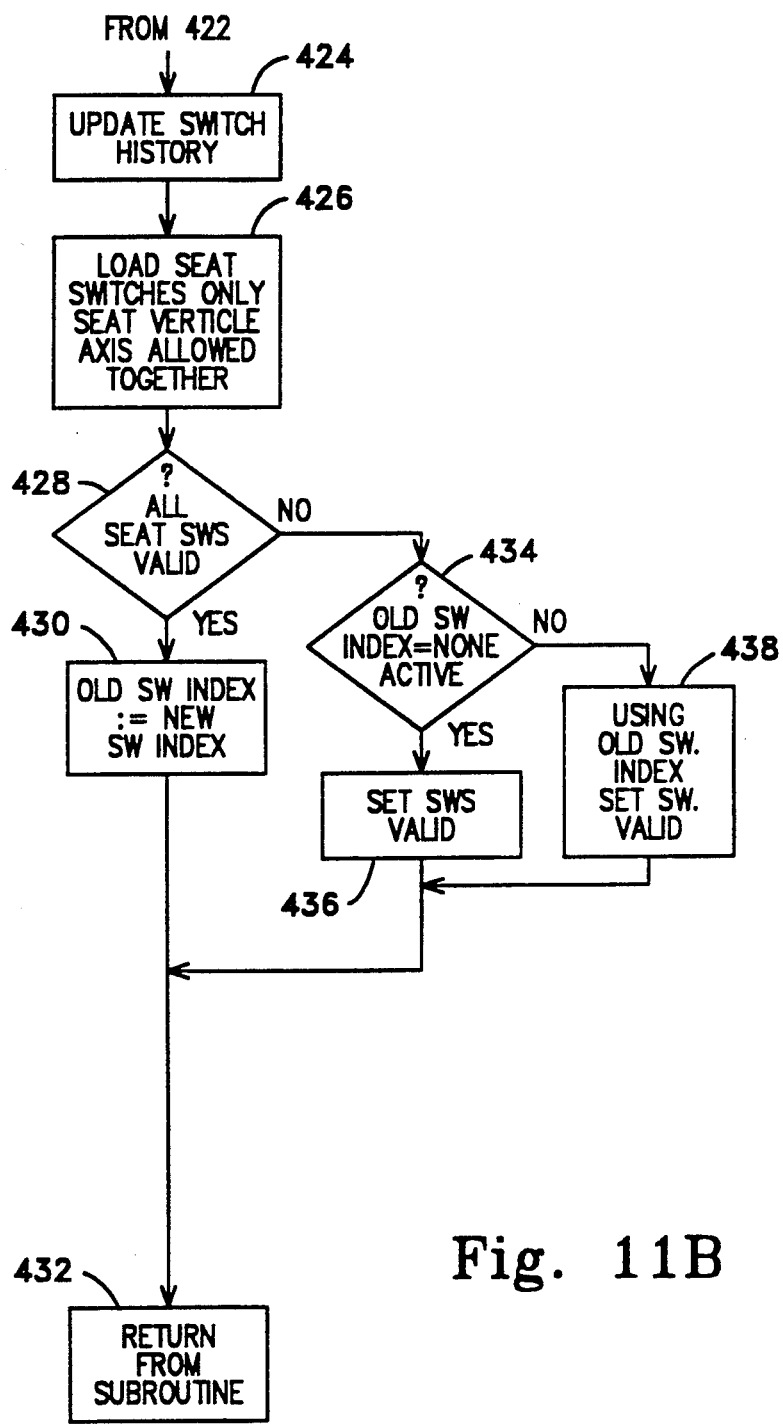
FIG. 11B is a continuation of FIG. 11A.

The program continues on FIG. 11B. In block 426, the system loads seat switches, with only seat vertical axis being allowed together. The next block, 428, asks whether all seat switches are valid. If yes, the old switch index is set equal to a new switch index in block 430 and the program proceeds to block 432 to return from this switch-checking subroutine.

If it is found in block 428 that not all seat switches are valid, the question is asked in block 434: "Is the old switch index equal to none active?" If yes, the program sets the switches valid signal at block 436 and returns from the subroutine. If no, at block 434, the program sets switches valid at block 438 using the old switch index, and returns from the subroutine at block 432.

Figure 11C:
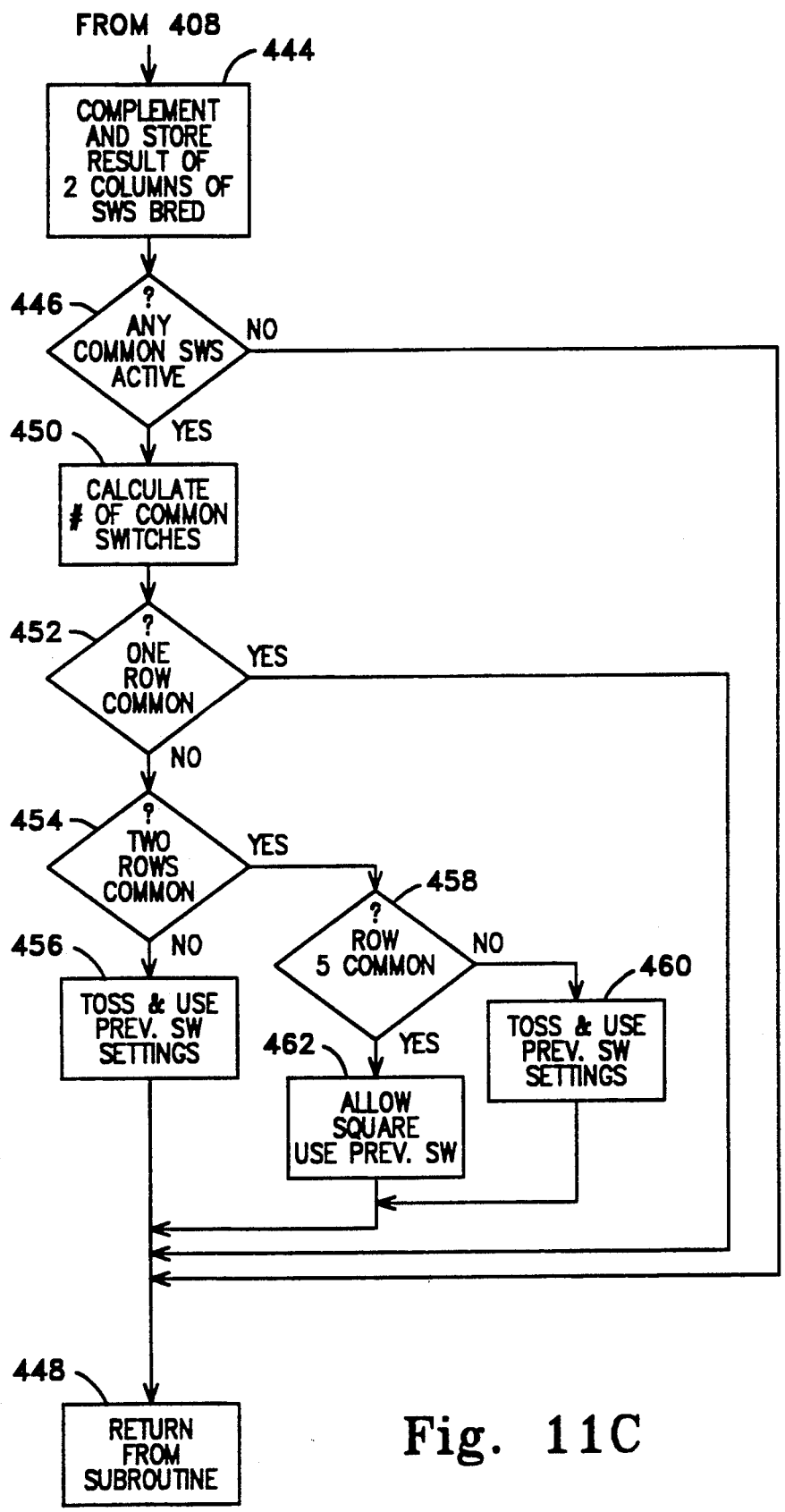
FIG. 11C is a subroutine of switch validity checking, relating to the squares phenomenon of a switch matrix.

The subroutine TST 13 referred to above in connection with FIG. 11A is shown in FIG. 11C. This subroutine relates to allowance or disallowance of a particular square of switches on the switch matrix of FIG. 9B and 9C. Information from block 408 of FIG. 11A initiates the flow. At block 444 of FIG. 11C the data are complemented and the results are stored regarding two rows of switches that have been ORed. Then block 446 asks: "Are any common switches active?" If no, the system returns from this subroutine via block 448.

If yes, block 450 calculates the number of common switches and block 452 asks whether one row is common. If yes, the program returns from the subroutine at block 448. If no, the program asks: "Are two rows common at block 454?" If no, the commands are disallowed and the previous switch settings are employed in block 456 after which the flow returns from the subroutine at block 448.

If two rows are common at block 454, the question is asked in block 458 whether row D5 is common. This is the row having diodes. If no, the commands are disallowed and the previous switch settings are used, at block 460.

Thereafter, the program returns from the subroutine, block 448. If in block 458 row 5 is the common row, the switch square is allowed and the previous switched settings are used at block 462. The subroutine terminates at 448.

Algorithms

Referring to the time line of FIG. 7A, it may be seen that the scanning of sensors in time interval 272 has now been completed and the next timer interval 274 is for execution of algorithms.

The functions performed by the door module 16 for each actuator output generally consist of two routines, namely request prioritization and algorithm execution. A request prioritizer receives requests from one or more sources and determines which will take precedence. An example is that a request from driver door lock switch overrides a request from the passenger door lock switch.

The algorithm receives whichever request has priority and determines whether or not a change in state of the output device is required. If so, it issues a command to the output device in a manner depending upon whether the output device is positioned locally, on the CSC bus, or remotely (via the CCD bus).

In addition, the algorithm may perform related status checks to determine the proper state required of the output. For example, a seat algorithm also monitors the status of the count routine to determine if a stall condition or an end limit has been reached, in which case a stop command is issued overriding the requested state.

Various algorithms are described in greater detail below in connection with the particular equipment that they control. For example, the seat command algorithm is described below by means of a flow chart (FIG. 19) in the Memory Power Seats section.

A somewhat different algorithm is the Body Computer Algorithm of the door module computer 84. It monitors all sensors on the CSC bus 20 that are relevant to the body computer 12 and transmits a message to the body computer 12 on the CCD bus 14 whenever there is a change of state of one of the relevant sensors. They are door handle, key cylinder, door jamb, door ajar, seat belt fastened and volume control.

Output Discretes

The output discretes function is called upon after the algorithms determine the correct output states for all of the local outputs: driver mirror, driver window, and driver door lock. The output discretes are in time interval 276 of the door module scan time line 268 on FIG. 7A. They are initiated by block 256 of FIG. 6.

The output discretes routine sets the appropriate port bits that are input to the relay-driver chip 152 and the mirror-driver circuits 174 of FIG. 4D.

Output Scanning

FIG. 7A shows a time interval 278 for output scanning. An output actuators routine is called last after the algorithms. It looks at a command buffer block to see if there are any entries. The entries, if any, represent commands submitted by the algorithms to be sent out on the CSC bus 20 to remote output modules such as modules 26, 28 and 32.

If an entry is in the command buffer black, the output actuator routine generates an appropriate bit sequence on the CSC bus 20 (see FIG. 3B). If the output module properly acknowledges the address bits, then the data bit is also set sent. If the number of output modules acknowledging the address bits is not equal to 1, the command remains in the buffer, to be retransmitted on the next scan.

If the command is a start command, the routine makes three attempts to transmit the message. If it is still unsuccessful, the routine discards the command and sets a fault bit. If the driver is still actuating the switch, another attempt is made. If the command is to stop an output motor, the routine attempts to send it upon every scan until successful.

Each command is transmitted twice. The first transmitted command causes the output to change state. On the following scan, the second transmitted command is sent to inquire as to the state of the output. This is used as a confirmation that the output is in the correct state.

The command is then removed from the command buffer.

Before an algorithm can load a new command in the buffer the previous command for that output must have been sent and acknowledged. In the case of a stop command, the command supersedes a current move command in the command buffer. This insures that the output module of the present invention receives commands in the correct sequence even in an extremely noisy environment.

Mode Set

Figure 12:
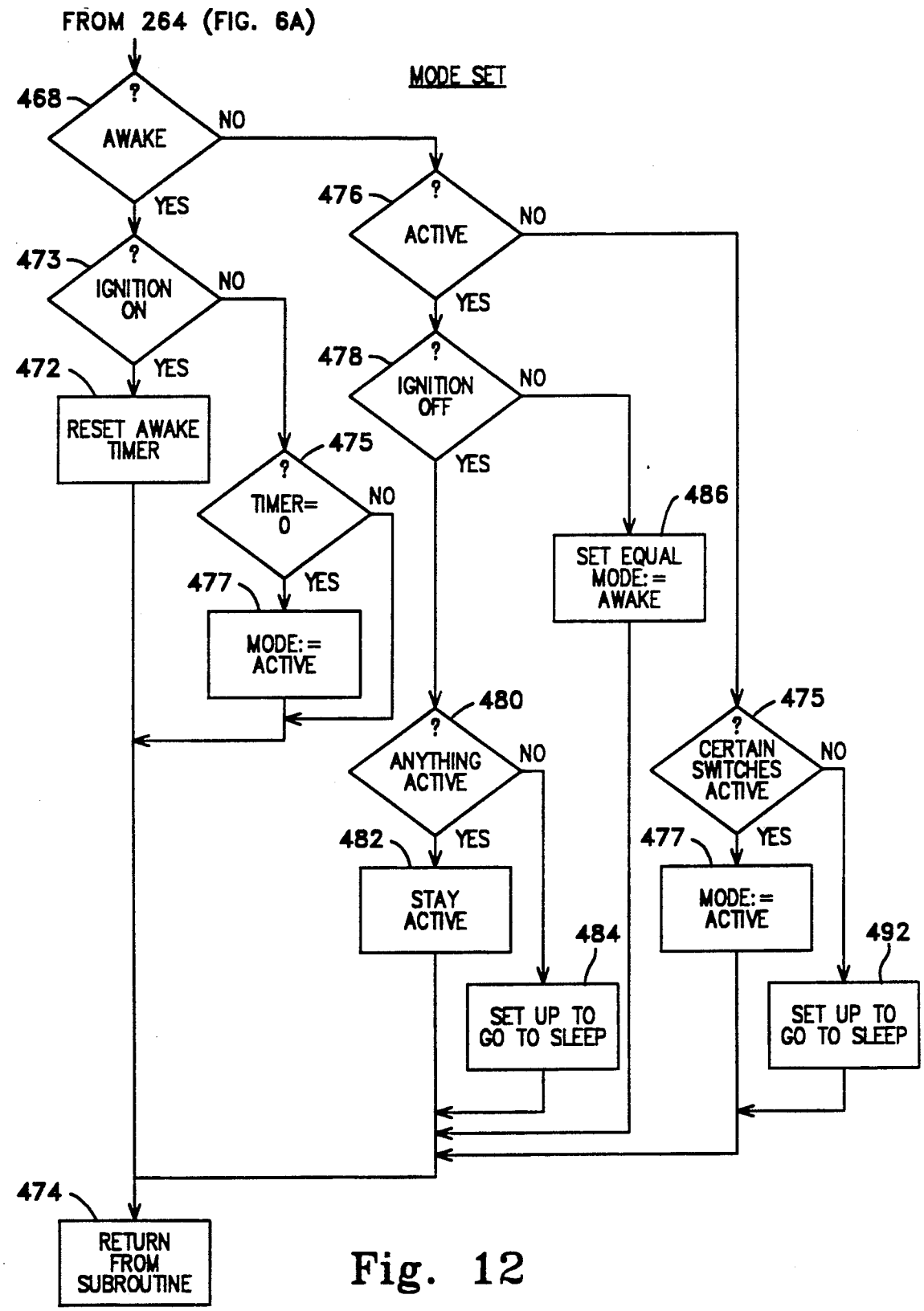
FIG. 12 shows steps in a method of setting a mode of operation, i.e. asleep, awake, or active.

FIG. 12 shows a flow chart for steps in the mode set procedure. The mode set procedure is initiated in block 264 of FIG. 6A, (which is the car mainline procedure). At block 468 in FIG. 12, a question is asked whether the system is in the awake mode. If yes, a question is asked in block 470 whether the igniton is "ON".

If yes, the awake timer is reset in block 472. It produces a 25-second time delay to permit window lifts to operate. Thereafter, the program returns at block 474 to the main program.

At block 470, if the ignition was not "ON", the question is asked whether the "timer equals 0" (block 475). If yes, the mode is set equal to active in block 477. If no, the flow proceeds directly from block 475 to the return block 474.

However, if block 468 finds that the system is not in the awake mode, the question is asked at block 476 whether it is in the active mode. If yes, it is asked: "Is the ignition off?" (block 478). If yes, it is asked in 480 whether anything is active. If yes, it stays active in block 482 and proceeds to the return block 474.

At block 480, if nothing is active, block 484 sets up the system to go to the asleep mode, after which the program goes to the return block 474.

In block 478, if the ignition is found not to be "OFF", the program sets the mode to awake in block 486. It then returns the program through block 474 to the main flow.

At block 476, if the system was found not to be active, the question is asked in block 488 whether certain switches are active. If yes, the mode is set active in block 490 and the flow passes to the return block 474.

In block 488, if those switches were found not to be active, the system is set up to the end the asleep mode, in block 492, after which the program goes to the return block 474.

Output Actuator State Generator

Figure 13A:
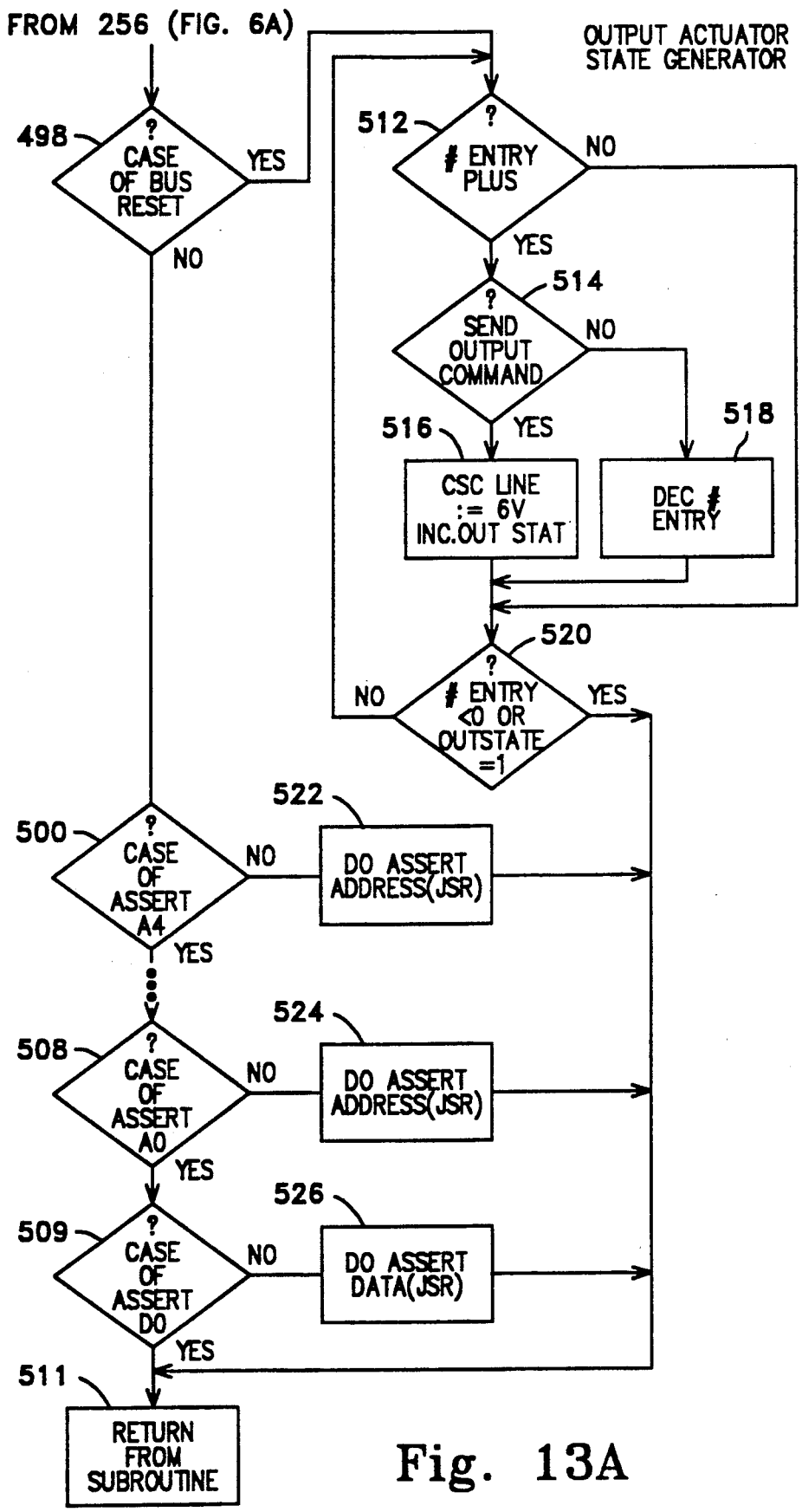
FIG. 13A shows steps in a method for controlling the state of an output actuator.

An output actuator state generator routine of FIG. 13A is shown in block 256 of FIG. 6A. A0, A1, A2, A3 and A4 are output addresses. At block 498 a query is made whether or not this is a case of bus reset. If not, if the question is asked in block 500 whether it is a case of "assert A4". If not, other cases are queried after which at block 508 the question is asked whether this is a case of "assert A0".

If not, block 510 asks: "Is this a case of " assert D0"?. If not, at block 511, the flow returns from this subroutine to block 256 of FIG. 6. D0 is a data bit, which follows the address bits in the transmission sequence.

In FIG. 13A, in the event that it is a case of "bus reset" at block 498, inquiry is made whether the number entry is positive, block 512. If yes, query is made (block 514) whether to send an output command. If yes, the CSC bus line is set equal to 6 volts and the output state is increased at block 516. Flow goes to block 520.

If not, the flow proceeds from block 514 to decrement the number entry, in block 518, after which the flow proceeds to block 520. In block 520, the question is asked: "Is the number of the entry less than 0 or does the output state equal 17"? If no, the flow returns to the input of block 512 and if yes, it proceeds to block 511 where it returns from the subroutine.

At block 500, if it was a case of "assert A4", block 522 does assert the address after which the flow goes to block 511, to return from the subroutine. At block 508, if this was a case of "assert A0", the program does assert the address in block 524. Thereafter the flow goes to block 510 to terminate the subroutine. In the case of assert D0 (block 510) if the answer was yes, block 526 does "assert the data" and the flow returns to block 510.

Figure 13B:
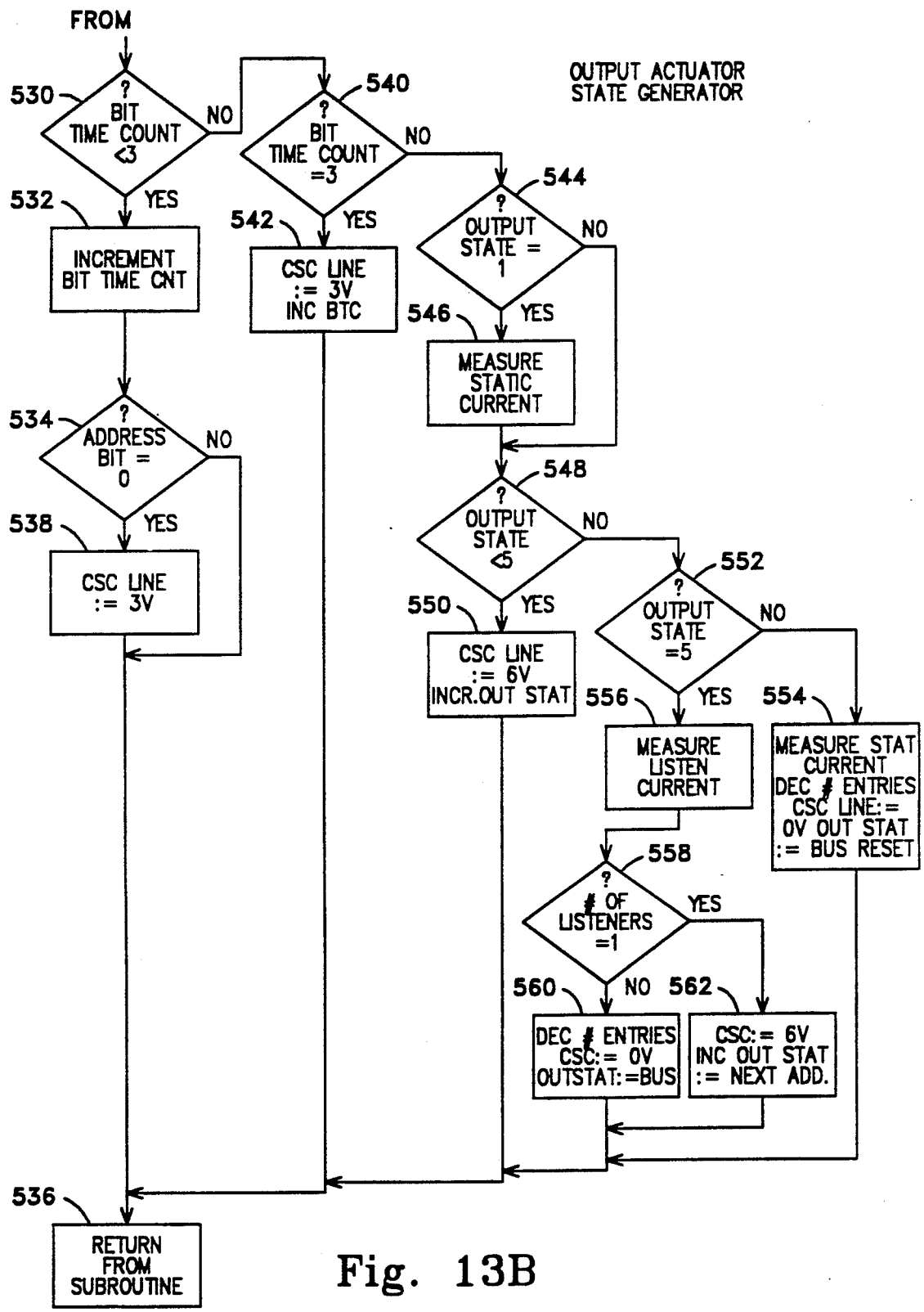
FIG. 13B is another chart of steps in a method for controlling the state of an output actuator.

Another flow chart related to the output actuator state generator is shown in FIG. 13B. In that subroutine a question is asked in block 530 whether the bit time count is less then 3. If yes, the bit time count is incremented in block 532. The question is then asked in block 534 whether the address bit is 0. If no, the program returns at block 536 from this subroutine. If the address bit is 0, the CSC bus line voltage is set at 3 volts, in block 538.

Returning now to block 530, in FIG. 13B, if the bit count was not less then 3, the question is asked in block 540 whether the bit count is equal to 3. If yes, the CSC bus line voltage is set equal to 3 volts and the bit count is incremented in block 542. Then the program goes to the return block 536.

At block 540, if the bit count is not 3, the question is asked: "Is the output state 17" This is at block 544. If yes, a measurement of the static current is called for in block 546 and the program proceeds to a block 548. This is a baseline current measurement. If no at block 544, the program proceeds directly to block 548.

At block 548, the question is asked whether the output state is less then 5. If yes, the CSC line voltage is set equal to 6 volts and the output state is incremented, at block 550. Thereafter, the program goes to block 536 where it returns from this subroutine.

If the output state is not less then 5 at block 548, a question is asked in block 552 whether the output state is equal to 5. If not, the state current is measured, the number of entries is decremented and the CSC line is set at 0 voltage. The state current is for the data state measurement. Also, output state is set equal to "bus reset" in block 554. Thereafter, the flow goes to block 536, which is the return route from this subroutine.

If instead the output state is found at 552 to be equal to 5, block 556 measures the "listen" current. Means is provided for ascertaining how many "listeners" are receiving the signal, using known techniques. At block 558, if the number of listeners is not equal to 1, the number of entries is decremented, the CSC bus voltage is set equal to 0 and the output state is set equal to "bus reset" in block 560.

At block 558, if the number of listeners is found to be 1, block 562 sets the CSC bus voltage to 6 volts and increments the output state to equal the next address. Outputs from both blocks 560 and 562 go to the return-from-the-subroutine block 536.

Figure 13C:
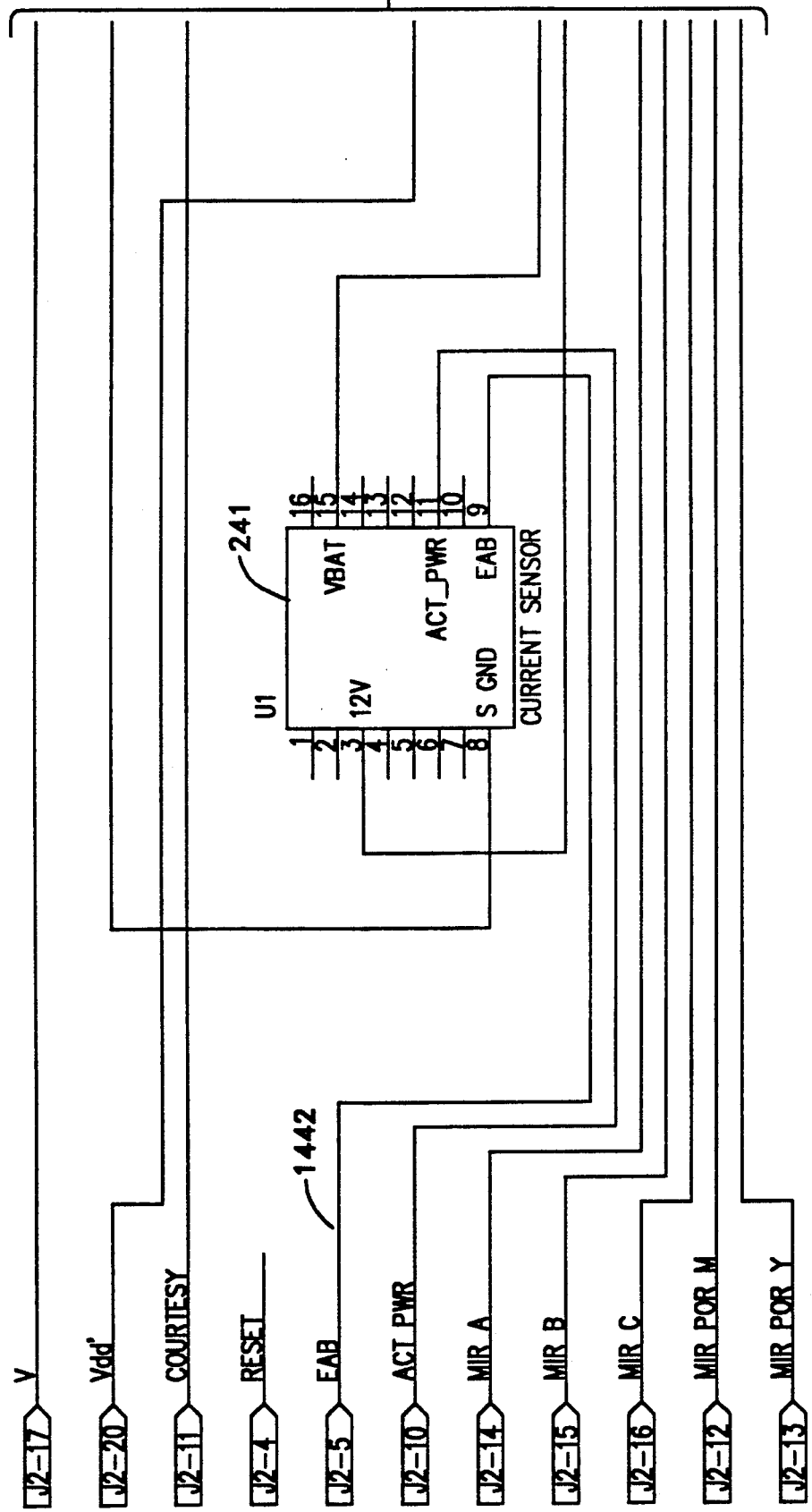
Figure 13D:
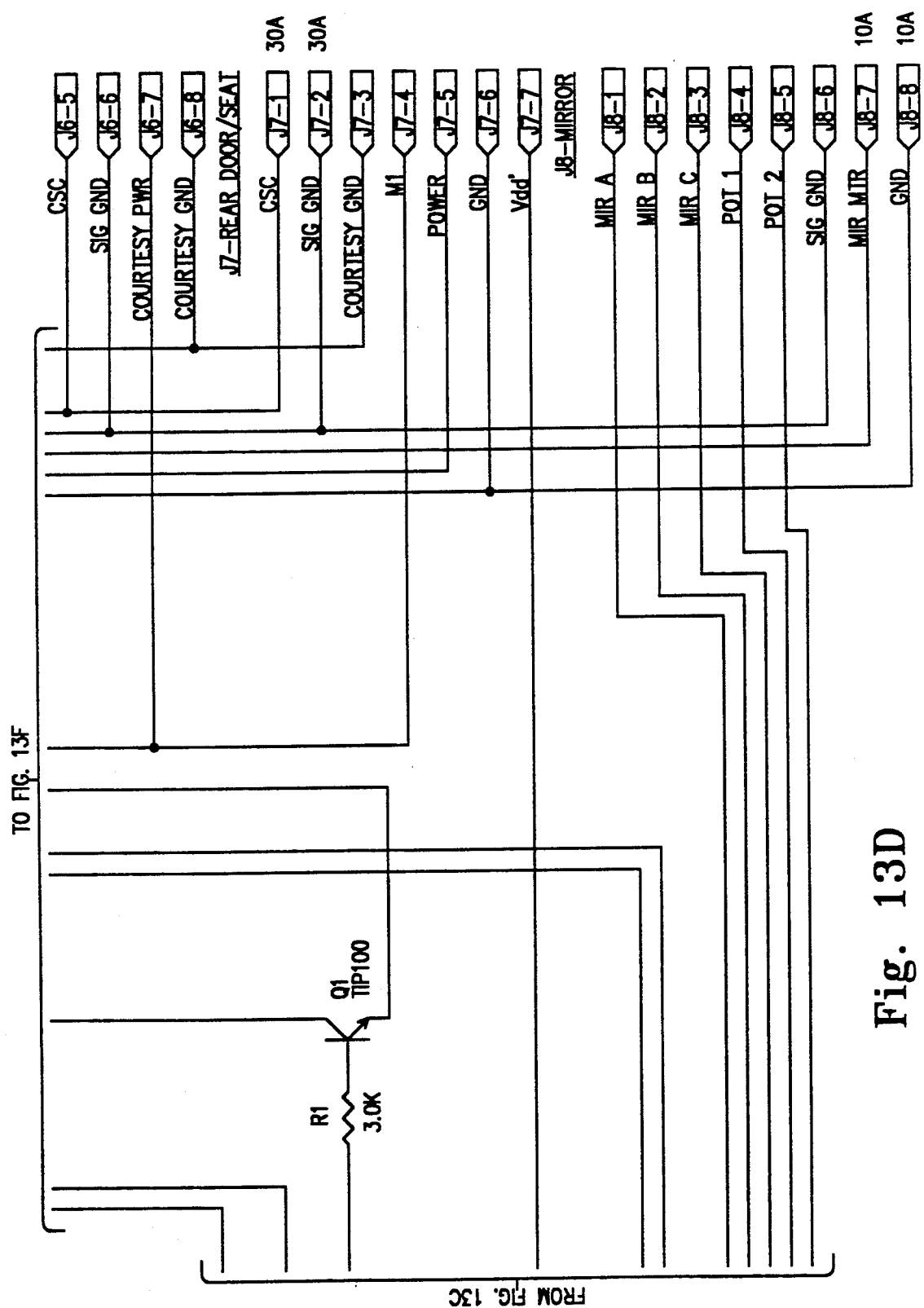
Figure 13E:
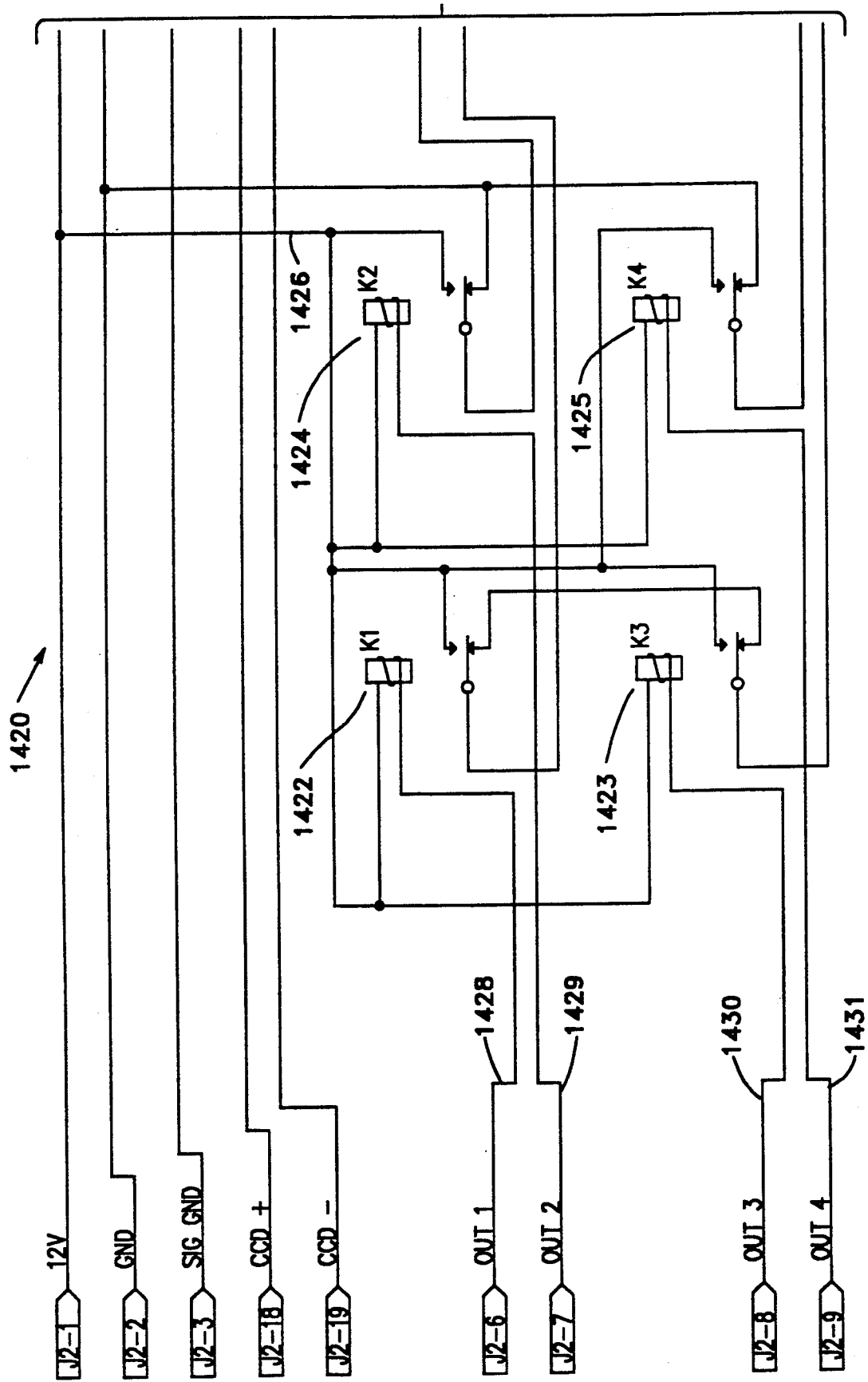

FIG. 13C and 13D together form a diagram of a relay board, which is generally designated as 1420. It includes relays 1422-1425. The coils receive power from a 12-volt line (1426) and are switched by lines 1428-1431, which are connected with a relay driver (152) at the top of FIG. 4b.

The output contacts of the relays (1422–1425) are connected to a doorlatch motor at terminals 1432 and 1434 of FIG. 13D and to window motor terminals 1436 and 1438 of FIG. 13D.

A component of particular interest is a current sensor (241) which is shown on FIG. 13C and FIG. 6B. It senses the voltage drop across a nichrome wire shunt 241A on FIG. 13B and the circuit 241B provides an analog output signal (EAB) at a terminal (1442). This signal is conducted to the microcomputer 84, terminal DC3, FIG. 4C, and the voltage regulator 120, terminal 134 of FIG. 4C.

CCD Bus Interface

The CCD bus interface equipment 194 and 208 is shown on FIG. 4B. It uses the serial communication interface interrupt (SCI) system 228 (FIG. 5) of the microcomputer 84. An interrupt is generated for each received byte. An interrupt TCAP 2 at black 222 is used for detecting IDLE/. The IDLE/ interrupt is used to detect end of message. If the message received is not "our own" (all bytes transmitted are also received), then the message is verified as good and processed immediately. In addition, if there is a message queued up to be sent, the first byte is also transmitted.

The SCI receive interrupt routine compares each received byte with the transmitted byte to assure a match, which indicates no loss of arbitration. If transmission is still in progress, the next byte is sent. Loss of arbitration or a corrupted message requires retransmission the next time the bus goes IDLE.

If transmission is not in progress, the received byte is saved for constructing a whole message. Once per scan, the CCD transmit message buffer is also checked to see whether there is anything to send. If there is and the CCD bus is IDLE, the first byte is sent and the receive interrupt routine handles the rest.

Input Capture Interrupt

Figure 14:
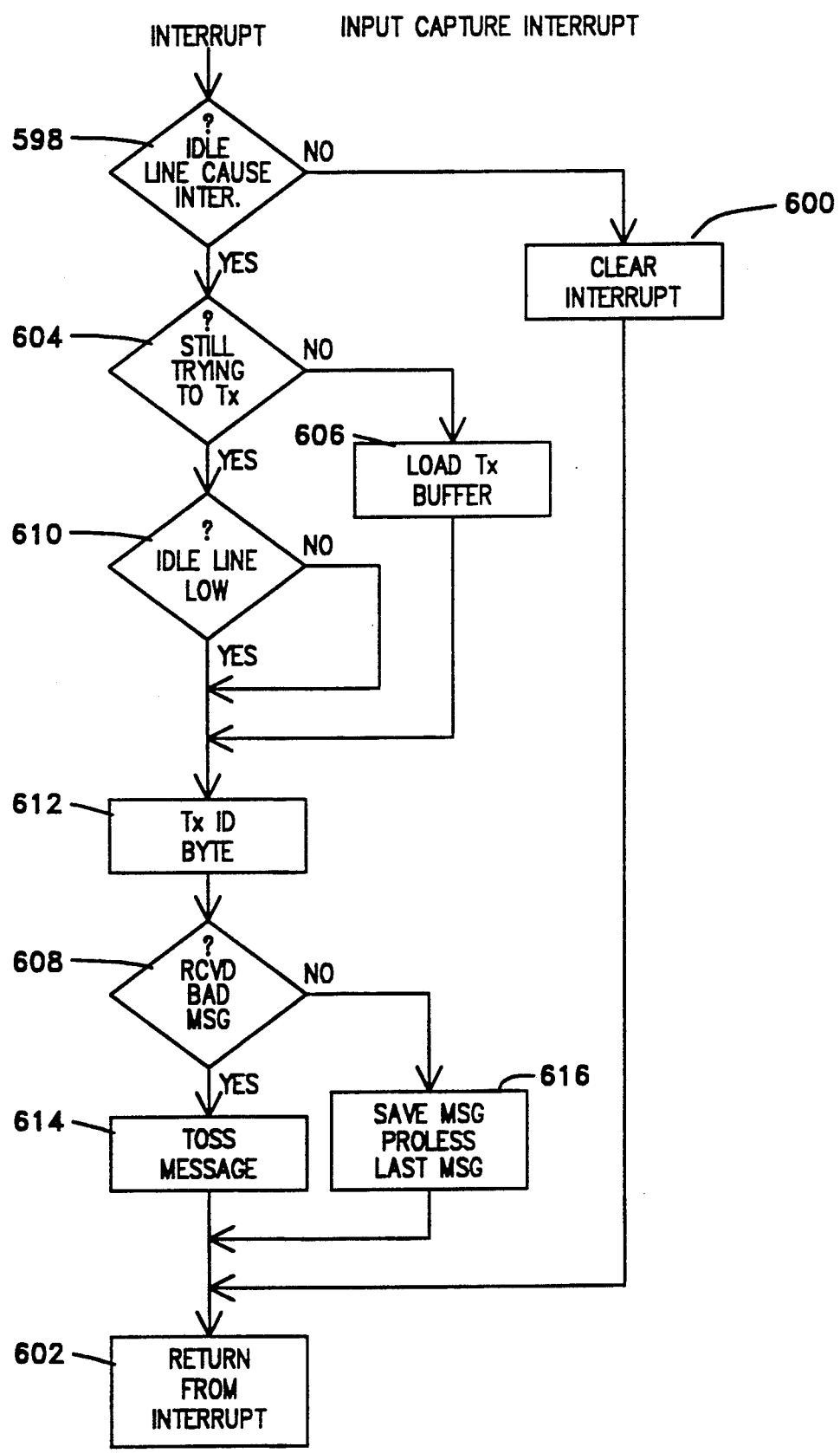
FIG. 14 shows steps in performing an input capture/interrupt for a computer of a door module.

The microcomputer's procedure for input capture interrupt is shown in FIG. 14. At block 598, a question is asked whether the IDLE line is causing an interrupt. If no, a block 600 clears the interrupt and returns the program through a block 602 from the interrupt subroutine. If yes at block 598, a question is asked in block 604 whether an attempt is still being made to transmit. If no, the transmit buffer is loaded at block 606. The output of block 606 connects to a block 608 about which more will be said later.

Returning to block 604, if the system is still trying to transmit, a question is asked whether or not the IDLE line is low (block 610). If not, the flow goes to block 608. If yes, an ID byte is transmitted in block 612 after which the flow goes to block 608.

At block 608, a question is asked whether a bad message has been received. If yes, the message is discarded in block 614 and the program proceeds to the return-from-interrupt block 602. If the reply in block 608 is no, block 616 saves the message and processes the last message. Thereafter, the program flows to block 602.

CCD Interrupt Handling

Figure 15A:
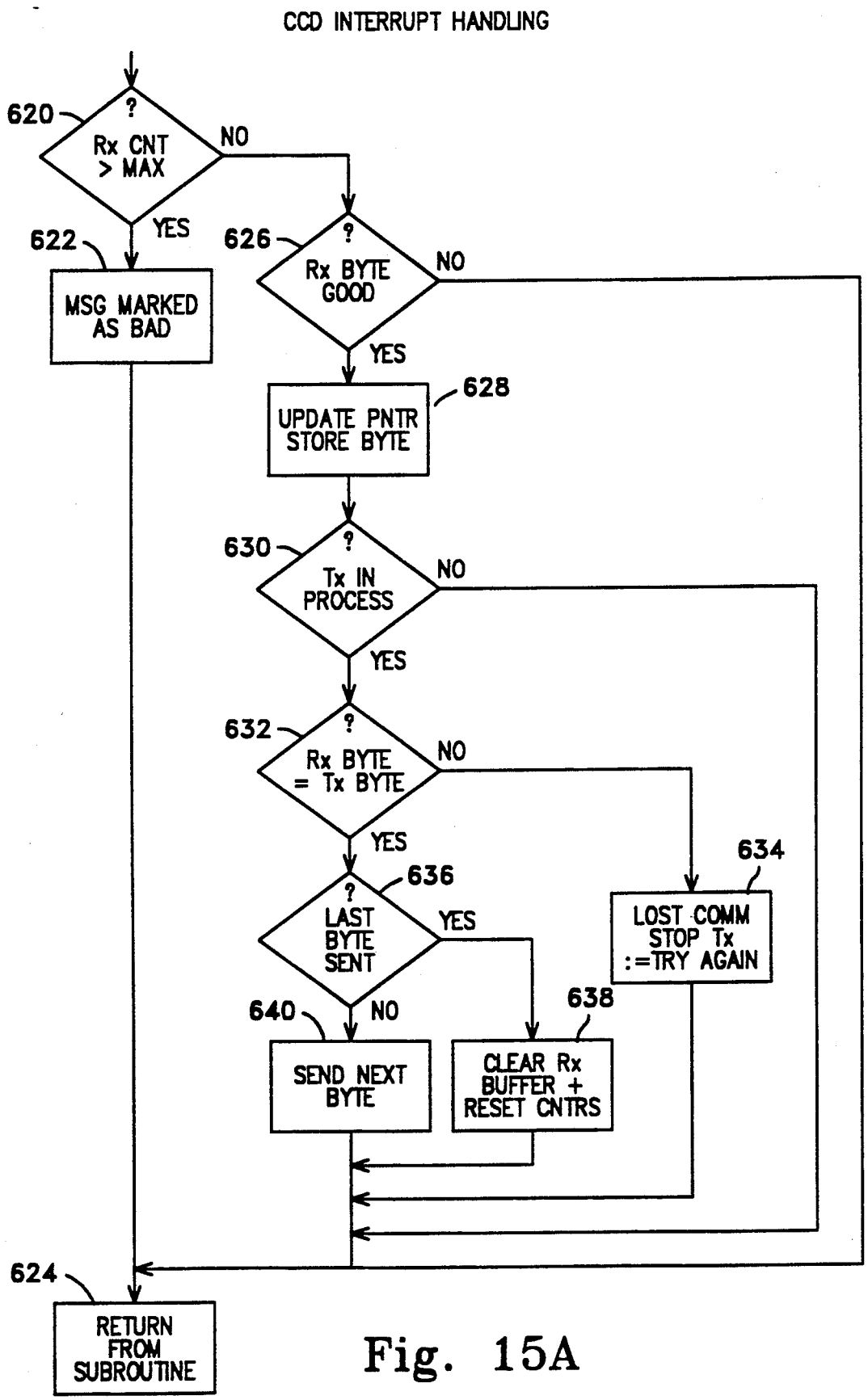
FIG. 15A shows steps in a method for handling CCD bus interrupts.

FIG. 15A shows the steps in handling an interrupt between the CCD bus 14 and the microcomputer 84. In block 620, the question is asked: "Is the receiving count greater than the maximum permitted count?" If yes, the message is marked as a bad one in block 622 and the flow returns from this subroutine at block 624.

If the count at 620 does not exceed the maximum permissible count, the question is asked in block 626 whether the received byte is good. If not, the flow returns from the subroutine via block 624. If yes, the pointer is updated in block 628 and the byte is stored.

The question is then asked in block 630 whether transmission is in process. If not, the flow returns from the subroutine via block 624, and if yes, the question is asked in block 632 whether the received byte is identical with the transmitted byte. If not, the communication has apparently been defective; transmission is stopped and another try is made by returning from the subroutine via block 624.

If the received byte matched the transmitted byte in block 632, the question is asked in block 636 whether the last byte was sent. If yes, the receiving buffer is cleared in block 638 and the counters are reset, after which the program returns from this subroutine via block 624. If in block 636 the byte was not the last byte, block 640 calls for sending the next byte, after which the procedure returns from the subroutine via block 624.

The following messages are sent on the CCD bus 14: passenger door commands, sensor state information to the body computer, memory recall and set commands, diagnostics responses, module error messages, ignition on, ignition key present, transmission select, and speed.

A command is sent to the passenger door module 18 from the driver door module 16 whenever a passenger window, door lock, or mirror motor must be turned on or off based on a driver switch actuation.

A data message is sent to the body computer whenever a related sensor has a state change. When a memory recall or set function is validated and enabled, a command is sent out to the passenger door module so it can take the correct action with the passenger mirror. This command can also be used by the radio or other "driver configurable" modules if desired.

The multiplex door module system can be diagnosed from a diagnostic input point. A diagnostic command addressed to the driver door module always gets a response. If the command operation is not allowed in the door module, the response indicates this fact. The door module accepts the following diagnostic functions: return fault code, clear fault code, return software revision number, and dump memory byte. A module error message is sent if a fault exists on the fault stack. Faults include output module missing.

Information On CCD Bus

Information received from the CCD bus includes:
1) ignition on
2) vehicle moving—memory recall
3) vehicle speed—auto door lock
4) lights on/off—backlight the switch labels
5) brightness—dimming level of backlight switches (rear door does not have backlight switches)
6) key in ignition.

Information that is transmitted from the microcomputer 84 to the CCD bus includes:
1) door handle, key cylinder state change—to body computer
2) jamb, ajar state change to body computer
3) window, door lock, mirror commands—to passenger door system
4) lock-out command—periodically to passenger door system Other input/output messages that may be related to the CCD bus are:
1) head-lamp switch directly controlling courtesy light
2) door handle and jamb inputs to courtesy light outputs, with delay-time-to-off of 25 seconds and fade-to-off of additional 5 seconds
3) rear door light controlled by extra wire from front
4) key cylinder light follows courtesy light output
5) security;
Arm the system with door light switch, ignition off, and no key in ignition. Disarm the alarm circuit by key cylinder switch.

Memory Power Seats

The multiplex door module system includes memory Power seats that are 6-way power adjustable, with power recline for the front seats.

The basic seat control function employs a group of manual switches (FIGS. 8A and 9C) in the driver's door which control the seat motors, using reduced electronics and an unusual control system.

The seat track includes two output modules for driving either three or four axes of the seats. Sensors are provided for sensing rotation of the seat track gears, for determining seat position.

The seat system includes storage and retrieval of seat memory positions from the body computer 12. Seat memory cannot be recalled when the vehicle is moving or the seat belt is fastened.

Seat Initialization

A seat initialization capability is provided to allow the seat to be moved through its full range of motion so that the hard limits can be determined and to reset the current-position counters to a known value. This function is performed by activating both memory 1 and memory 2 switches simultaneously, (FIG. 8A).

Seat initialization is permitted only if no other seat function is currently active, the vehicle is in park, and the door is open to provide a safety exit. After passing these tests, all seat axis limits, stall and position counters, and memory registers are reset. Preset values are loaded into the memory buffer for memory recall and the recall function is enabled.

The seat moves to the farthest forward and up locations until all stalls are detected. These positions are then stored as forward and up hard and soft limits for each of the axes. Then the second set of preset values is loaded into the memory buffer and the process is repeated for back and down.

When all stalls have been detected, these positions are stored as back and down hard and soft limits for each of the axes. When the last axis has stalled out the seat is returned to a "center" position based on the hard limits which were just determined. The initialization is then complete.

If any manual seat switch is actuated during seat initialization, the initialization procedure is cancelled and a new switch request is acted upon. The seat initialization function is required only after door system power up or reset.

All basic seat functions would work without first initializing the seat, however, the absolute current position and hard limits would then be unknown. Soft limits, which are due to temporary obstructions, such a box on the floor of the back of the vehicle, are used to prevent certain types of repeated stall conditions from occurring, at positions not at the physical ends of tracks. If the seat initialization is done while there is an obstruction present, the axis involved has a restricted range of travel.

Switch Validity

A switch validity routine screens out invalid combinations of switch selections, for example, "tilt forward" and "back" can both be active simultaneously, but forward "tilt back" cannot. The validity checker also monitors for invalid combinations occurring during a valid switches-being-active condition. This allows for continuation of movement when an illegal condition occurs after an axis is already in motion. It also permits an axis to begin moving once an illegal combination becomes a valid one.

The request prioritizer then forwards the allowed switch states (requests) to a generic seat algorithm which is called up for each of the axes. The algorithm uses the new request to determine whether or not a CSC command must be issued based on the present state of the seat motor.

Seat Count Routine

The count routine for each axis keeps track of the position of the seat axis and determines if the stall condition or a soft or hard limit has been reached. If so, a stop request is issued and the algorithm factor is discontinued pending a determination of the state of the seat motor and therefore, the command to be issued. If any of the manual seat switches is pressed during a memory set or recall, the memory function is first cancelled, then the manual request is allowed.

The count routine for each seat axis uses the previous request (state) to determine direction for counting rotation of the gear track. In addition, it has a software counter for detecting a stall condition. A soft limit is set using this location as a reference.

An alternative method for sensing a stall is to time the intervals between pulses, e.g. from the seat photosensing transistor 578, whenever a motor is supposed to be running. When the time between light Pulses exceeds a preset limit a stall is signalled.

A hard limit represents the actual physical end of the track as determined by the seat initialization routine. Hard limits are used to eliminate unnecessary stall currents when the seat is already known to be at an end of the track.

The count routine also compares the present position to both soft and hard limits. If either is reached, a stop request is generated. A soft limit is cleared, however, if it is first reached, and the corresponding switch is then released and repressed, and the motor successfully passes the old soft limit.

Seat Memory

The set function for seat memory is utilized by depressing the set switch followed by either memory 1 or memory 2 within 70 scans, which is approximately 2.5 seconds. If this sequence is accepted, the seat set routine loads the current seat position into the selected memory location. If any other seat switch becomes active during the 2.5 second period, or the memory recall function is already in process, the set function is cancelled. The set switch does not cancel the memory recall.

The memory recall function is performed by activating either the memory 1 or memory 2 switch when it does not follow set switch within 2.5 seconds. This routine also checks to make sure that the car is in park with the seat belt unfastened. After passing these tests, the selected recall position is compared against the hard limits to confirm that the position is valid and within bounds. If the position is valid, the memory position is loaded into a buffer for memory recall and the recall function is enabled.

The memory recall algorithm then compares the requested position with the current position to determine the direction for each axis. It then enables up to two axes in the following priority sequence: horizontal, tilt front, tilt back, recline. Once an axis completes its motion to the requested position the next axis is enabled.

The axis motion is also considered to be completed if a stall condition is detected. The recall function is cancelled and the new switch request is acted upon when any manual seat switch is activated. A memory switch function is not cancelled by the other memory switch or by the set switch.

Seat Position Tracking

The count algorithm and the seat algorithm within the door module software together provide a means to track the position of each seat axis whenever a motor is on. Specifically, the seat algorithm gets a new request from the seat request prioritizer based on manual switch inputs or memory recall requests. This new request is compared to the previous request, which is stored in a state variable register, one of which is provided for each output.

In the case in which the previous request was a stop request and the new request is forward, and no limits have been reached, a command is sent on the CSC bus to turn on the motor. The in-motion bit (bit 7) is set in the state variable, and a new request is then transferred to the previous request position within the state variable.

The count algorithm looks at the state variable for a given seat axis upon each scan (35-mS software loop time) to see if it is in motion. If this bit is set, the motor has been commanded to move. The count algorithm then looks at the associated sensor to see if it has changed state, which indicates actual motion.

If the sensor has changed state, the count algorithm looks at the previous request within the state variable to determine in which direction the motor has been commanded to move. It increments or decrements the position counter accordingly.

The count algorithm then compares the position counter to the soft limits, hard limits, and memory recall position if applicable. If the position counter equals any of these, it sets the stall bit (bit 6) in the state variable to indicate to the seat algorithm that a limit has been reached.

when a seat axis is considered in motion the count algorithm also maintains a separate stall counter. If the state of the position sensor has not changed since the last scan, the stall counter is incremented. If this counter reaches 20 (approximately 700 mS), the stall bit (bit 6) in the state variable is set. This provides a means to detect absence of motion of a given axis when it is commanded to move. The stall bit is then used by the seat algorithm to issue a stop command. The count algorithm also sets the soft limit for the axis to the current position unless a memory recall is in process.

The seat algorithm receives a new request upon each scan to determine whether or not a new CSC command must be issued. In addition, if the stall bit has been set by the count algorithm, the seat algorithm immediately issues a stop command regardless of the other requests. Once a stop command has been issued, the stop bit (bit 4) of the state variable is set. This is used by the algorithm to ignore the existing request until a new request is received. An example occurs when the seat forward switch is still pressed after the soft limit has been reached.

If the new request is a stop request, the seat algorithm checks the stop bit of the state variable to see whether the motor has already been commanded "OFF". If not, it issues the command. On the next scan it detects that the stop bit of the state variable is set. It clears the state variable including the in-motion bit. In turn, the count routine stops counting.

Before the seat algorithm issues a start command, it compares the current position with the hard limits. This is to prevent turning the motor on if it is already at the end of the track. Note that if a soft limit has previously been set which is not at a hard limit a second actuation of the seat switch will permit the motor to start and to try to pass (i.e. override) the soft limit. If successful, the soft limit is then reset to the hard limit since the original soft limit condition no longer exists.

In order to assure that the count algorithm accurately tracks the actual position of each seat axis, each change in state of the position sensor must be properly detected. The sensor of this embodiment is designed to indicate a "one" for half of a rotation and a "zero" for the other half of the rotation. On the horizontal axis, one-half rotation equals 0.167 inch of linear travel. The worm gear rotates at approximately 400 mS per revolution or 200 mS per half revolution.

Because the scan time is approximately 35 mS, the system scans each sensor a minimum of 6 times per state change. (This is well above the required two samples per cycle required by Nyquist theory.) The door module currently resolves the accuracy for positioning to one-half of a rotation, which provides adequate resolution.

The vertical seat axes rotate at even fewer revolutions per minute, so their sampling frequency is not a problem. The linear positioning resolution for one half rotation is 0.0625 inch, which is more than adequate.

Photo Interrupter and Interface Board

A seat photo sensor includes an LED 574, gear 575, and phototransistor 578 (FIG. 1B) to sense rotation of the seat position lead screws. An interface board 568 is used to condition the outputs of the seat photo interrupters. The board 568 has several identical channels, one for each axis of motion. Current limiting resistors 570 and 572 set the current of the light emitting diode (LED 574) at 20 mA. A resistor 576 is a collector load resistor for the phototransistor 578.

The output of the phototransistor 578 drives the input of an LM 324 operational amplifier 580. This operational amplifier 580 is connected as a comparator with hysteresis. The reference input of the comparator 580 is connected to a voltage divider consisting of resistors 582 and 584. The phototransistor output is compared to this reference. The output of the comparator 580 drives a transistor 586 which is connected to the switch input 588 of the CSC bus sensor interface 590.

When the CSC bus 20 is scanned by the door module 16, the state of the photo interrupter 568 is transmitted over the bus 20. Because of the signal conditioning provided by circuit 580, 586 and 590, there is no ambiguity in the state of the photo interrupter output and therefore, there is no loss of seat position information.

Missing Sensor

Figure 15B:
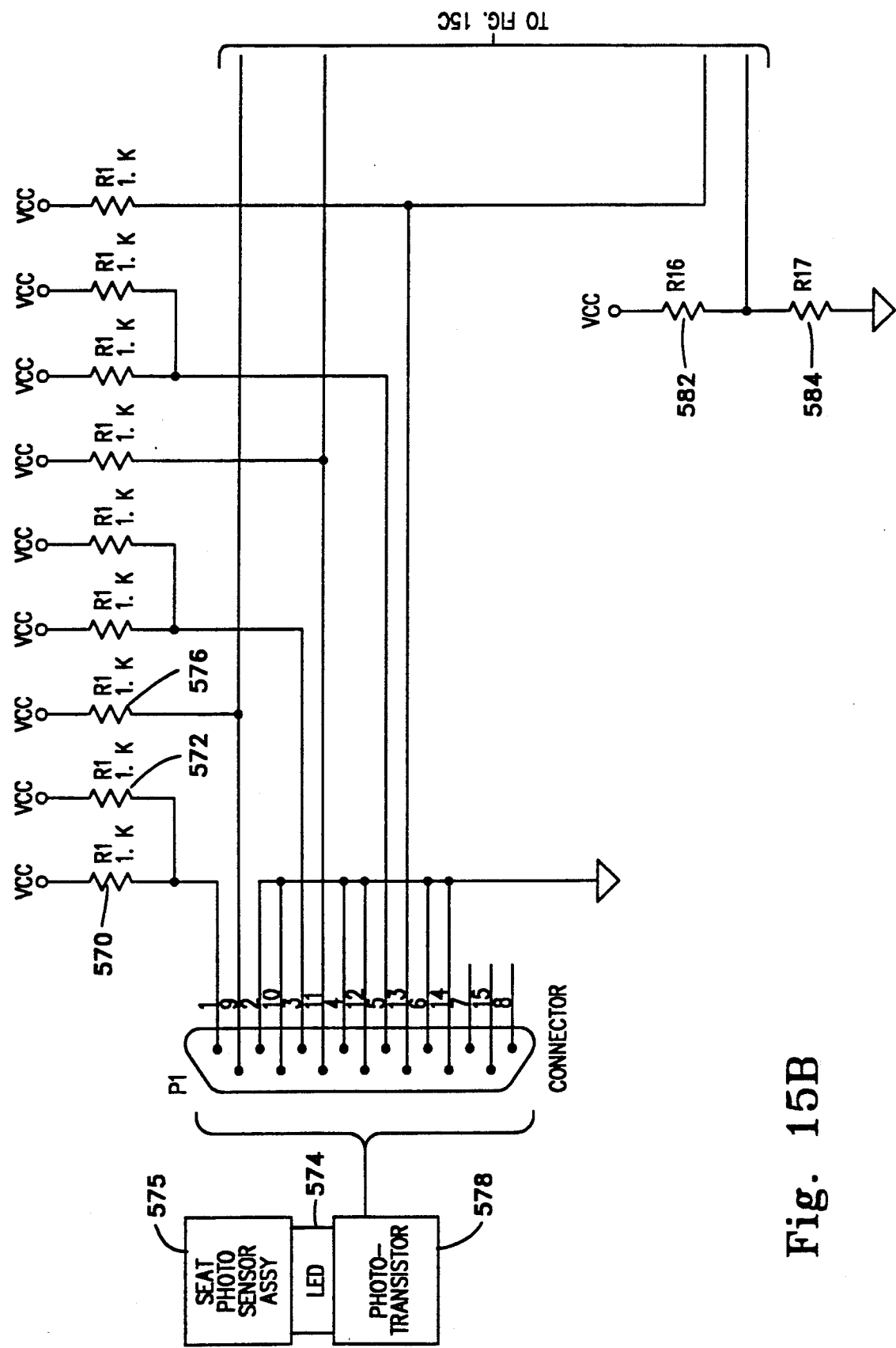
FIG. 15B and 15C together are a circuit and block diagram of a seat axis photo interrupter sensing subsystem.
Figure 15C:
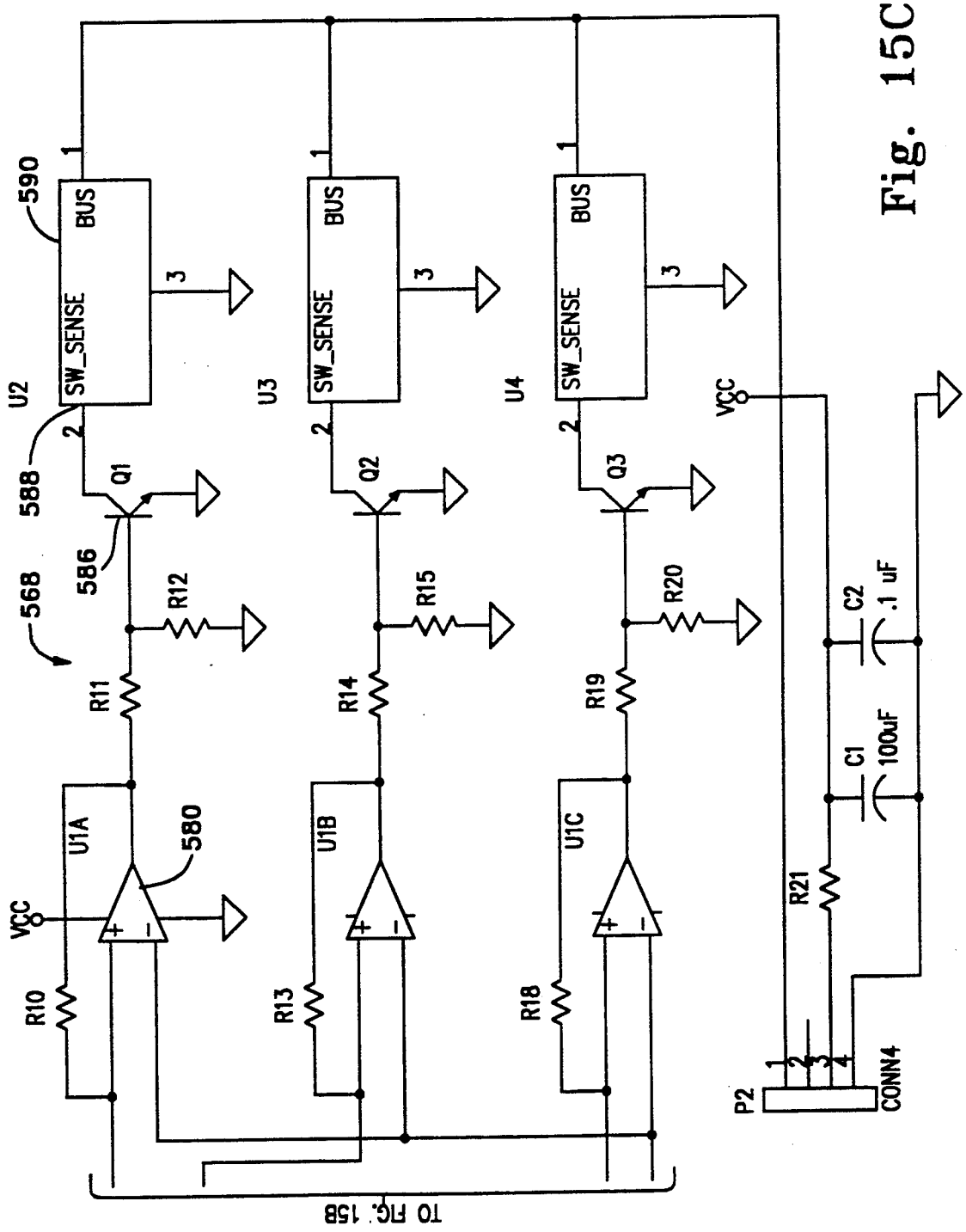

A missing seat position sensor, FIGS. 15B and 15C, is detected by the loss of the sensor presence current on the CSC bus during the first half of that sensor's address slot. A missing sensor is considered a fault condition. A fault code is logged within the cognizant door module and a CCD message is sent.

The seat axis can still be moved with the manual (non-memory) switches, but the memory recall is disabled. Under this condition, the door module responds the same way as present automotive systems that use potentiometers. Once the sensor is replaced or reconnected, the seat should be reinitialized to establish the correct hard limits again.

FIG. 1A shows a time line, indicated generally as 700, of seat control activity. This applies to an in-motion situation of a seat axis. At a time interval 702 a switch is active; at 704 the sensors are scanned; at 706 a count algorithm described elsewhere is performed, at the end of which the count is inactive.

In time interval 708 the seat algorithm is carried out; and in time interval 710, an output command is accomplished. The motor turns on at time 712. The entire cycle is then repeated.

In FIG. 16B a time line indicated generally as 718 depicts a transition of a seat from being in motion to being at a stop. The switch is released at time 720. Sensor scans occur in the interval 722; the stall count algorithm is in interval 724, and the seat algorithm occurs in interval 726. That is followed by a stop command and an output command interval 728.

The motor turns off at instant 730. In the next cycle, 32 mS later, the count occurs the last time in an interval 734, and the state variable is cleared in an interval 736. The bits that are cleared are "in motion" and "stop".

State Variable Registers

FIG 17A illustrates a state variable register as it applies to this invention. In FIG. 17A, a data block 740 shows the format of state variable storage for seats and mirrors. A bit 742 indicates an axis in motion. A bit 744 indicates stall (as shown by counter) or that a limit (soft or hard) has been reached, if appropriate. A bit at 746 indicates whether the axis motion has stopped. The next group of bits 748 indicates the previous request and a neighboring group 750 indicates a new request. In a similar manner, state variables are provided for door locks and windows, as shown in FIG. 11B. The entire state variable is indicated generally as 754. The first bit 756 indicates in-motion, and initial CMD or CSC sent. A previous request is stored at 758 and a new request is stored at 760.

A state variable 764 is provided also for down window with express to a fully down condition. This differs from the state variable of FIG. 1B in that during an interval 766, the window continues to move until it is fully down, then express is returned to stop.

In FIG. 17D, a state variable format, designated generally as 780, is shown for the CCD bus and windows. The first bit, representing in-motion, is an initial command that was sent. There may or may not be an interval 784 of waiting for acknowledgement.

In FIG. 17E, a switch active register map is indicated generally by 788. It includes position indications 790-794 as follows: memory switch active, seat switch active, mirror switch active, window switch active, and door lock switch active, respectively.

Prioritizing Seat Commands

Figure 18:
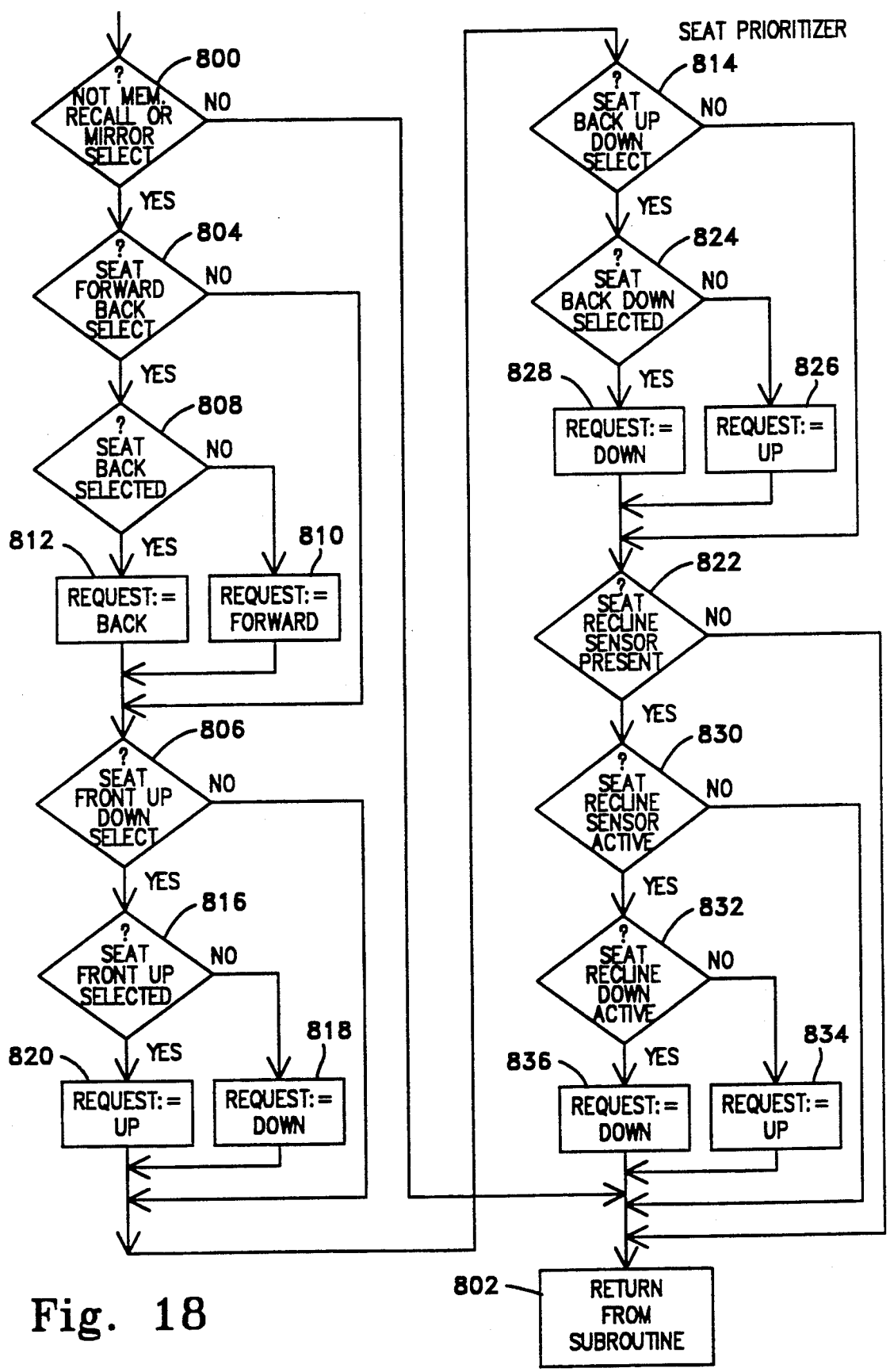
FIG. 18 shows steps in a method for prioritizing seat control commands.

The procedure for prioritizing seat commands is shown in FIG. 18. Block 800 asks a question "Not memory recall or memory select?" If no, the flow proceeds to block 802 where it returns from this subroutine. If yes, the question is asked at 804: "Does the selected command specify that the seat be moved either forward or back?" If no, (neither), the flow proceeds to block 806.

If yes, the flow goes to block 808 where a question is asked "Does the command call for moving the seat back?" If no, block 810 specifies that the request be set equal to forward, after which the flow proceeds to block 806. If the answer to the question at 808 was yes, block 812 specifies that the request be set equal to back, and the flow proceeds to block 806.

At block 806 the question is asked "Was the command selected to move the seat front up or down?" If the answer is no, (neither) the flow proceeds to a block 814. If yes, it proceeds to a block 816 where the question is asked whether the command was to move the seat front up. If no, block 818 specifies that the request be set equal to down and the program proceeds to block 814. If the answer at question 816 was yes, the request is set equal to up in block 820 and the program proceeds to block 814.

At block 814 a question is asked whether the command was to move the seat back either up or down. If no, the program moves to block 822. If yes, it goes to block 824. At 824 the question is asked "Is the seat back being commanded to move down?" If no, then block 826 sets the request equal to up and the program moves to block 822. If yes, block 828 sets the request equal to down and the program moves to block 822.

At block 822 the question is asked "Is the seat recline sensor present?" If no, the flow proceeds to the block 802 where the program returns from this subroutine. If yes, the question is asked at block 830 whether the seat recline sensor is active. If it isn't the program proceeds to block 802 and if yes, it proceeds to block 832.

A question is asked in block 832 whether the command calls for a seat recline downward motion. If not, block 834 specifies that the request be set equal to up. If yes, block 836 specifies that the request be set equal to down. The outputs of both block 834 and block 836 go to the return block 802.

Seat Command Algorithm

Figure 19A:
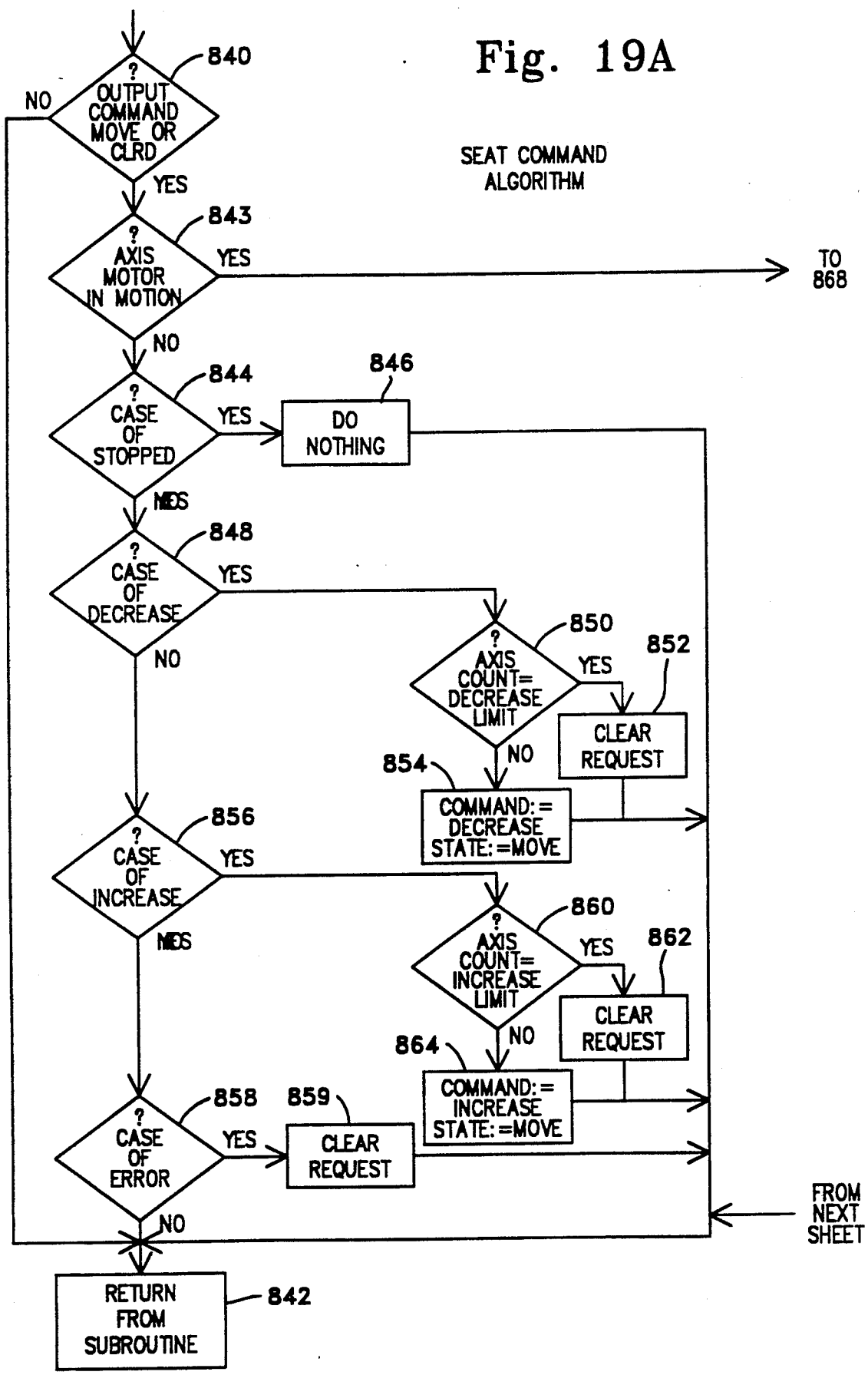
FIGS. 19A and 19B together show steps in a method for performing a seat command algorithm.
Figure 19B:
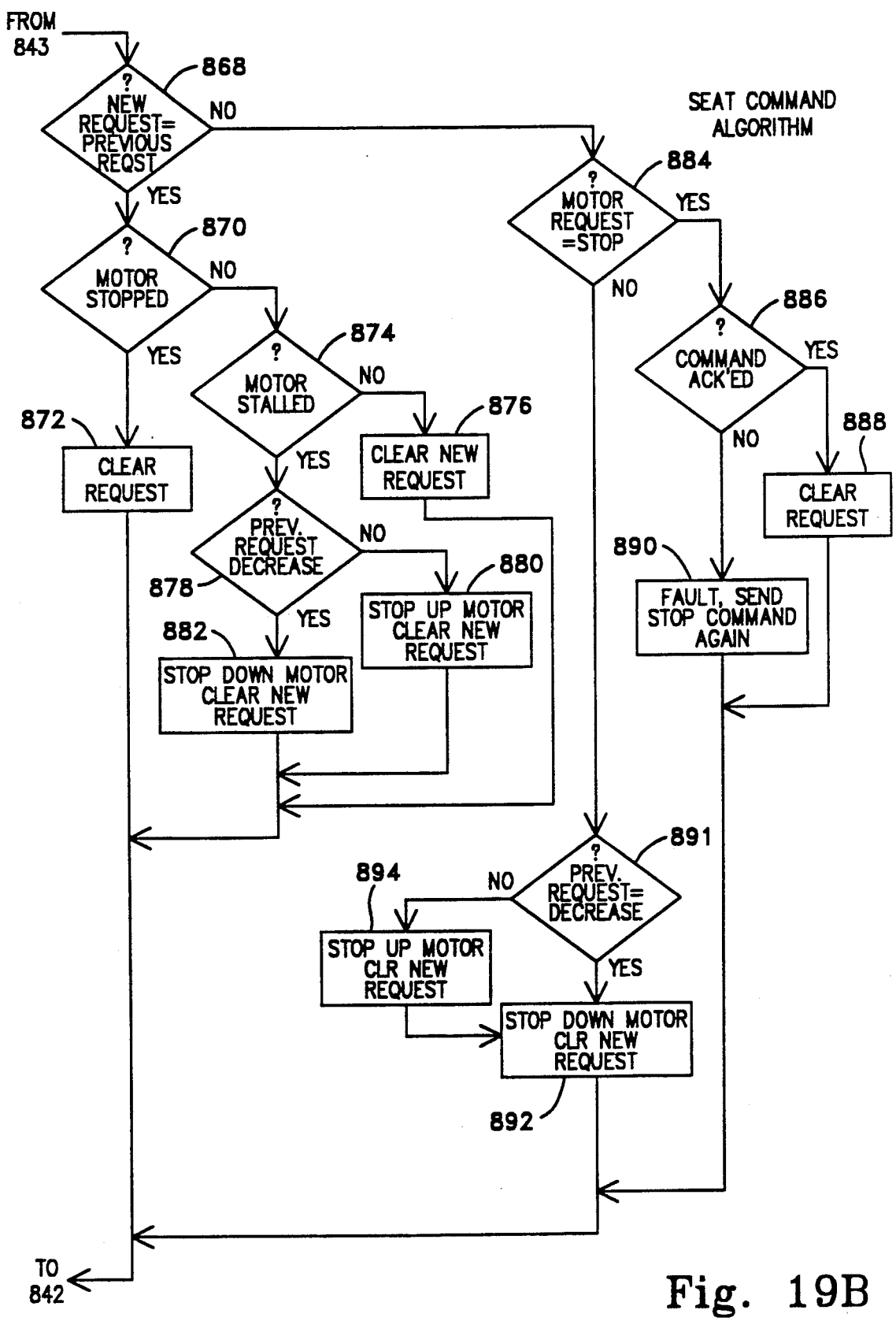

A seat command algorithm is shown in FIG. 19. It starts with block 840, asking the question "Output command move or cleared?" If no, the program proceeds to block 842 at the bottom of FIG. 19, which specifies return from this subroutine. If yes, the question is asked in 843 "Is the axis motor in motion?" If no, block 844 asks "Is this a case of its being stopped?" If yes, block 846 says to do nothing, and the flow proceeds to block 842.

If it is not a case of being stopped, the question is asked in block 848 whether it is a case of decrease. If yes, block 850 asks "Is the axis count equal to the decrease limit?" If yes, block 852 clears the request and directs the flow to block 842.

If the answer at block 850 is no, a block 854 sets a command equal to decrease, and sets the state equal to move, after which the flow returns from the subroutine at block 842.

Going back to block 848, if this was not a case of decrease, block 856 asks "Is this a case of increase?" If no, block 858 asks "Is it a case of error?" If no, the program goes to block 842. If in block 856 it was a case of increase, block 860 asks "Is the axis count equal to the increase limit?".

If yes, block 862 clears the request and the flow goes to block 842. If not, the command is set equal to increase and the state is set equal to move, in block 864. The program then moves to block 842. At block 858, if it was a case of error, a clear request is made in block 859 and the program goes to 842 for return from this subroutine.

Returning now to block 843, at the top of the FIG. 19, if the axis motor is in motion, block 868 asks "Is this new request identical with the immediately preceding request?" If yes, block 870 asks "Is the motor stopped?" If yes, a clear request is provided in block 872 and the program moves to the return block 842.

If in block 870 the motor is found not to be stopped, block 874 queries whether or not the motor is stalled. If it is not, the new request is cleared in block 876 and the program goes to block 842.

If the motor is stalled, the previous request is examined to see whether it called for a decrease. If no, block 880 stops the up motor and clears the new request. The program then goes to block 842. If the previous request was for a decrease, block 882 stops the down motor and clears the new request, after which the flow goes to block 842.

Returning now to block 868 near the top center of FIG. 19, if the new request was not the same as the previous request, block 884 asks whether the motor request is to stop. If yes, block 886 asks whether the command was acknowledged. If yes, block 888 clears the request and the program goes to block 842. If no, block 890 declares a fault and sends the stop command again. Thereafter the program proceeds to block 842.

Returning now to block 884, if the motor request was not to stop, block 891 asks "Was the previous request to make a decrease?" If yes, block 891 stops the down motor and clears the new request, after which the program goes to block 842. If no in block 891, block 894 stops the up motor and clears the new request. The program then goes to block 842.

Axis Count Algorithm

Figure 20A:
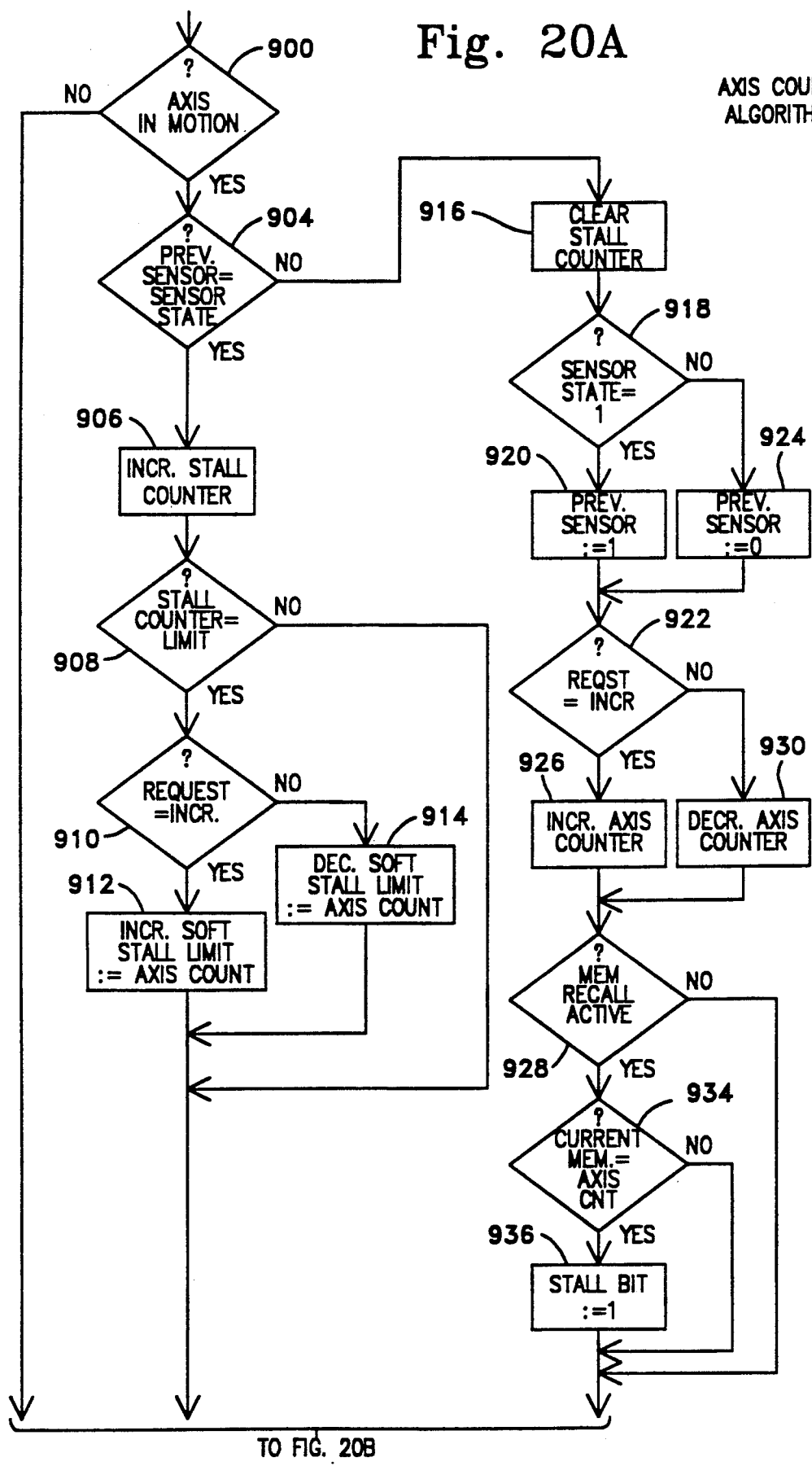
FIG. 20A shows steps in a method for performing an axis count algorithm, related to motion of power seats.
Figure 20B:
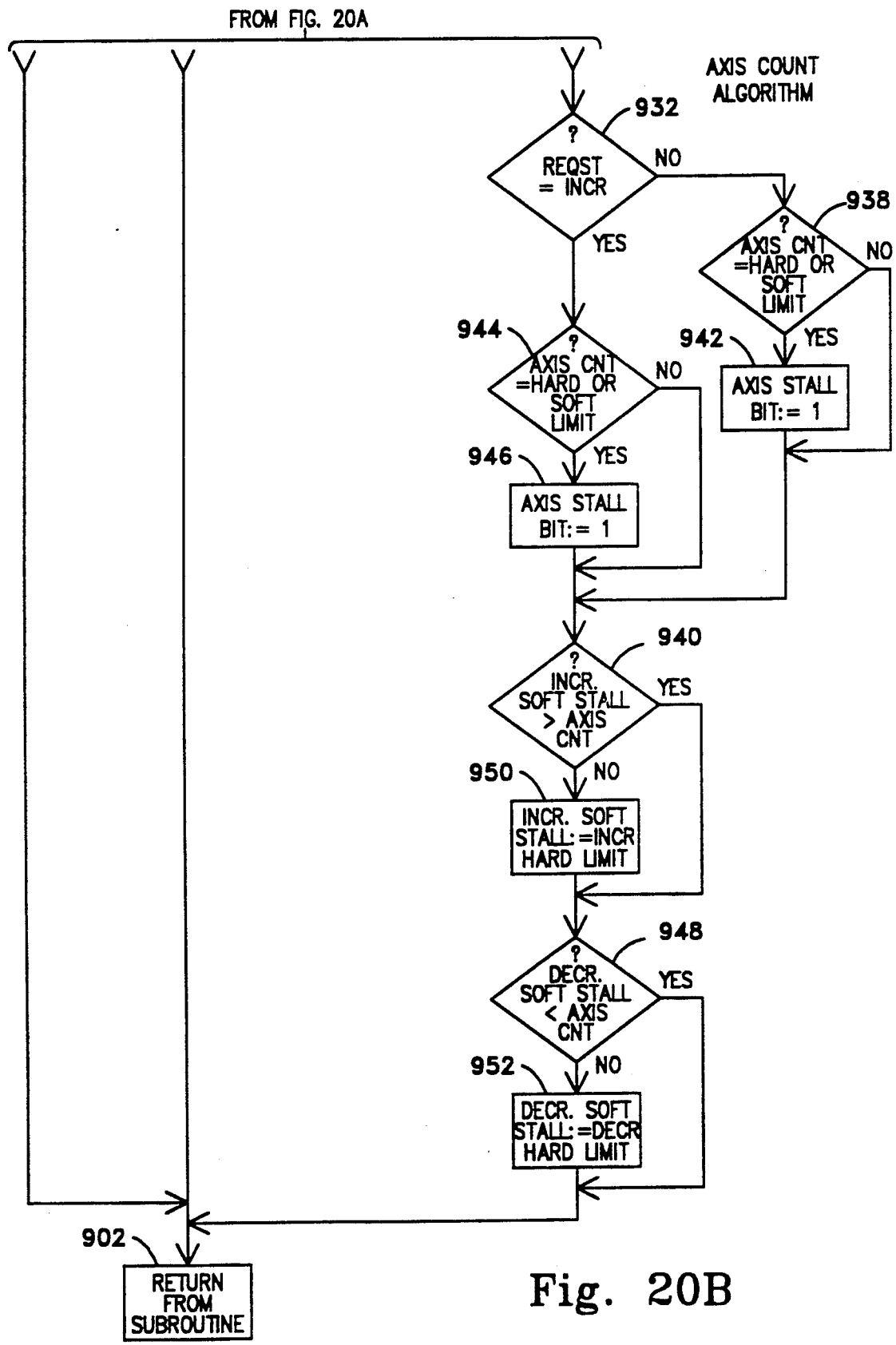
FIG. 20B is a continuation of FIG. 20A.

FIG. 20A shows the steps in the axis count algorithm of the seat control procedures. Block 900 asks the question "Is a seat axis in motion?" If not, block 902 of FIG. 20B specifies that the program return from this subroutine. If yes, block 904 asks "Is the previous sensor equal to the sensor state?" If yes, block 906 specifies that the stall counter be incremented.

Thereafter a question is asked in block 908 whether the stall counter has reached its count limit. If no, the program returns via block 902. If yes, the question is asked whether the request is for an increment (block 910). If yes, block 912 dictates that the increment soft stall limit be set equal to the axis count. Then the program passes to block 902.

If in block 910 the request was not for an increment, the decrement soft stall limit is set equal to axis count in block 914. The program then goes to block 902.

Returning now to block 904 at the top of FIG. 20A, if the previous sensor was not equal to the sensor state, block 916 clears the stall counter. Block 918 then asks whether the sensor state is in state 1. If yes, block 920 sets "previous sensor" equal to 1 and sends the program to block 922. If not, block 924 sets previous sensor equal to zero and sends the program to block 922.

At block 922 the question is asked whether the request is for an increment. If yes, block 926 increments the axis counter and sends the program to 928. If not, the block 930 decrements the axis counter and sends the program to block 928.

Block 928 asks whether the memory recall is active. If not, the program goes to block 932. If yes, block 934 asks whether the current memory is equal to the axis count. If not, the program goes to block 932. If yes, the stall bit is set equal to one in block 936, indicating that the axis count matches the memory position.

On FIG. 20D, at block 932 the question is asked whether the request is for an increment. If no, the block 938 asks whether the axis count is equal to the hard or soft limit. If not, the program goes to block 940. But if the axis count is equal to a hard or soft limit, block 942 sets the axis stall bit equal to one, indicating a stall. The program then goes to block 940.

Returning to block 932, if the request is for an increment the question is asked in block 944 whether the axis count is equal to a hard or soft limit. In this case the limit would be in the "increasing" direction. If the answer is no, the program goes to block 940. If it is yes, block 946 sets the axis stall bit equal to one. The program then goes to block 940.

At block 940 the question is asked whether the increments in soft stall are greater than the axis count. If yes, the program proceeds to block 948. If no, block 950 specifies incrementing the soft stall and setting it equal to the incremental-direction's hard limit.

At block 948 a query is made whether the decremented soft stall is less than the axis count. If yes, the program proceeds to block 902, and if no, block 952 sets a decremental soft stall limit equal to the decremental hard limit. The program then moves to block 902, and returns from the subroutine of FIG. 20.

Initializing Seats Program

Figure 21:
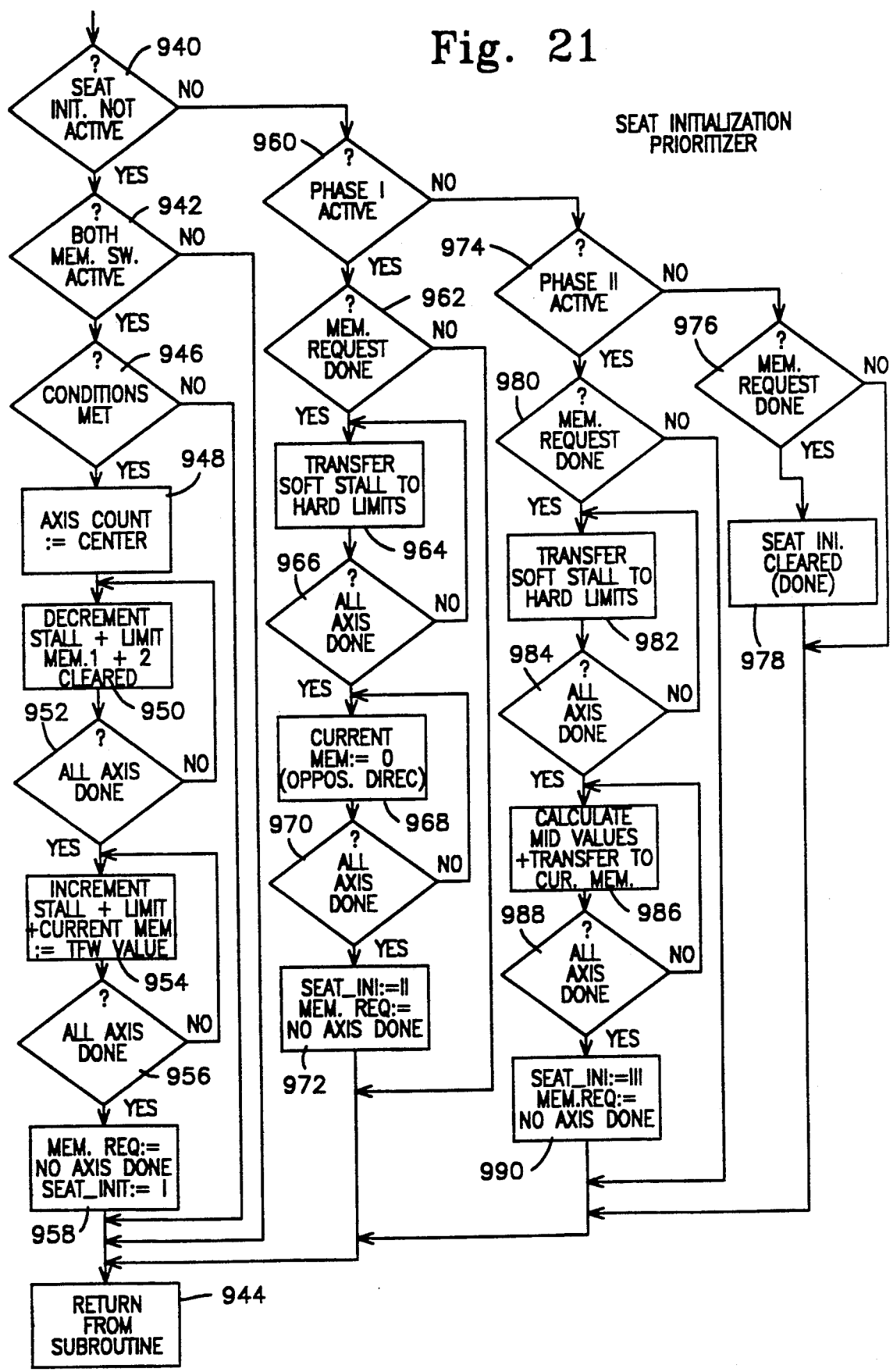
FIG. 21 shows steps in a method for prioritizing initialization of power seats.

The procedure for initializing the seat information, which "finds" the ends of tracks and resets seat position counters to zero, is shown in FIG. 21. Block 940 asks whether the seat initialization is not active. If yes, (i.e., not active) block 942 asks whether both memory switches are active. If not, the program goes to block 944 and returns from this subroutine. If yes, block 946 asks the question "Are the conditions met for initializing the seat?" If no, flow returns from the subroutine. If yes, the axis count is set equal to the simulated center of travel. Then block 950 clears the decrement soft stall limit, the hard limit, and memories 1 and 2 for all axes.

Block 952 asks whether the procedure for all axes are completed. If not, flow returns to block 950. If yes, it goes to block 954 to clear the increment soft stall limit and the hard limit, and set the current memory value equal to the highest value. Then block 956 asks whether the procedures for all axes are done; if not, flow returns to block 954. If yes, block 958 sets the memory request equal to no axis done and sets seat initiation equal to phase I. Flow returns from the subroutine via block 944.

Returning to block 940, at the top of FIG. 21, if seat initiation is not active, block 960 asks whether phase I is active. If yes, block 962 asks whether the memory request is done. If no, program returns from the subroutine via block 944. If yes, the soft stall data is transferred to the hard limits value and the question is asked whether all axes are done, in block 966. If not, flow returns to block 964. If yes, block 968 sets the current memory equal to the lowest value.

At block 970 a query is made whether all axes are done. If not flow returns to block 968. If yes, block 972 sets the seat initiation equal to phase II and sets memory request equal to no axis done. Flow then returns from the subroutine via block 944.

Going back to block 960 on FIG. 21, if phase one was not active, block 974 asks whether phase II is active. If not, block 976 asks whether the memory request is completed. If no, flow returning from the subroutine via block 944; if yes, the seat initialization is cleared (at block 978) because it has been completed. Flow then returns via block 944 from the subroutine.

Going back now to block 974, if phase II is active the question is asked in block 980 whether the memory request is completed. If not, the flow returns from the subroutine via block 944. If yes, the soft stall limits are transferred by block 982 to the hard limits.

Then block 984 asks whether all axes are done. If not, flow returns to block 982; if yes, block 986 calculates the middle values and transfers them to current memory. Block 988 then asks whether all axes are done and, if not, flow goes back to block 986. If yes, the seat initiation is set equal to phase III. Memory request is set equal to no axis done and the flow returns from this subroutine via block 944.

Set Seat Memory Program

Figure 22:
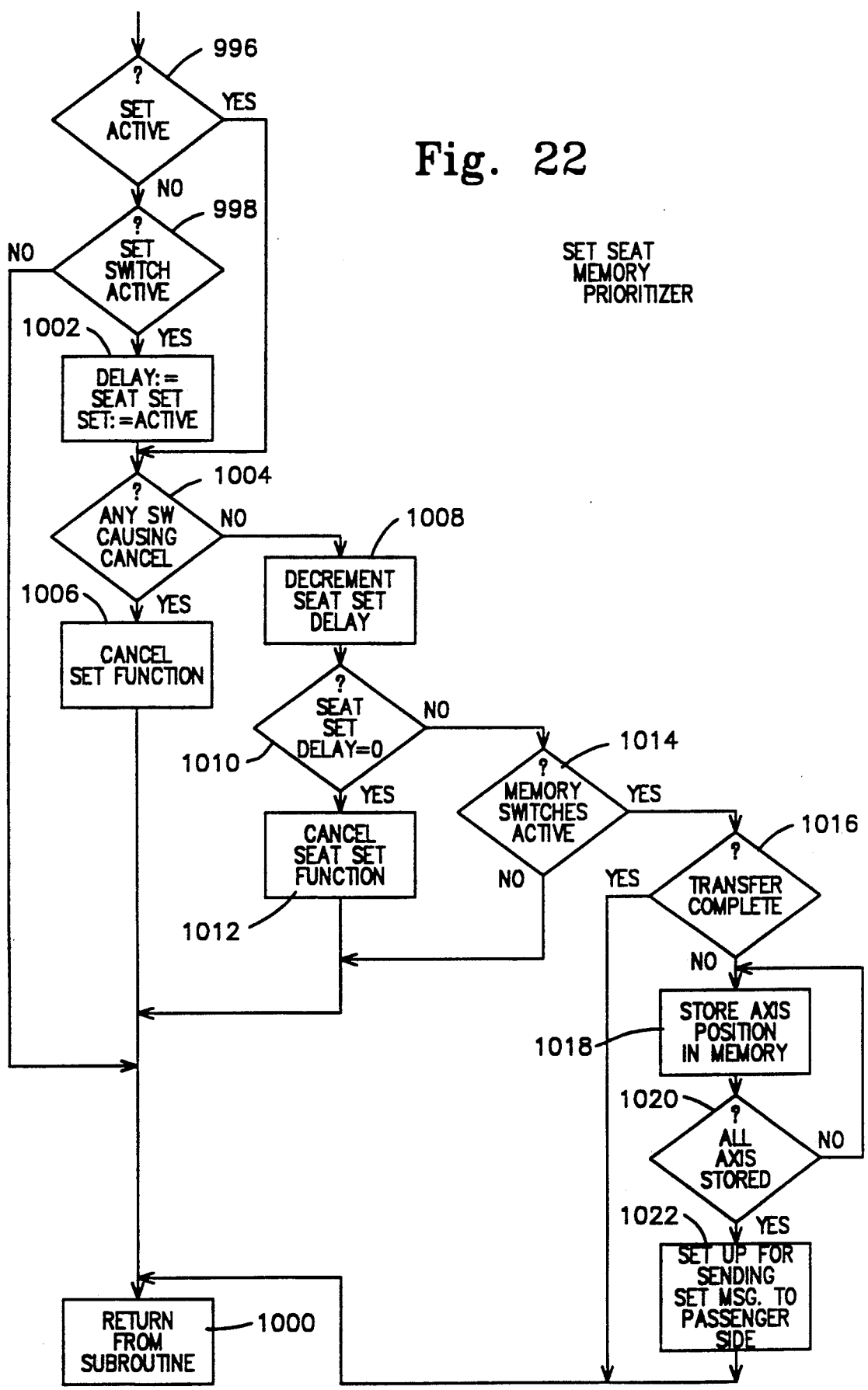
FIG. 22 shows steps in a method of setting a memory position for power seats having a memory.

FIG. 22 shows how the seat memory position is set. Only one memory selection is represented in this flow chart because the others are similar. Block 996 asks whether the set is active. If yes, the routine goes to block 1004, which asks whether any switch is causing cancel. If no at block 996, block 998 asks whether a switch is active. If no, the program returns from the subroutine by way of block 1000.

If yes, block 1002 sets the delay equal to seat set, and sets "set" equal to active. Then block 1004 asks whether any switch is causing a cancellation. If yes, the set function is cancelled by block 1006 and the program returns from the subroutine via block 1000. If no, block 1008 decrements the seat set delay.

In block 1010 the question is asked whether the seat set delay is equal to zero. If yes, the seat set function is cancelled and the program returns from this subroutine via block 1000. If no, block 1014 asks whether the memory switches are active. If no, the program returns from the subroutine. If yes, block 1016 asks whether the transfer is complete. If no, the program returns from the subroutine. If yes, block 1018 stores the axis position in memory.

Then block 1020 asks whether all axes are as yet stored in memory. If no, the flow returns to block 1018. If yes, it goes instead to block 1022. There the system is set up for sending a set message to the passenger side of the vehicle. The program then returns from the subroutine via block 1000.

Seat Memory Recall

Figure 23:
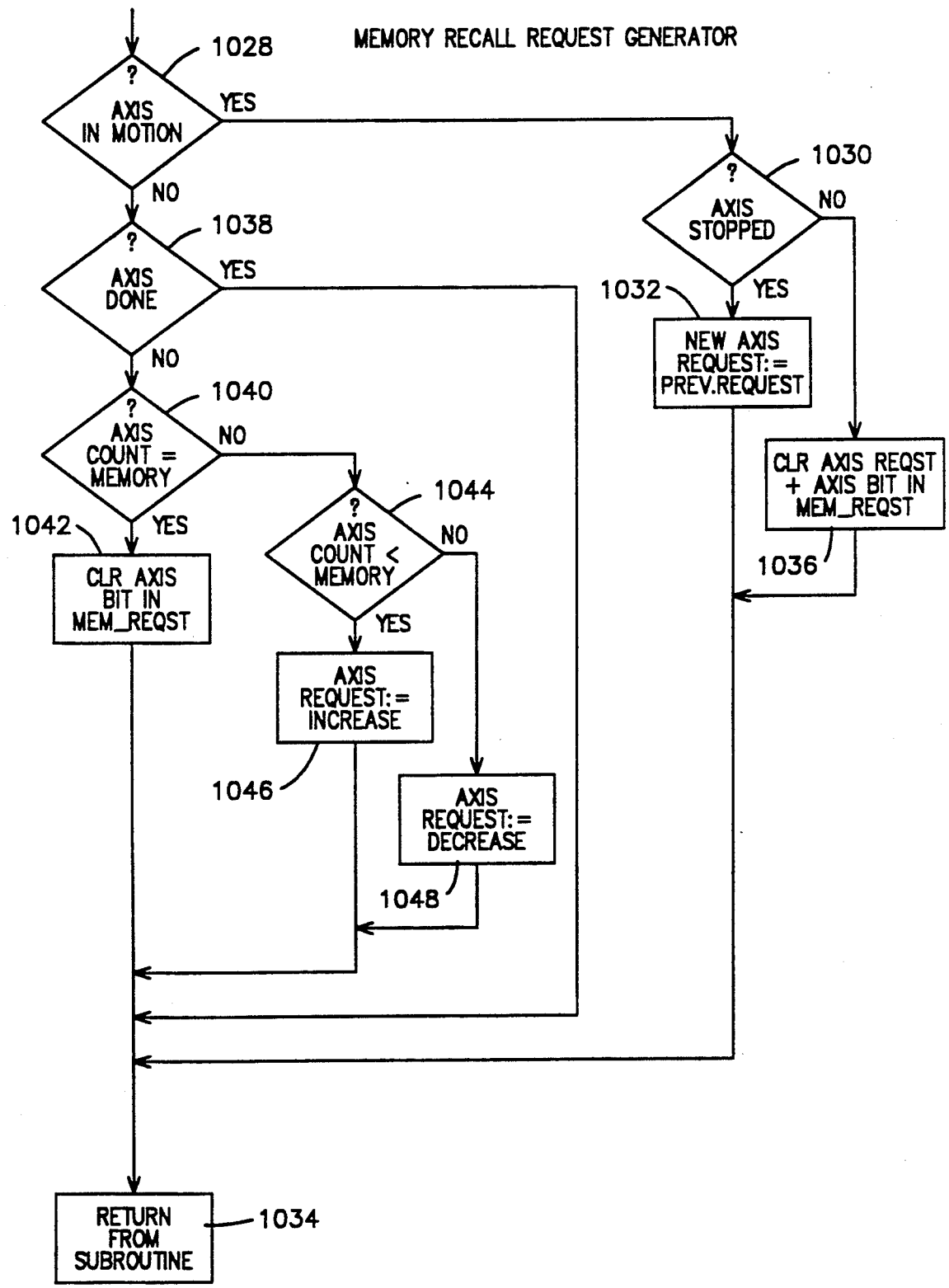
FIG. 23 shows steps in a method of generating requests for memory recall for Power seats.

A memory recall request generator program is shown in block diagram form in FIG. 23. Block 1028 asks whether the axis is in motion. If yes, block 1030 asks whether the axis is stopped. If no, block 1032 changes the new axis request to read like the previous request. The flow then returns from this subroutine via block 1034.

If the axis is found in block 1030 to be stopped, block 1036 clears the axis request and the axis bit in the memory request register. Flow then returns from this subroutine via block 1034.

Going back to block 1028 at the top of FIG. 23, if the axis is not in motion, block 1038 asks whether the axis is done. If yes, the program returns from this subroutine via block 1034. If no, a question is asked in block 1040 whether the axis count is equal to the memory setting. If yes, the axis bit in the memory request register is cleared and the program returns from this subroutine.

If the answer in block 1040 is no, block 1044 asks "Is the axis count less than the memory setting?" If yes, the axis request is made a request for an increase. Flow then returns via block 1034. If no, the axis request is made a request for a decrease (in block 1048) and flow returns via block 134 from this subroutine.

Figure 24A:
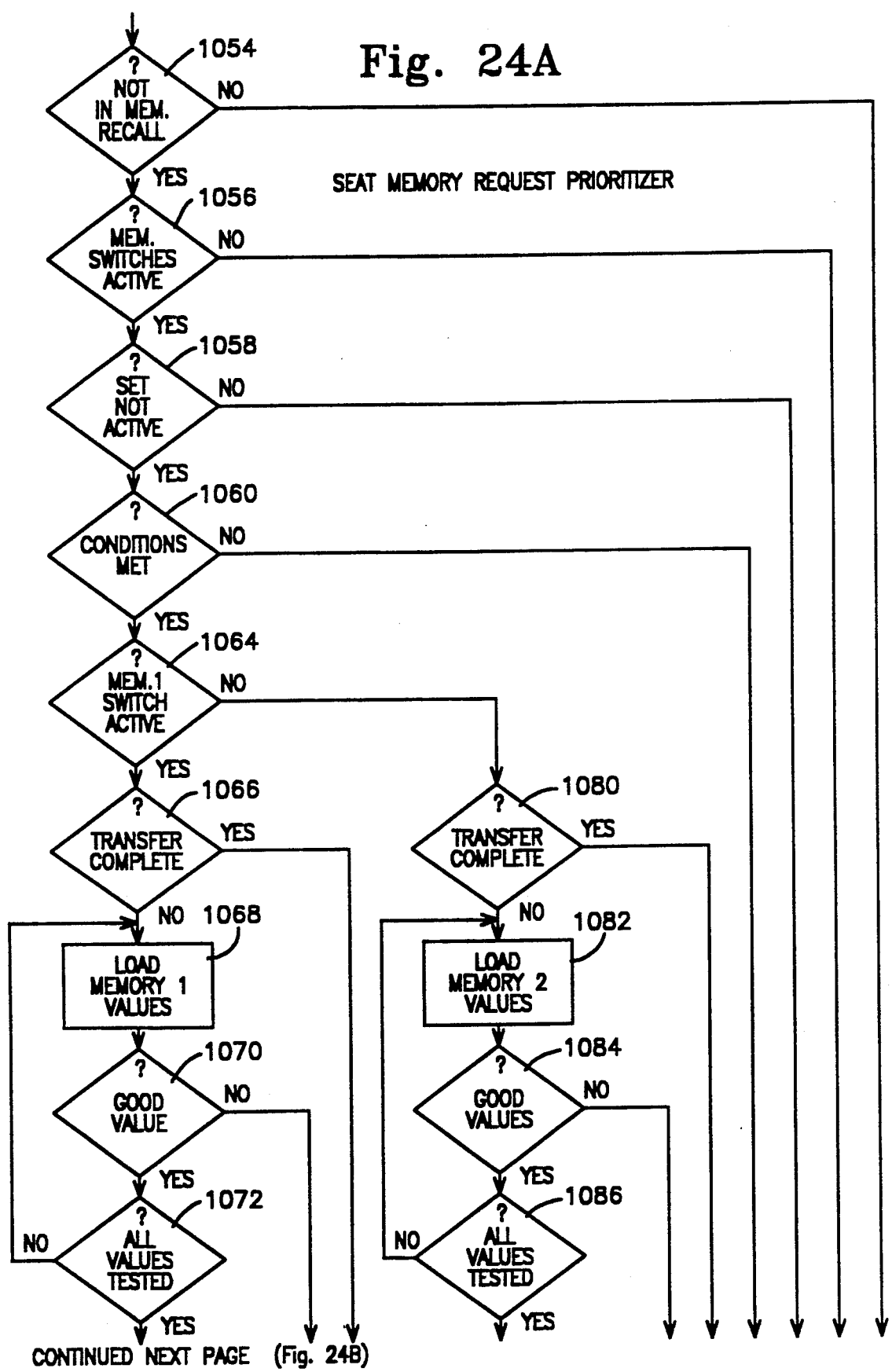
FIG. 24A shows steps in a method for prioritizing seat memory requests.
Figure 24B:
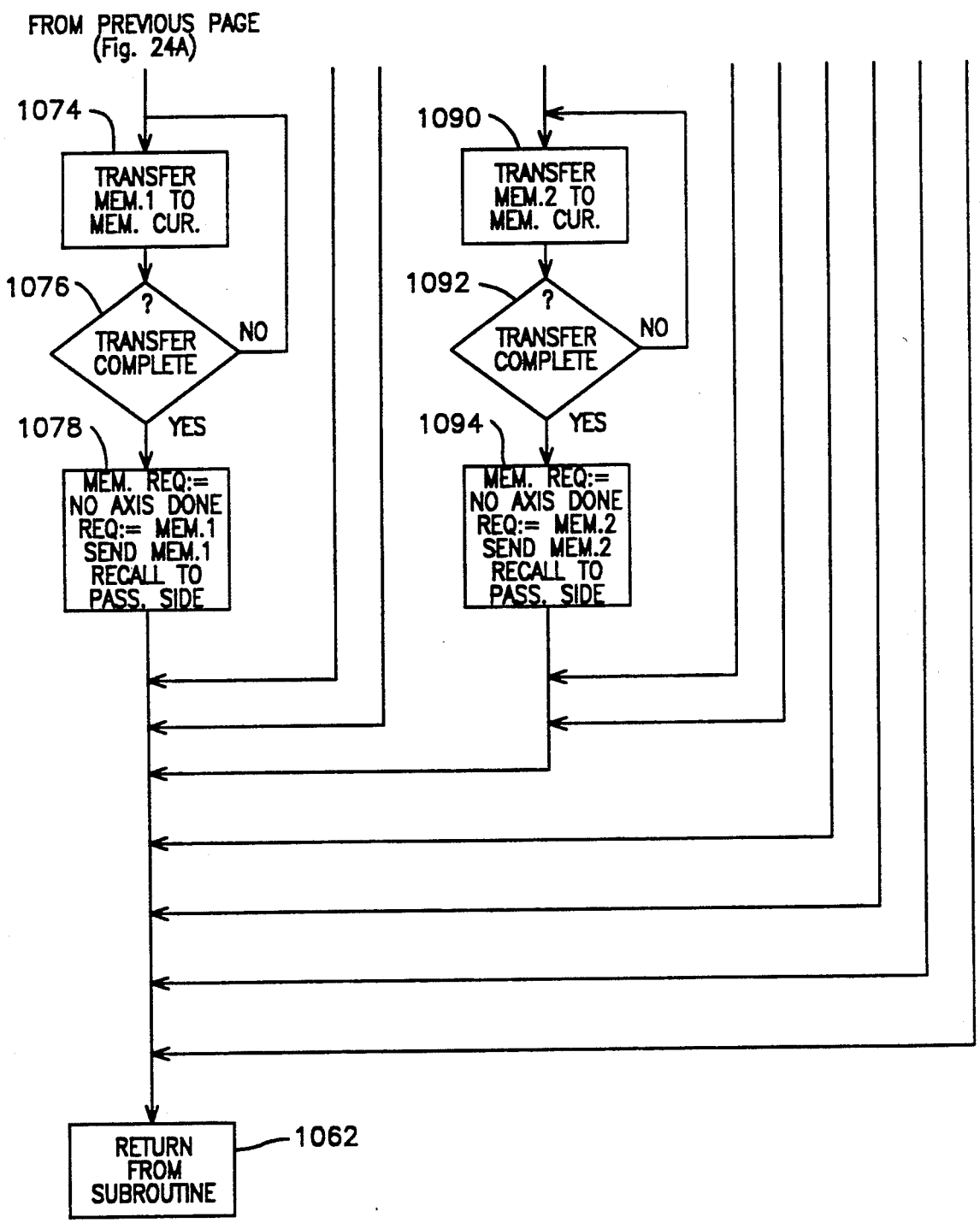
FIG. 24B is a continuation of FIG. 24A.

The seat memory request prioritizer is a procedure that is shown in FIGS. 24A and 24B. A series of questions is asked in blocks 1054, 1056, 1058 and 1060. The questions are: 1054—"Is the system not in memory recall?" 1056—"Are the memory switches active?" 1058—"Is set not active?" 1060—"Are the safety conditions met?" If the answer to any of them is no, the program returns from this prioritizer subroutine via block 1062.

Block 1064 follows block 1060, with the question "Is the memory 1 switch active?" If yes, block 1066 asks "Is the transfer complete?" If the answer is yes, the program returns from this subroutine via block 1062. If no, block 1068 loads the memory 1 values.

Block 1070 then asks whether this is a good value. If no, the program returns from this subroutine, but if yes it asks in block 1072 whether all values have been tested. If no, the program returns to block 1068. If yes, it goes to block 1074 where the contents of the memory 1 register are transferred to the memory current register. Thereafter block 1076 asks whether the transfer is complete, and if it isn't the flow returns to block 1074.

If the transfer is complete, block 1078 sets the memory request equal to no axis done, and sets request equal to memory 1, and sends memory 1 recall to the passenger side of the vehicle. Then the program goes to block 1062 for a return from the subroutine.

Back at block 1064 on FIG. 24A, if the memory 1 switch was not active, block 1080 asks whether the transfer is complete. If yes, the subroutine is terminated by block 1062. If no, block 1082 loads the memory 2 values into the memory current register.

Block 1084 asks whether or not they are good values. If no, the flow returns from this subroutine by way of block 1062. If yes, block 1086 asks whether all values have been tested. If no, the program returns to block 1082. If yes, the flow goes to block 1090 where the contents of memory 2 are transferred to the memory current register.

Then block 1092 asks whether the transfer is complete. If not, flow goes back to block 1090. If yes, block 1094 sets the memory request equal to no axis done. It also sets request equal to memory 2, and it sends memory 2 recall to the passenger side. The program then returns from this prioritizer subroutine via block 1062.

The Seat Memory Recall Algorithm

Figure 25:
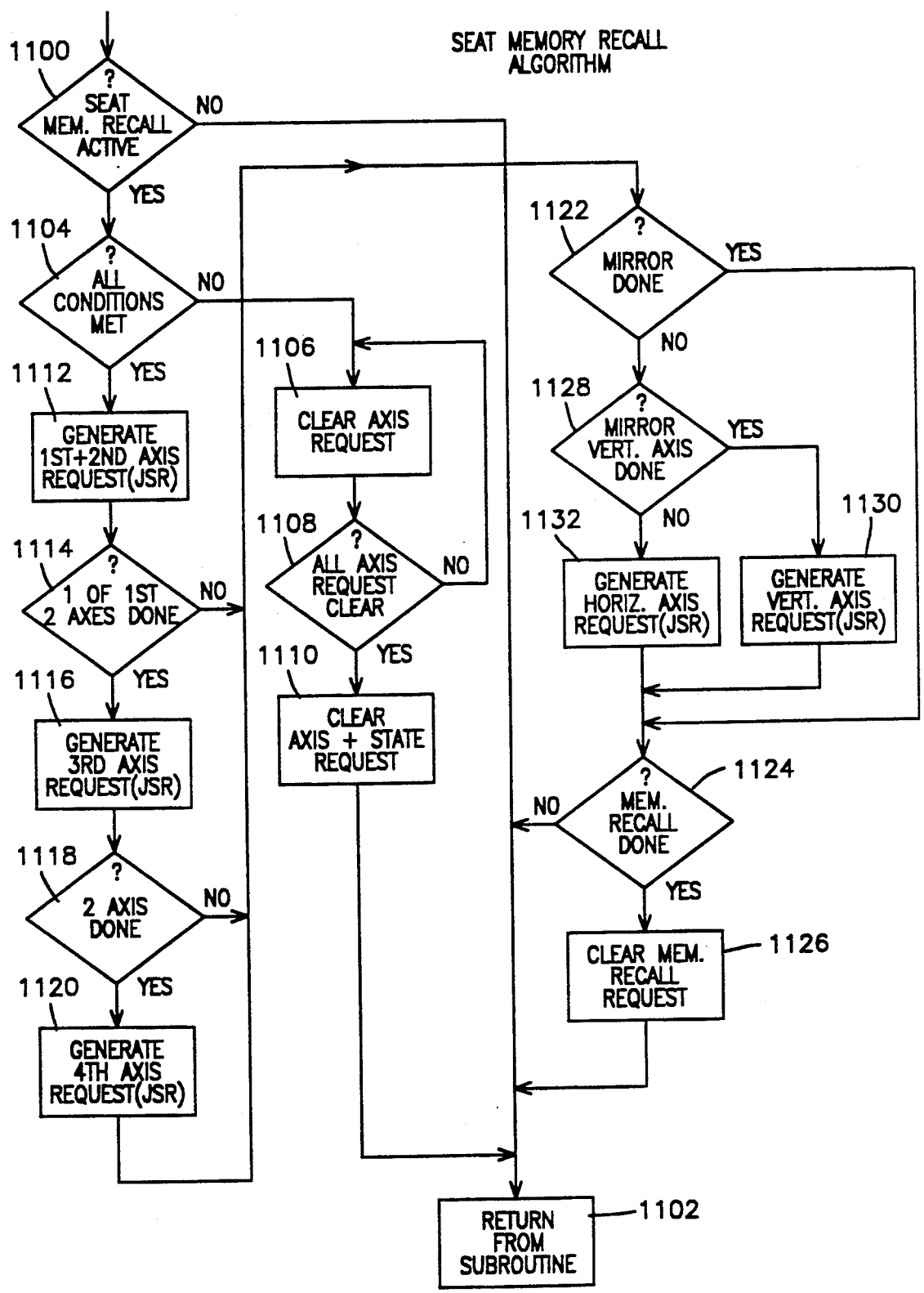
FIG. 25 shows steps in a method for carrying out an algorithm for seat memory recall.

FIG. 25 will now be discussed. A memory recall request was generated as shown in FIG. 3. The seat memory request prioritizer then determined which request should be honored if there were several requests (FIGS. 24A and 24B). The seat memory recall algorithm now comes into play, (FIG. 25).

In block 1100 a question is asked "Is the seat memory recall active?" If no, the program returns from this recall algorithm by way of block 1102. If the seat memory recall is active, the question is asked whether all safety conditions are met, at block 1104.

If not, the axis request is cleared at block 1106 and then the question is asked whether all axis requests are clear, at block 1108. If no, the program returns to block 1106. If yes, the block 1110 clears the axis and state requests, after which the program returns from the recall algorithm via block 1102.

Returning to block 1104 at the top of FIG. 25, if all conditions are met, block 1112 generates first and second axis requests. Then the question is asked in block 1114 "Is one of the first two axes done?" If yes, the third axis request is generated, starting at block 1116. Then block 1118 asks "Are two axes done?" If yes, block 1120 calls for generation of a fourth axis request. Then the program moves to block 1122.

Returning now to blocks 1114 and 1118, if the axes are not done, the flow proceeds to block 1122.

At block 1122 the question is asked whether the mirror is done. If yes, flow proceeds to block 1124 where the question is "Has memory recall been done?" If no, the program returns from this subroutine via block 1102. If yes, the memory recall request is cleared in block 1126, after which the program returns from the algorithm subroutine.

Returning now to block 1122 of FIG. 25, if the mirror is not done, the question is asked in block 1128 whether the mirror vertical axis is done. If yes, a vertical axis request is generated in block 1130, and the program flow goes to block 1124.

If the mirror vertical axis was found not to have been done in block 1128, the subroutine flows to block 1132 where a horizontal axis request is generated. Thereafter the program goes to block 1124.

That concludes the description of the seat control flow charts.

Windows

All windows are controllable from the driver's seat. Other windows are controllable locally. The driver can lock out, (i.e., prevent), local control of the non-driver windows (so that, for example, the window controls will ignore the rear door local switches).

The driver's window is controlled by the local driver window switch, which includes an express-down function. This function causes the window to go completely down even upon only momentary depressing of the switch to an express position. The front seat passenger window is similarly controllable in an express mode. Other switches operate only while the switch is held depressed.

A request prioritizer forwards the present switch state to the driver window algorithm. The algorithm determines the state of the local output operator driver, based on the present state and previous state of the requester (i.e., the switch). This permits not only the up/down function to occur but also allows the motor to continue moving following an express request even after the switch has been released. The algorithm also permits the express function to be cancelled if the driver's window switch is activated again or if the full-down sensor becomes active.

The left rear window is controlled by the driver's rear window switch and the left rear window switch. The request prioritizer generates a request based on the driver's switch taking precedence over the rear window switch. The algorithm determines if a new CSC command must be issued to the rear window motor based on the request.

The front passenger window algorithms are similar to the driver rear window algorithm except that commands are sent over the CCD bus when there is a switch change of state.

Window Prioritizer

Figure 26:
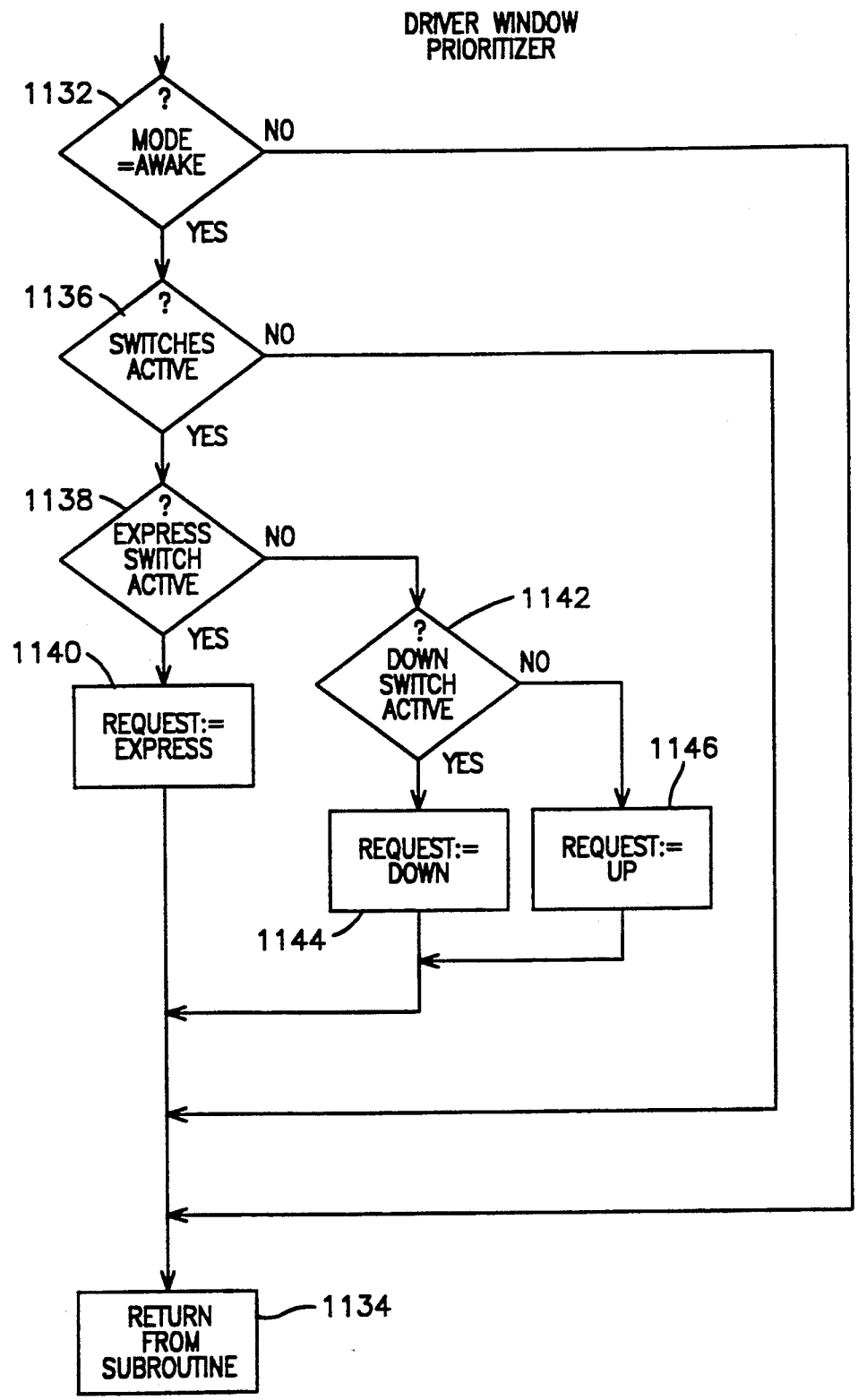
FIG. 26 shows steps in a method for prioritizing driver window commands.

FIG. 26 shows the driver window prioritizer. Block 1132 asks the question "Is the system in the awake mode?" If no, the program returns from the prioritizer subroutine via block 1134. If yes, a question is asked in block 1136 whether switches are active. If no, the program returns via block 1134.

If yes, the question is asked "Is the express switch active?" (block 1138). If yes, the request is set equal to express, block 1140. Then the program returns via block 1134.

If the express switch was not active, the question is asked in block 114 whether the down switch is active. If yes, block 1144 sets the request equal to down. If no, block 1146 sets the request equal to up. After blocks 1144 and 1146 the driver window prioritizer subroutine goes to block 1134 from which it leaves the subroutine.

Window Algorithms

Figure 27A:
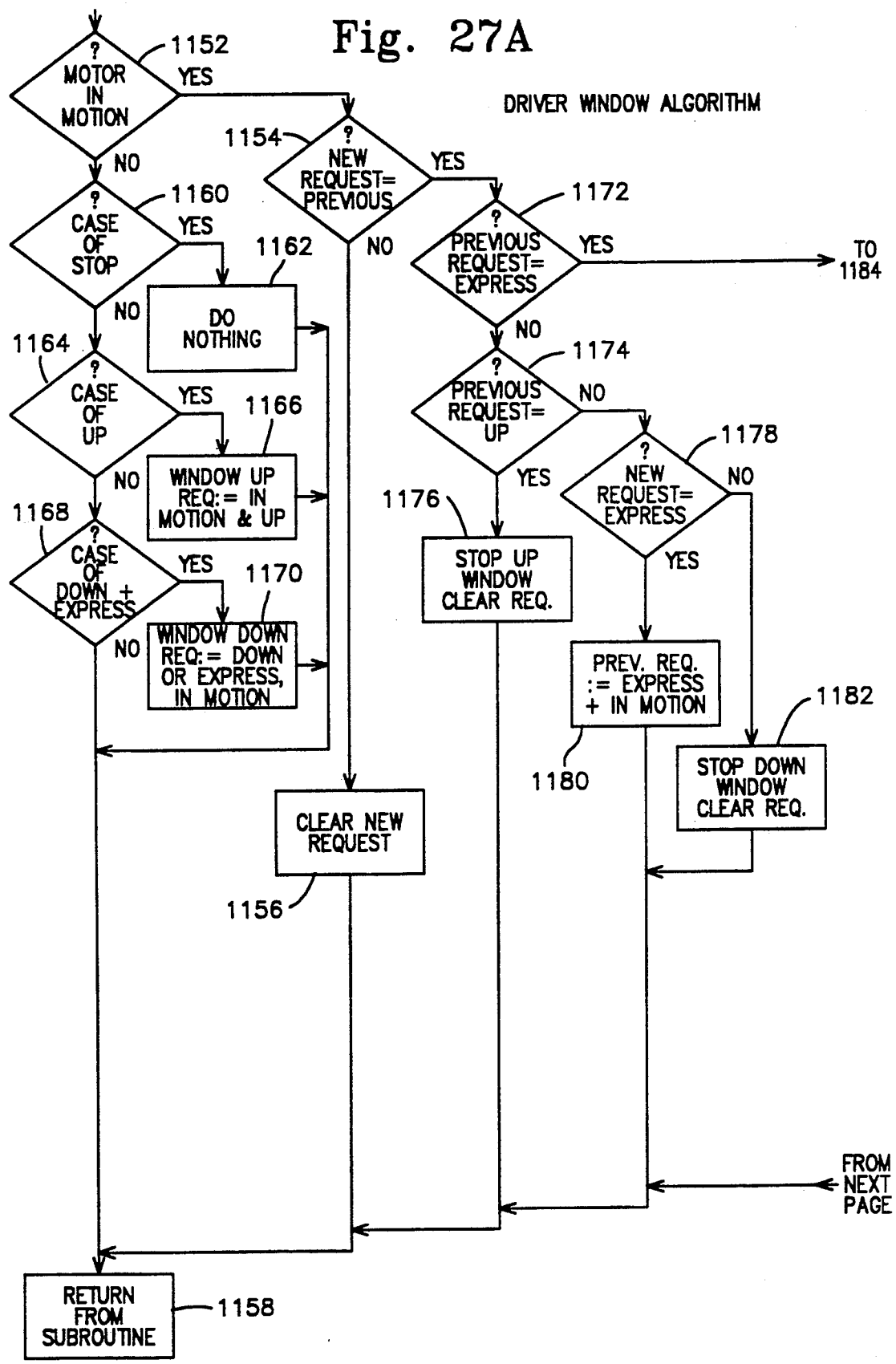
FIGS. 27A and 27B together show steps in a method for performing a driver window-control algorithm.
Figure 27B:
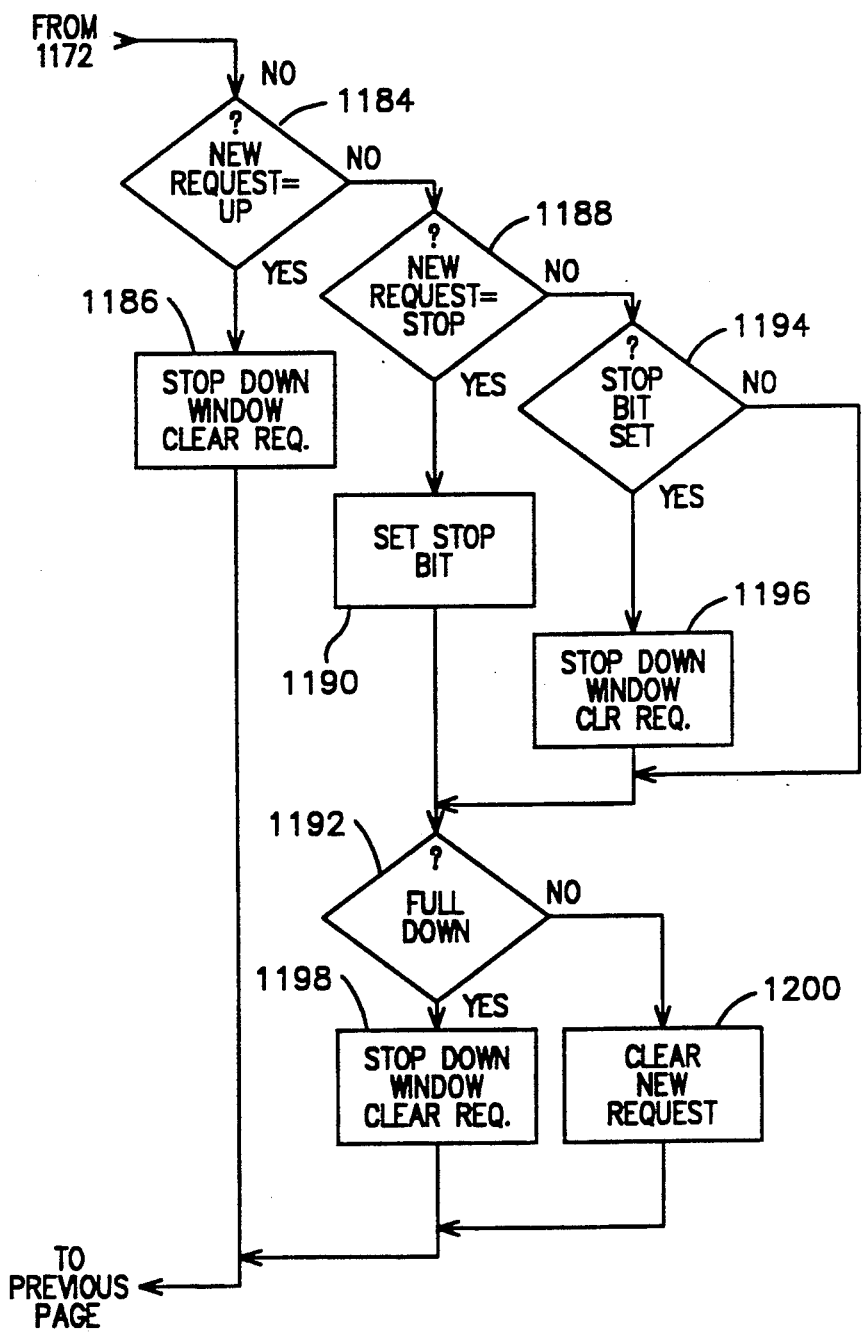

After prioritization of requests, the driver window algorithm comes into play. FIG. 27 shows this procedure, which starts with a block 1152. The question is asked "Is the motor in motion?" If it is, block 1154 asks whether the new request is the same as the previous request. If yes, block 1156 clears the new request, and the program returns from the algorithm subroutine by way of block 1158.

If the motor was found in 1152 not to be in motion, the question is asked in block 1160 whether this is a case of stop. If yes, block 1162 tells the system to do nothing and the flow goes to block 1158. If this is not a case of stop, block 1164 asks whether it is a case of an up command. If yes, block 1166 sets window up request equal to in motion and up. Then the program returns from the subroutine.

If it is not a case of up, block 1168 asks whether it is a case of down and express. If yes, the window down request is set equal to down or express in motion. Thereafter block 1158 carries the program out of this driver window algorithm subroutine.

Returning now to block 1154 at the top of FIG. 27, if the new request is not equal to the previous request, block 1172 asks whether the previous request was for express action. If no, block 1174 asks whether the previous request was an up command. If yes, block 1176 stops the up motion of the window and clears the request, and the program returns from this algorithm subroutine.

If the previous request at 1174 was not for up, block 1178 asks whether the new request is an express command. If yes, the previous request is set equal to express and in motion, after which the flow goes to block 1158. If no, block 1182 stops the down motion of the window and clears the request. The program then goes to 1158.

Back again at block 1172, if the previous request was an express request, block 1184 asks whether the new request is for upward motion. If yes, block 1186 stops the downward motion of the window and clears the request, then goes to block 1158. If the new request at block 1184 was not an up request, block 1188 asks whether it was a stop request. If yes, block 1190 sets the stop bit and the program goes to block 1192.

If no at block 1188, block 1194 asks whether or not the stop bit is already set. If no, the program goes to block 1192. If yes, it stops the down window motion in block 1196, clears the request, and goes to block 1192.

Block 1192 asks the question, "Fully down?" If yes, the window down motion is stopped, the request is cleared (block 1198) and the program leaves the subroutine. If the answer of 1192 was negative, block 1200 clears the new request and the program returns via block 1158.

If desired, a subroutine can shut off a window motor after an excessive running time, represented by a preset count in the RAM. When the motor is running, each 100 mS pulse from the block 93 decrements the count, until a down-position sensor stops the motor and the counter. If the sensor does not stop the counter before a count of zero the counter creates a stop command for the motor.

Power Door Locks

The door lock function follows the state of the driver's door lock switch when that switch is active, with the passenger door lock switch taking second priority, and the auto-lock function taking third priority. This monitoring function is performed by the request prioritizer.

This function is performed by the request prioritizer. Based on the request, the algorithm sets the local discrete output and determines if a command for a change in state needs to be sent to the remote door locks via the CSC bus (for rear door) and the CCD bus (for passenger door).

The auto-door lock function is based on a one-time lock command the first time the car exceeds 15 MPH after the car has been taken out of park. The door lock inhibit function is based on the following two conditions: key in ignition and door open. Under these conditions the door lock switch will not cause the doors to lock. Unlocking, however, is still permitted.

Door Lock Prioritizer

Figure 28:
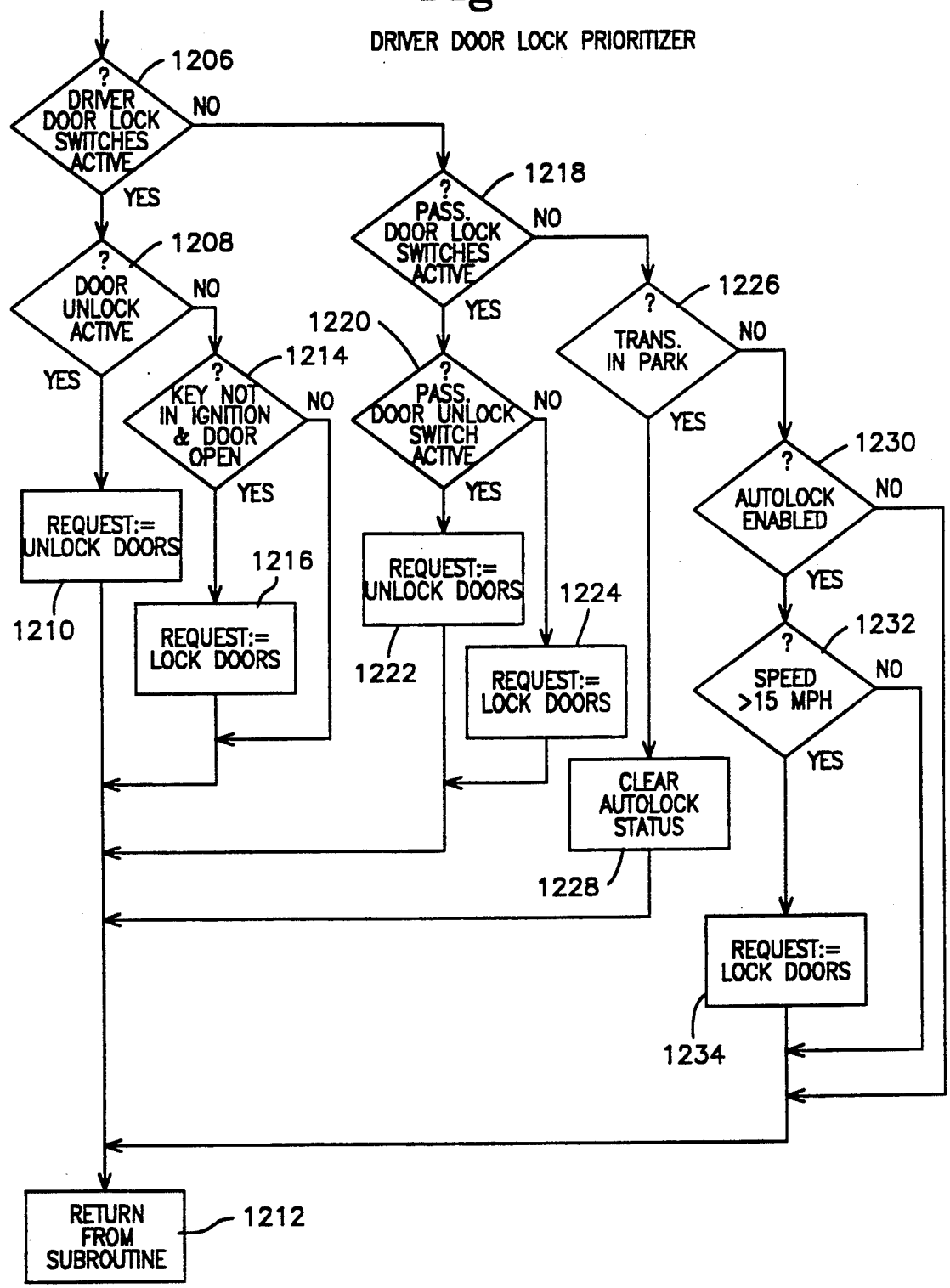
FIG. 28 shows steps in a method for prioritizing driver door-lock commands.

Door lock commands must be prioritized before they are issued. FIG. 28 shows the procedure for prioritizing them. Block 1206 asks the question "Are any driver door lock switches active?" If yes, block 1208 asks "Is the door unlock switch active?" If yes, block 1210 provides a request to unlock the doors. Block 1212 then returns the program from this subroutine.

Returning now to block 1208, if door unlock was not active, block 1214 asks whether the key is not in the ignition and the door is open. If yes, block 1216 sets up a request to lock the doors and the program goes to block 1212. If the answer to the question of block 1214 is no, the program goes directly to block 1212 where it returns from this subroutine.

Back at block 1206 of FIG. 28, if the driver door lock switches were not active, block 1218 asks whether the passenger door locks switches are active. If yes, block 1220 asks whether the passenger unlock switch is active. If yes, a request is set up to unlock the doors in block 1222. The program goes to block 1212. If the passenger door unlock switch is not active in block 1220, block 1224 provides a request to lock the doors, and the program goes to block 1212.

Returning now to block 1218, if the passenger door lock switches are not active, block 1226 asks whether the transmission is in the park position. If yes, 1228 clears the auto-lock status and the program goes to block 1212 for return from this prioritizer subroutine. If the transmission is not in park, block 1230 asks whether auto-lock is enabled. If no, the program returns from this subroutine by way of block 1212.

If yes at block 1230, a question is asked whether the speed exceeds 15 MPH (block 1232). If not, the program returns from this subroutine. If yes, block 1234 provides a request to lock the doors and the program goes to block 1212. The driver door lock prioritizer subroutine is finished.

Door Lock Algorithm

Figure 29:
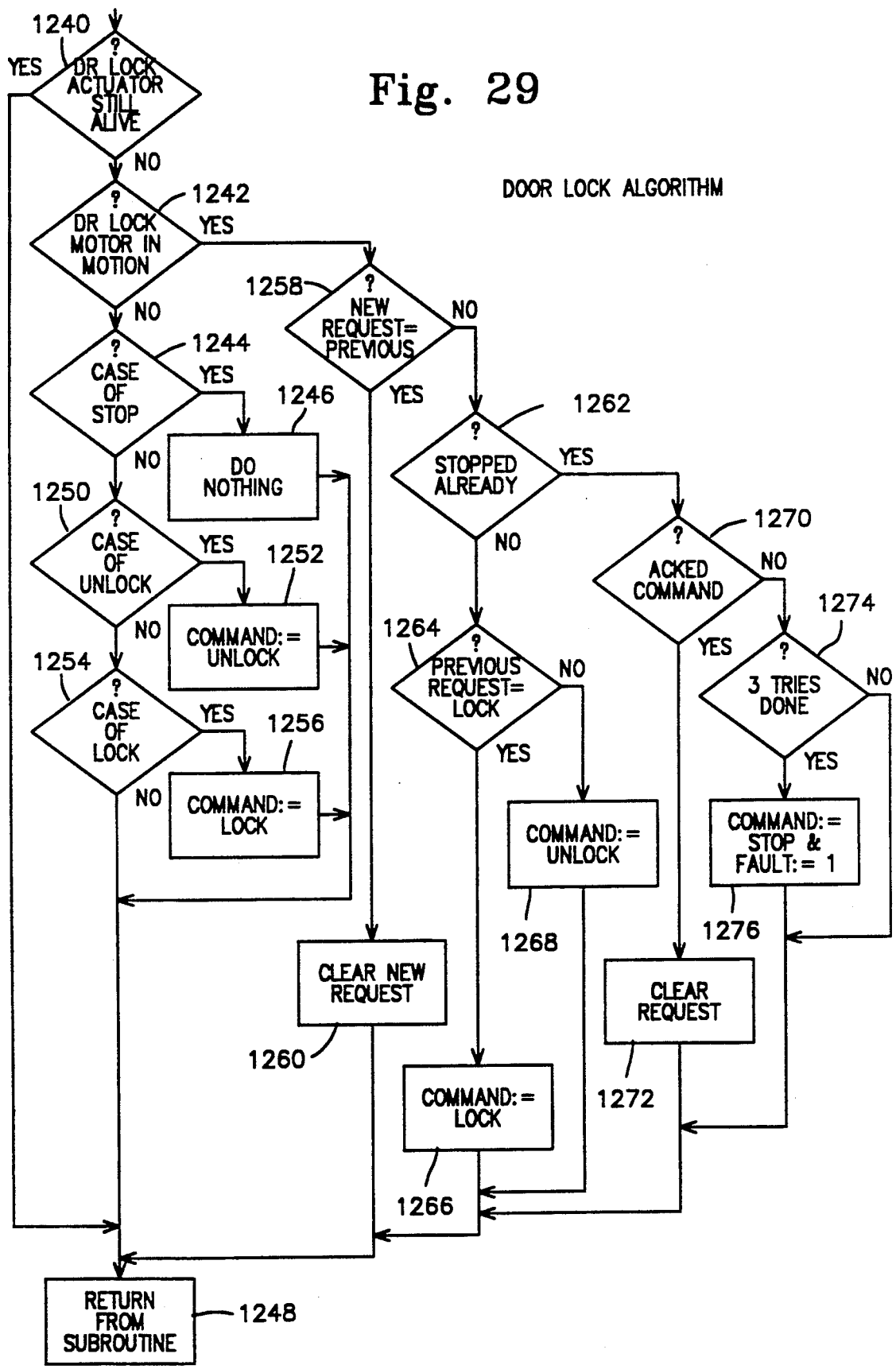
FIG. 29 shows steps in a method for performing a door-lock algorithm.

FIG. 29 shows the door lock algorithm, which comes into play after the door lock prioritizer subroutine. In block 1240 the question is asked "Is the door lock actuator still active?" If yes, the program goes down to block 1248 to return from this subroutine. If no, block 1242 asks the question "Is the door lock motor in operation?" If it is not, block 1244 asks whether this is a case of stop. If yes, block 1246 specifies "do nothing" and the program flows to block 1248 for return from this subroutine.

If it is not a case of stop at block 1244, block 1250 asks whether it is a case of unlock. If yes, block 1252 provides an unlock command. The program then goes to block 1248. If it is not a case of unlock, block 1254 asks whether it is a case of lock. If yes, block 1256 provides a lock command. The program then flows to block 1248 for return from this subroutine. If no at block 1254, the program goes to 1248.

Going back now to block 1242 at the top of FIG. 29, if the door lock motor is in motion, block 1258 asks the question "Is the new request the same as the previous request?" If yes, the new request is cleared and the program goes to block 1248. If the new request is not the same as the previous one, block 1262 asks whether it is stopped already.

If no, block 1264 asks whether the previous request was to lock. If yes, block 1266 provides a command to lock, and the program goes to block 1248. If the previous request was not to lock (at block 1264), block 1268 provides a command to unlock. The program then goes to block 1248.

Revisiting block 1262, if the answer is that it is stopped already, block 1270 asks whether the command has been acknowledged. If yes, block 1272 clears the request and the program goes to block 1248. If the command has not been acknowledged, block 1274 asks whether three tries have already been made. If not, the program goes to block 1248. If three tries have already been made, block 1276 issues a command to stop and indicates that a fault has occurred Then the program goes to block 1248 for return from this subroutine

Memory Power Mirrors

The Multiplex Door Module System being described includes power-adjustable mirrors Mirror positions can be changed by operating some switches, and preferred positions can be stored in a memory and recalled upon command. Stored positions for the mirrors can be retrieved together with seat actuation commands, so that when the seat is directed back to its memory stored positions the mirrors also return to their memory stored positions. In another embodiment the mirrors can be cocked down when the vehicle is put in reverse gear.

The mirror memory function involves two analog-to-digital (A/D) inputs and random access memory storage. The routines for the driver mirror first ascertain whether the selector switch is set to the left (for the driver), then they associate the appropriate local output devices with the corresponding switch inputs. The release of a mirror switch, or the de-selection of the driver mirror, causes the mirror output device to be turned off. Potentiometers on the mirrors provide a means to read and feed back the positions of the mirrors. The current position is used for the memory set and recall functions that are described below.

Because of slight inaccuracies of the analog-to-digital converters and the position measuring potentiometers, and the time lag between readings, a dead band has been incorporated for mirror positioning during memory recall. This is provided by not moving, the mirror if the current position is within a predetermined approximately centered on the set value itself.

If the current position is outside the set value range, the mirror is moved until the current position is equal to or greater than the set value. This prevents the mirror from stopping at the edge of the range of the dead band, and subsequent activations of memory recall do not cause movement of the mirror.

FIGS. 30, 31, 32, 11-A and others relate to control of the power mirrors.

Mirror Request Generator

Figure 30:
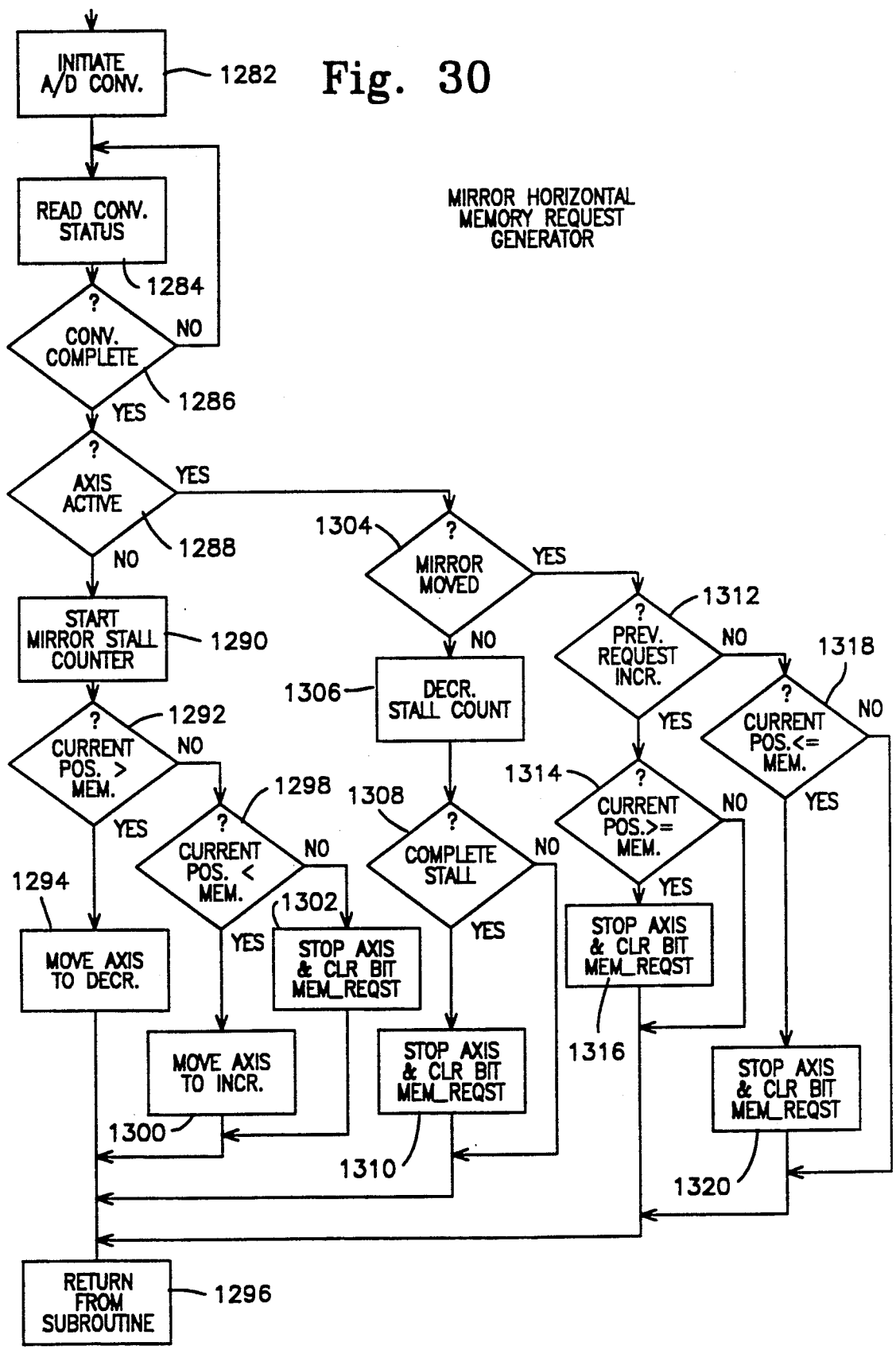
FIG. 30 shows steps in a method for generating a mirror-horizontal-position memory request.

FIG. 30 shows the mirror horizontal memory request generator. It starts with block 1282—initiate analog-to-digital conversion. Block 1284 then reads the conversion status. Block 1286 asks whether the conversion is complete. If not, the program returns to block 1284. If it is complete, the program goes to block 1288 where a question is asked "Axis active?" If no, block 1290 starts the mirror stall counter.

Then block 1292 asks "Is the present mirror position greater than the memory value?" If yes, block 1294 moves the axis in the decreasing direction. Flow then goes to block 1296, which specifies returning from this subroutine.

Back at block 1292 of FIG. 30, if the present position was not greater than the memory, block 1298 asks "Is the current position less than the memory?" If yes, block 1300 moves the axis to increase the position. Flow then goes to block 1296. If in block 1298 the current position was not less than the memory value, block 1302 stops the axis and clears that axis' memory request bit. Flow then goes to block 1296.

Going back to block 1288, if the axis is active, block 1304 asks "Is the mirror moved?" If no, block 1306 decrements the stall counter. Then 1308 asks "Is the stall complete?" If no, the program goes to block 1296. If yes, it goes to block 1310, which stops the axis and clears that axis' memory request bit. Then the flow goes to block 1296.

Going back to block 1304 on FIG. 30, if the mirror is moved, block 1312 asks "Was the previous request for an increase?" If yes, block 1314 asks "Is the current position greater than the memory value?" If no, the program goes to block 1296. If yes, the program goes to block 1316, which stops the axis and clears that axis' memory request bit. The flow then goes to block 1296.

Back at block 1312, if no, block 1318 asks "Is the current position less than the memory setting?" If no, the program goes to block 1296. If yes, it goes to block 1320, which stops the axis and clears that axis' memory request bit. The program then goes to block 1296, from which it returns from this memory request generator subroutine.

Mirror Prioritizing

Figure 31:
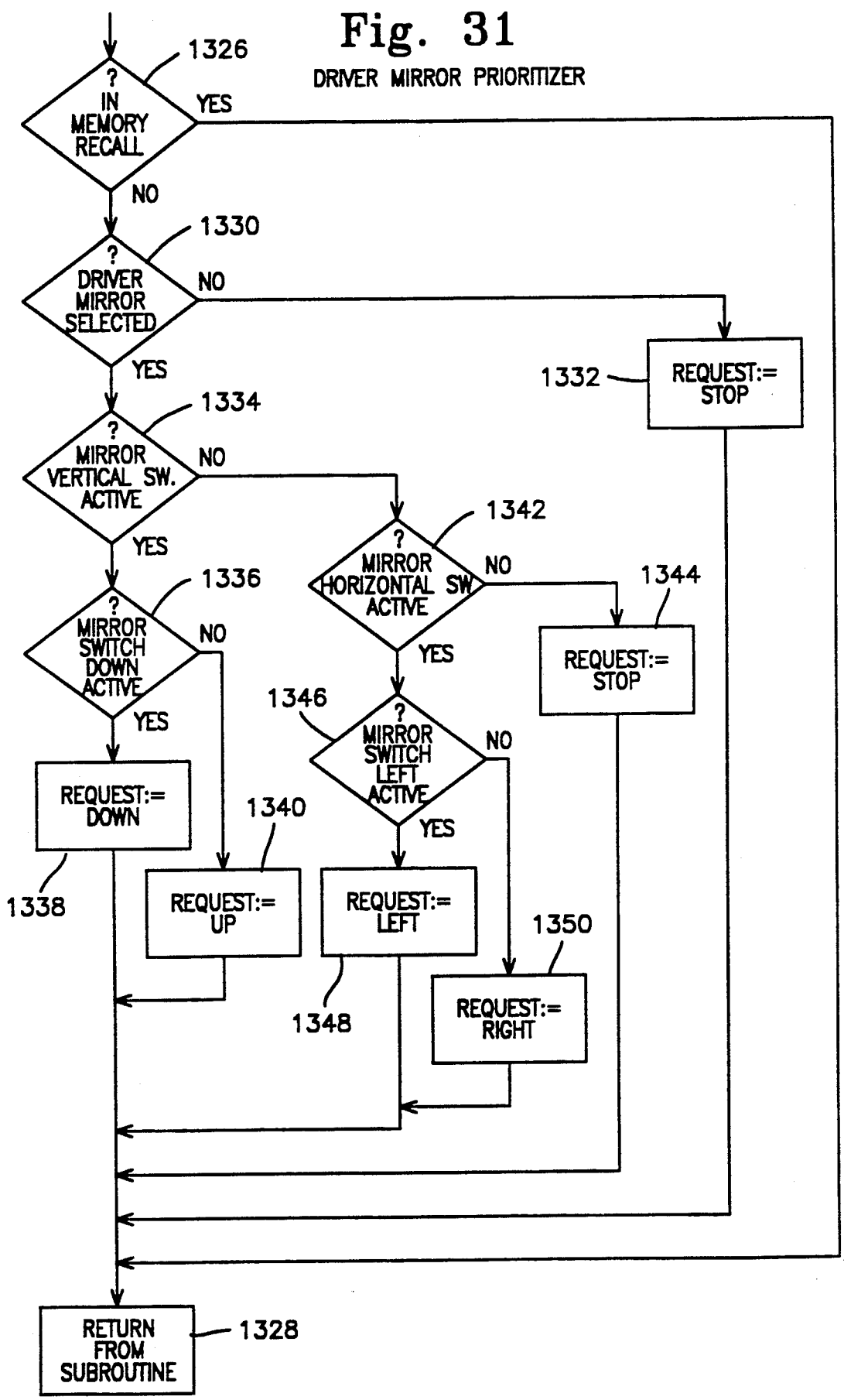
FIG. 31 shows steps in prioritizing driver mirror requests.

FIG. 31 shows the procedure for driver mirror prioritizing. Activity opens with block 1326 where the question is asked "In memory recall?" If yes, the program goes to block 1328, from which it returns from the driver mirror prioritizer's subroutine.

If no, the program goes to block 1330 where the question is asked "Is the driver mirror selected?" If no, block 1332 provides a request to stop and the program goes to block 1328. If block 1330 was answered with a yes, the program goes to block 1334 where the question is asked "Is a mirror vertical switch active?"

If yes, block 1336 asks "Is the mirror down switch active?" If yes, block 1338 provides a downward motion request. Program flow then goes to block 1328. If block 1336 answers no, block 1340 provides an upward motion request. Flow then goes to block 1328.

Going back to block 1334 of FIG. 31, if a mirror vertical switch is not active, block 1342 asks "Is a mirror horizontal switch active?" If not, block 1344 provides a stop request. The program then goes to block 1328.

If the mirror horizontal switch is active in block 1342, a question is asked in block 1346 whether the mirror switch left position is active. If yes, a request is provided to move the mirror to the left, at block 1348. The program then goes to block 1328. If the mirror switch left position is not active in block 1346, block 1350 provides a request to move the mirror to the right. Program flow then goes to block 1328, from which it returns from the driver mirror prioritizer subroutine.

Mirror Algorithm

Figure 32:
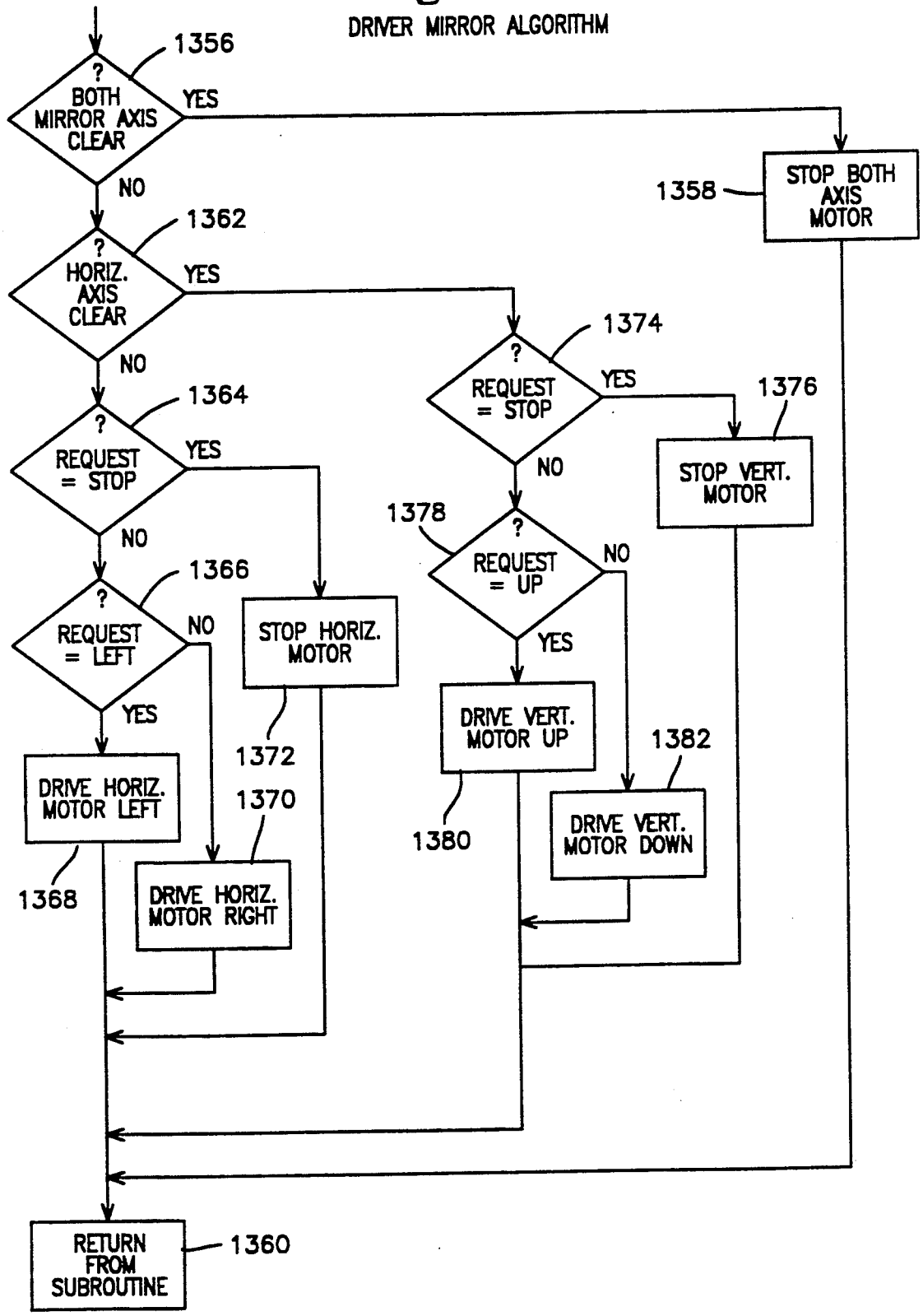
FIG. 32 shows steps in executing a driver mirror algorithm.

FIG. 32 shows the driver mirror algorithm. The algorithm follows the prioritizer procedures of FIG. 31.

The algorithm of FIG. 32 opens with a question in block 1356, namely, "Are both mirror axes clear?" If yes, block 1358 stops both axes' motors. The program then goes to block 1360, which calls for return from this driver mirror algorithm subroutine. If block 1356 finds that one or both mirror axes are not clear, block 1362 asks whether the horizontal axis is clear. If not, block 1364 asks whether there is a stop request. If not, block 1366 asks whether there is a request to move to the left. If yes, block 1368 drives the horizontal motor to the left. Then block 1360 returns the program from this algorithm subroutine.

Back at block 1366, if there is not a request to move to the left, block 1370 drives the horizontal motor to the right. Then the program goes to block 1360.

Moving upward on FIG. 32 to block 1364, if there is a request to stop, block 1372 stops the horizontal motor, then sends the program to block 1360.

Again moving upward, to block 1362, if the horizontal axis is found to be clear, block 1374 asks whether there is a request to stop. If there is, block 1376 stops the vertical motor. The program then goes to block 1360.

If there is not a request to stop at block 1374, block 1378 asks whether there is a request to drive the mirror upward. If yes, block 1380 operates the vertical motor to drive the mirror in an upward direction. The Program then goes to block 1360.

Going back to block 1378, if there is not a request to drive the mirror upward, block 1382 drives the vertical motor downward. The program then goes to block 1360 and the program returns from this driver mirror algorithm subroutine.

FIG. 34A and 34B together form a diagram of a relay board, which is generally designated as 1420. It includes relays 1422-1425. The coils receive power from a 12-volt line (1426) and are switched by lines 1428-1431, which are connected with a relay driver (152) at the top of FIG. 4B.

The output contacts of the relays (1422-1425) are connected to a doorlatch motor at terminals 1432 and 1434 of FIG. 34B and to window motor terminals 1436 and 1438 of FIG. 34B.

Lighting

The preferred Multiplex Door Module System embodiment includes illumination of key cylinders, entry and switches. The key cylinder light turns on when a door handle is pulled or when a door is opened. The courtesy lights are also turned on when a door handle is raised. When the door handle is released a 25-second timer is started, during which period the courtesy lights remain on. After the 25-second period the courtesy lights fade to off over a 5-second dimming interval.

The front switches are illuminated for night driving, the bezel being backlighted. The intensity is based on a dimming code received over the CCD bus. The brightness code is as follows: zero equals off; 254 is fully on; 255 is translated to mean fully off, (as this is intended for daytime displays only).

Passenger Door Module

The driver door "node" was described above. Features of the passenger door system or node are: it receives window commands, door lock commands and mirror commands. It receives window lockout commands; it modifies the request prioritizer for door lock and window switch priority; and it has an express down feature for its window.

Output Modules

The rear doors include an output module for the door lock and window motors. The switches located in the bezel are also tied to the sensor bus 20, 34 (CSC) for transmitting their state back to the door module.

Figure 33A:
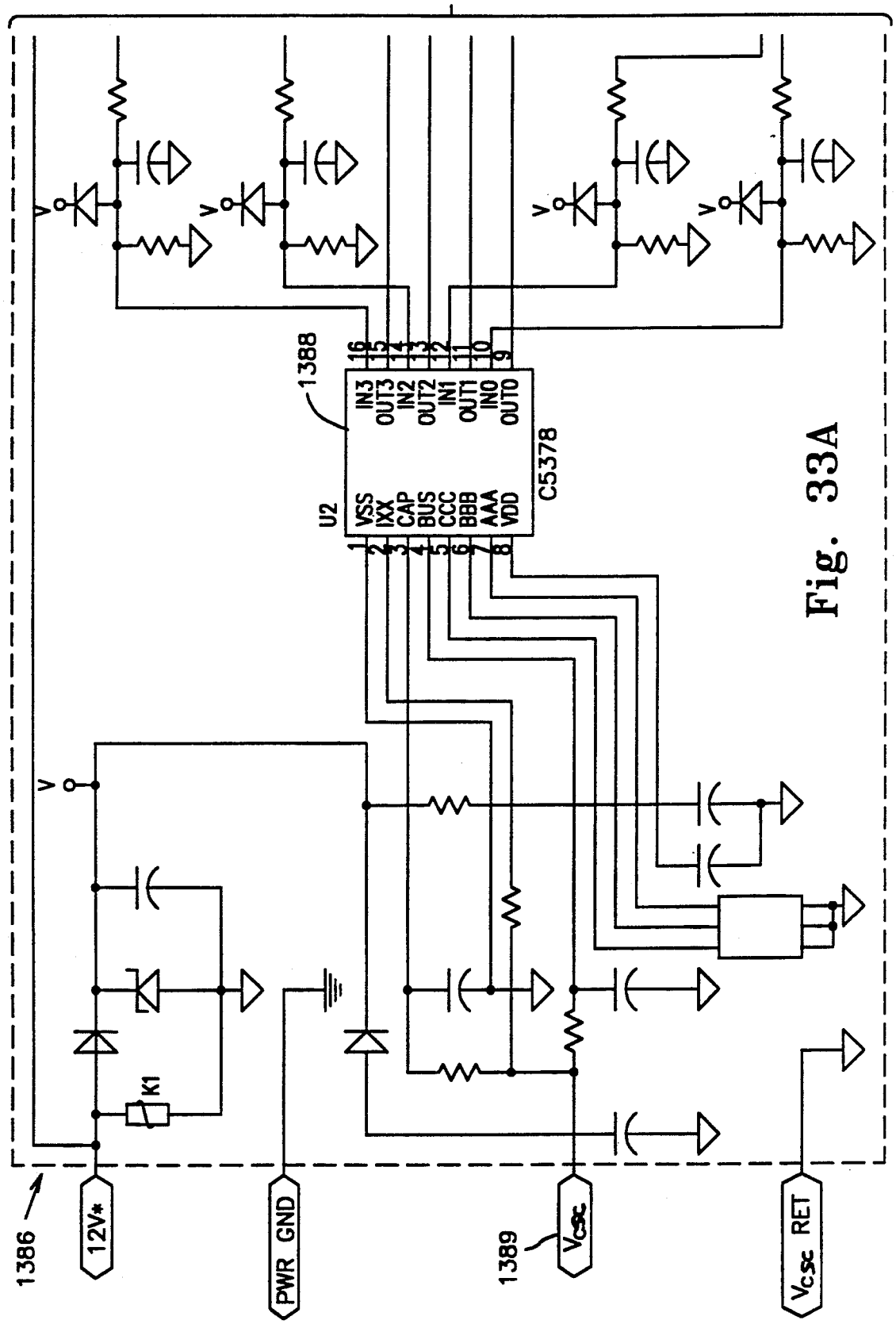
FIGS. 33A and 33B together are a block and circuit diagram of an output module.
Figure 33B:
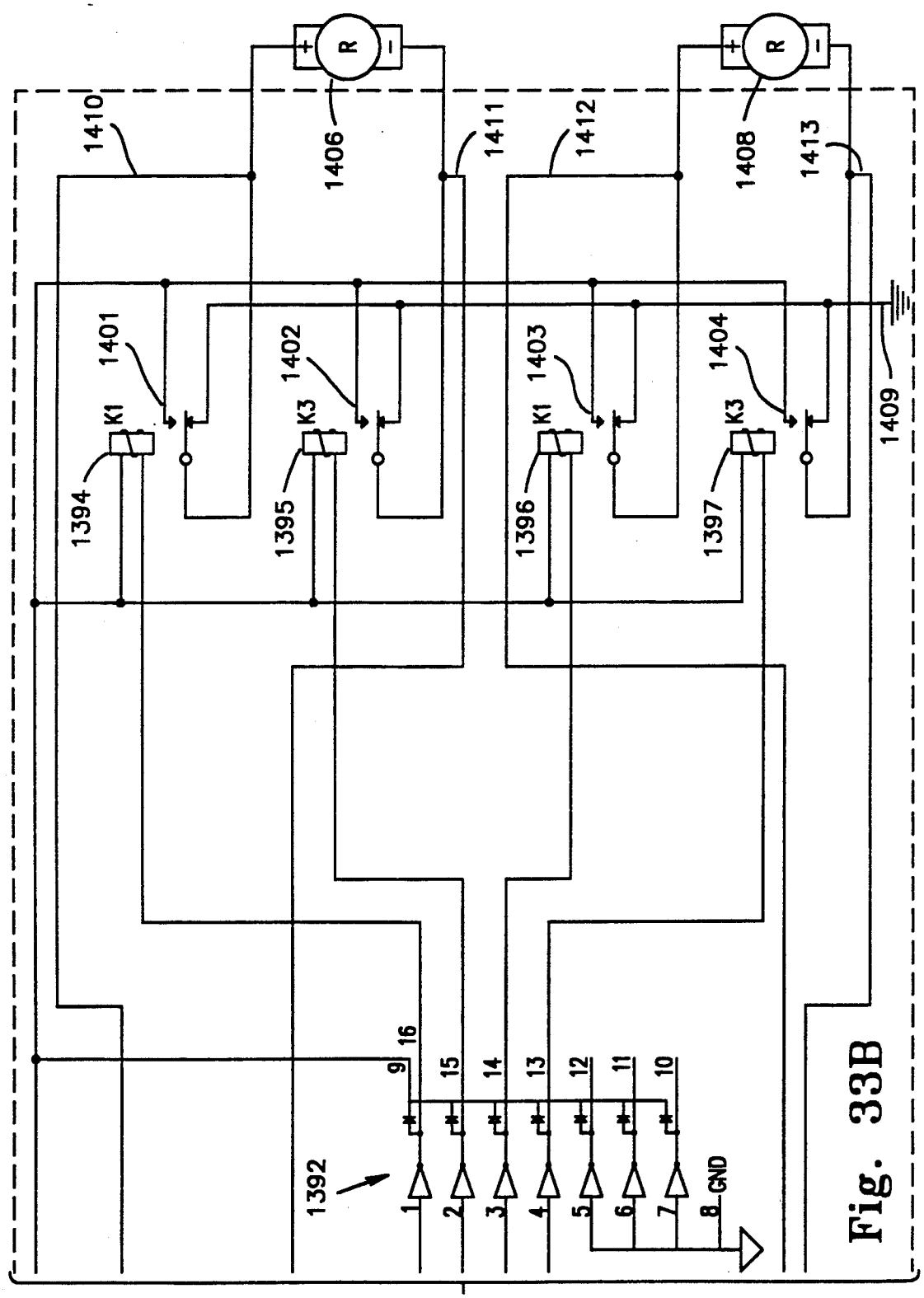

An output module, generally designated as 1386, is shown in FIG. 33. It contains a quad relay controller chip Model No. C5378, manufactured by Xicor Inc., 851 Birdseye Ct., Milpitas, Calif., 95035. This chip 1388 receives commands at a terminal 1389 from the CSC bus 20 and latches the data to its output pins, OUT 0, OUT 1, OUT 2, and OUT 3.

A ULN 2003 relay driver designated as 1392 is fed by these outputs, and in turn drives four relay coils, 1394-1397. Single-pole double-throw contacts 1401-1404 of these relays provide power to loads, namely the motors 1406 and 1408. The contact structure is designed with normally closed contacts, which are connected to ground when the coils 1394-1397 are not energized, so that each of the bi-directional motors 1406, 1408 is driven from a pair of relays.

A status line 1410-1413 is also connected from each relay output to inputs of the quad relay controller chip 1388, so that the output states of the relays can be monitored directly by the controlling door module, 16 or 18, as the case may be.

Although only a preferred specific embodiment of the multiplex door accessory control system has been described, many other embodiments are, of course, possible. The invention is merely exemplified by the described embodiment; the scope of the invention is determined by the claims.

We claim:

1. A multiplex control module and switch apparatus for use in automotive vehicles having selected power-operated accessories in the vehicle including at least one of door locks, power adjusted seats, power windows, interior lights, ignition switch and door key cylinder and including sensors for detecting the operative state of such accessories and of door ajar, ignition key presence and door handle movement operative upon actuation for providing sensor signals indicating a change of state of said sensors, and individual relay means operative upon receipt of relay-control signals to effect flow of current to said accessories, said module comprising:
   (a) means for housing said control module;
   (b) individual switch means operative upon user actuation for providing a switch signal indicating a desired change of state of one of said accessories.,
   (c) circuit means, including microcomputer means connectable in the vehicle to a power bus and to a multiplex signal bus, said microcomputer means comprising multiplexer means for communicating by multiplexing via said signal bus using a plurality of signals including said sensor signals;
   said microcomputer means having an ASLEEP mode using reduced average system power, in which it is operative to periodically scan at a first predetermined repetition rate, including scanning of said sensor signals for the states of only predetermined ones less than all of said sensor signals, and including scanning to detect the states of said switch means, and including a powered-down interval;
   said microcomputer means having an ACTIVE more in which it is operative to scan said sensor signals for the state of all of said sensors and to scan for the state of said switch means, said microcomputer means in said ACTIVE mode being operative to generate said relay-control signals in accordance with predetermined algorithms in response to said switch means and said sensor signals;
   said microcomputer means being operative to go to said ASLEEP mode after a predetermined time interval of inactivity of all of said switch means;
   said microcomputer means having an AWAKE mode into which it goes when said vehicle ignition switch is sensor as being in an "ON" state and in which, in addition to the capabilities of the ACTIVE mode, control of certain ones of said accessories is also enabled, said microcomputer means returning to said ACTIVE mode after said ignition switch is sensed in an "OFF" state;
   wherein said microcomputer means is operative to provide said relay-control signals for operation of said accessories in response to a change of state of said input signal from at least one of said switch and sensor means.

2. The module defined in claim 1, and wherein said microcomputer means is operative to disable said vehicle door locks if (a) said key is in said ignition switch and (b) said ignition switch is OPP and (c) a door is sensed as being ajar.

3. The module defined in claim 1, and wherein said microcomputer means is operative in said ASLEEP mode to scan said switch means and selected ones of said sensors in about a two-millisecond portion of the interior of said periodic scan, and to be inactive for a time interval thereafter until start of following scan.

4. The module defined in claim 1, and wherein said microcomputer means is operative in said ACTIVE mode to scan all of said sensors in about a thirty-two-millisecond interval following said scanning of said switches.

5. The module defined in claim 1, and wherein said microcomputer means is operative in said ACTIVE mode to generate said relay-control signals within two milliseconds, following said scanning of said sensors.

6. The module defined in claim 1, and wherein said microcomputer means in said ASLEEP mode is operative to scan said switches and sensors for about a two-millisecond portion of each scanning period and is powered down for the remaining about 98 milliseconds.

7. The module defined in claim 1, and wherein said microcomputer means is operative in response to a change of state of said door-ajar sensor to an ajar-indicating state to change from said ASLEEP to said ACTIVE mode.

8. The module defined in claim 1, and wherein said microcomputer means is operative to go from said ASLEEP to said ACTIVE mode in response to a change of state of said door handle sensor and is also operative in response thereto to provide a signal turning on said interior lights of the vehicle.

9. The module defined in claim 1, and wherein said vehicle has an "express down" switch and said microcomputer means is operative in response to even a momentary actuation of said "express down" switch to provide continuous actuation of said corresponding power-window relay until said corresponding window sensor indicates that said window is a fully lowered state, whereupon said power-window relay is reactuated; and wherein, said microcomputer is operative to prevent excessive running time if said window position sensor indicates said fully lowered state and said continuous actuation persists longer than a predetermined time.

10. The control module defined in claim 1, and wherein
said microcomputer means remains in said AWAKE state for a predetermined time interval after said ignition switch is sensed as being in an OFF state, and thus, upon user activation of any of said power-window switch and sensor means, permits actuation of said window relay means; and wherein,
after elapse of said predetermined time interval said microcomputer means goes to said ACTIVE mode.

11. The control module defined in claim 1, and wherein said switch means is arranged in a matrix having at least two data lines and at least two scan lines, and said microcomputer means is operative to scan said matrix for switch state and upon simultaneous actuation of a plurality of said switch means on a common scan line and a plurality on a common data line wherein at least one actuated switch is on both of said common lines, to disallow all such actuated switch means inputs until at least one of said scan-line and data-line switch means changes state so that only a single such switch means is actuated on said at least one data line and scan line.

12. The control module defined in claim 1, and wherein said microcomputer means is operative in said ASLEEP mode upon sensing a change of state of said door handle sensor to go to said ACTIVE more and upon sensing a change of state of said door-ajar sensor is operative to provide a signal indicative thereof.

13. The control module defined in claim 1, and wherein said microcomputer means provides an output signal when said door key cylinder sensor has undergone a change of state.

14. The control module defined in claim 1, and further comprising means for accessing a memory, and wherein said microcomputer means is operative to perform an initialization procedure provided the vehicle is in AWAKE, the door is open, and no other seat function is currently active, said initialization procedure being operative to drive said power-adjusted seat to a mechanical limiting position to protect stalling of said seat at said limiting position, to detect the location of said limiting position, to store in said memory said location of said limiting position, and to return the seat to an intermediate positioning and subsequently, whenever said limiting position is reached during operation of said seat, to stop lowering said seat relay means.

15. Multiplex apparatus for control of accessories of a vehicle, including at least one of power-operated door locks, an ignition switch, adapted for use with a body computer module, comprising:
a door module on the driver side of the vehicle;
at least one output module connected with said door module;
bus means for multiple excommunication among said modules;
actuator means for locking a door;
means for sensing when an ignition key is in said ignition switch;
means for sensing when said ignition switch is OFF;
means for sensing when a door is ajar;
means receiving signals from said sensor means for inhibiting door locking when said key is in said ignition switch, said ignition switch is OFF, and said door is ajar.

16. A method for control of accessories of a vehicle, including power-operated seats; said vehicle having a body module, a door module on the driver side, a door module on the passenger side, and at least one output module connected with each of said door modules; said seat being movable by motors over a range to mechanical limits of travel; comprising the automatic and much seat-initialization procedure steps of:
loading into a memory predetermined FORWARD and UP seat positions that are beyond said mechanical limits of travel and therefore unreachable;
commanding said seat to move toward said positions of said predetermined values by manually actuating first and second memory recall switches simultaneously;
moving said seat in response to said command until it reaches said mechanical limits and said motors stall and the stall conditions are detected;
recording the positions at which said stall conditions were detected as FORWARD limits and UP limits for the respective axes;

loading a second set of predetermined values into said memory and repeating said process for the directions BACK and DOWN;

moving said seat until BACK and DOWN stalls occur and have been detected, recording the positions at which the stalls occurred for each of the axes as BACK limits and DOWN limits;

when the last axis has stalled and had its stall position determined and recorded, moving the seat to a center position based on the limits just determined.

17. A method as in claim 16 and further comprising the steps of:

automatically detecting whether any manual seat switch is actuated during said seat-initialization procedure;

if a manual seat switch is actuated, cancelling said initialization procedure and executing the request represented by the actuation of the manual switch.

18. A method for control of accessories of a vehicle, including power-operated seats; said vehicle having a body module, a door module on the driver side of the vehicle, a door module on the passenger side of the vehicle, and at least one output module connected with each of said door modules; said seat being movable by motors over a range to mechanical hard limits of travel; comprising the automatic and manual steps of:

manually initiating performance of an initialization procedure to set limits including moving said seat as far as it can go, to a stall condition, along various axes of motion;

recording the positions at which motor stalls were detected as FORWARD hard and soft limits, and UP hard and soft limits for the respective axes, said soft limits being at least temporarily equal to said hard limits;

subsequently setting a soft limit different from a hard limit if an obstruction subsequently causes a stall, thereafter, when a new seat command is received, comparing the then-current position of the seat with said hard limits;

inhibiting turn-on of the motor if the seat is already at a hard limit in the commanded direction;

if a soft limit that is not equal to a hard limit has previously been set and has been reached by said seat, stopping the seat motion there, but enabling any second actuation of the seat switch in that direction to start the motor in order to try to overridge the soft limit;

if the overridge attempt is successful because the prior soft limit condition no longer exists, resetting the soft limit so as to equal the corresponding hard limit.

19. Apparatus for control of accessories of a vehicle having a PARK position of its transmission, said accessories including a power-operated seat with seat belt, comprising:

a door module on the driver side of the vehicle;

at least one output module connected with said door module;

at least one of said seats being movable through a range of travel;

power means for moving said seat;

set-switch means for setting a memory position of said seat;

memory-recall switch means for, upon subsequent actuation, operating said seat to go to said memory position;

means for sensing that said set-switch means was not actuated within a predetermined number of seconds before said memory-recall switch;

sensor means for sensing safety conditions and providing safety condition input signals, including means for sensing, that said vehicle's transmission is in said PARK position, and that said seat belt is not fastened;

means responsive to said memory-recall switch means for driving said seat to said memory position when said safety conditions are fulfilled.

* * * * *

UNITED STATES PATENT AND TRADEMARK OFFICE
CERTIFICATE OF CORRECTION

PATENT NO. : 5,081,586
DATED : January 14, 1992
INVENTOR(S) : R. C. Barthel, et al.

It is certified that error appears in the above-identified patent and that said Letters Patent is hereby corrected as shown below:

Column 36, Line 56:     "sensor" should read  --sensed--

Column 38, Line 37:     "excommunication" should read  --communication--

Column 38, line 54, after "and" "much" should read --manual--

Column 40, Lines 10 and 11:   "over-ridge" should read  --over ride--

Column 40, Line 12:     "overridge" should read  --override--

Signed and Sealed this

Third Day of August, 1993

Attest:

MICHAEL K. KIRK

*Attesting Officer*          *Acting Commissioner of Patents and Trademarks*